US009983327B2

(12) United States Patent
Johnston et al.

(10) Patent No.: US 9,983,327 B2
(45) Date of Patent: May 29, 2018

(54) POLYMER COATED NANOPARTICLES

(71) Applicant: BOARD OF REGENTS, THE UNIVERSITY OF TEXAS SYSTEM, Austin, TX (US)

(72) Inventors: Keith P. Johnston, Austin, TX (US); Christopher W. Bielawski, Austin, TX (US); Hitesh G. Bagaria, The Woodlands, TX (US); Ki Youl Yoon, Austin, TX (US); Bethany M. Neilson, Austin, TX (US); Chun Huh, Austin, TX (US); Steven L. Bryant, Austin, TX (US); Edward Lee Foster, Austin, TX (US); Zheng Xue, Austin, TX (US); Lynn Michelle Foster, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 315 days.

(21) Appl. No.: 14/436,325

(22) PCT Filed: Oct. 25, 2013

(86) PCT No.: PCT/US2013/066867
§ 371 (c)(1),
(2) Date: Apr. 16, 2015

(87) PCT Pub. No.: WO2014/066793
PCT Pub. Date: May 1, 2014

(65) Prior Publication Data
US 2015/0268370 A1 Sep. 24, 2015

Related U.S. Application Data

(60) Provisional application No. 61/719,255, filed on Oct. 26, 2012.

(51) Int. Cl.
*G01V 3/26* (2006.01)
*B82Y 30/00* (2011.01)
*B82Y 40/00* (2011.01)

(52) U.S. Cl.
CPC ............ *G01V 3/26* (2013.01); *B82Y 30/00* (2013.01); *B82Y 40/00* (2013.01)

(58) Field of Classification Search
CPC .. E21B 49/087; E21B 47/0002; E21B 47/102; E21B 47/122; G01V 3/26; C09K 5/16; C09K 5/20
See application file for complete search history.

(56) References Cited

U.S. PATENT DOCUMENTS

| 4,291,271 A | 9/1981 | Lauffer | |
|---|---|---|---|
| 8,269,501 B2 * | 9/2012 | Schmidt | G01V 3/26 166/254.2 |

(Continued)

FOREIGN PATENT DOCUMENTS

| WO | WO-2011063023 A2 * | 5/2011 | ......... E21B 47/1015 |
| WO | WO 2011153339 A1 * | 12/2011 | ............ G01V 3/087 |
| WO | 2014/066793 A1 | 5/2014 | |

OTHER PUBLICATIONS (FIPS) Russia's Federal Institute for Intellectual Property, (International Search Authority), International Search Report and Written Opinion for PCT/US2013/066867 dated Mar. 13, 2014. 7 pp.

(Continued)

*Primary Examiner* — Zakiya W Bates
*Assistant Examiner* — Crystal J Miller
(74) *Attorney, Agent, or Firm* — Edwin S. Flores; Daniel J. Chalker; Chalker Flores, LLP

(57) ABSTRACT

A magnetic nanoparticle suitable for imaging a geological structure having one or more magnetic metal or metal oxide nanoparticles with a polymer grafted to the surface to form (Continued)

(a)  (b)  (c)  (d)  (e)

a magnetic nanoparticle, wherein the magnetic nanoparticle displays a colloidal stability under harsh salinity conditions or in a standard API brine.

16 Claims, 36 Drawing Sheets

(56) References Cited

U.S. PATENT DOCUMENTS

| | | | | |
|---|---|---|---|---|
| 2006/0189748 A1* | 8/2006 | Amick | ............ | C09D 133/02 |
| | | | | 524/515 |
| 2007/0039733 A1* | 2/2007 | Welton | ............ | C09K 8/80 |
| | | | | 166/276 |
| 2009/0179649 A1* | 7/2009 | Schmidt | ............ | G01V 3/26 |
| | | | | 324/345 |
| 2009/0288820 A1* | 11/2009 | Barron | ............ | B01J 13/02 |
| | | | | 166/249 |
| 2012/0306501 A1* | 12/2012 | Schmidt | ............ | G01V 3/26 |
| | | | | 324/345 |
| 2013/0105154 A1* | 5/2013 | Vorderbruggen | ....... | E21B 43/04 |
| | | | | 166/271 |
| 2014/0076552 A1* | 3/2014 | Murphy | ............ | C09K 8/035 |
| | | | | 166/265 |
| 2014/0116704 A1* | 5/2014 | Reddy | ............ | C09K 8/035 |
| | | | | 166/300 |
| 2014/0338915 A1* | 11/2014 | Ferm | ............ | E21B 43/26 |
| | | | | 166/307 |
| 2015/0126415 A1* | 5/2015 | Husein | ............ | C09K 8/516 |
| | | | | 507/140 |
| 2016/0304773 A1* | 10/2016 | Reddy | ............ | C09K 8/035 |

OTHER PUBLICATIONS

Marcelo, et al. "Polymer-Coated Nanoparticles by Adsorption of Hydrophobically Modified Poly(N,N-dimethylacrylamide)" J. Phys. Chem. B., published Mar. 15, 2013, 117 (12), pp. 3416-3427.

Paktinat, et al. "Case Studies: Improved Performance of High Brine Friction reducers in Fracturing Shale Reservoirs" SPE 148794, 2011.

Wang, et al. "Polymer coating/encapsulation of nanoparticles using a supercritical anti-solvent process" J. of Supercritical Fluids 28 (2004) 85-99.

Zhu, et al. AIChE 2011 Annual Meeting, Abstract #398g. "Stable nanoparticles for high salinity applications" http://www3.aiche.org/Proceedings/Abstract.aspx?PaperID=233871.

* cited by examiner (a)
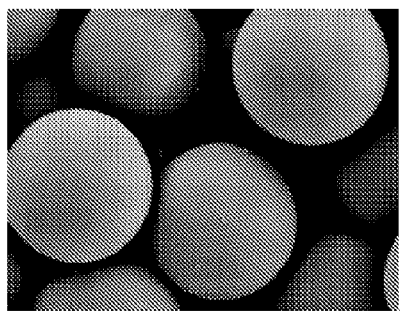
5 µm
(b)
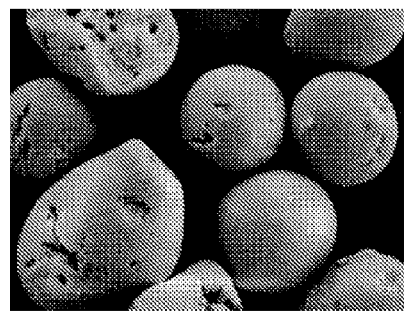
20 µm
FIGURE 8a
FIGURE 8b
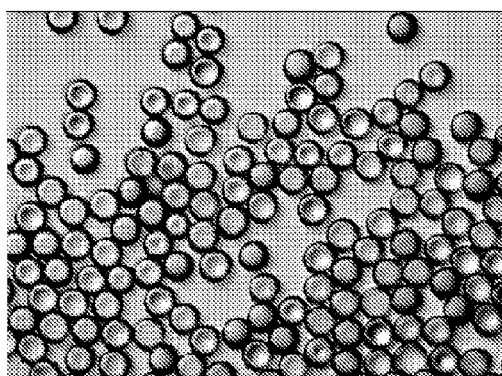
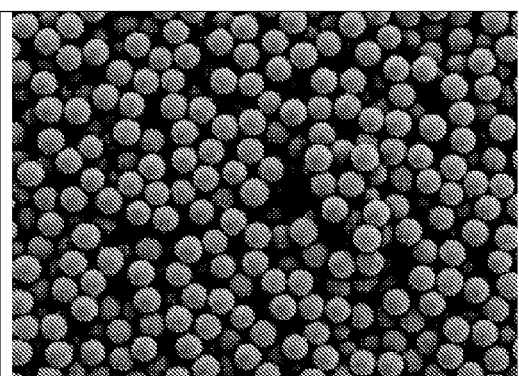
20 µm
FIGURE 9a
FIGURE 9b

POLYMER COATED NANOPARTICLES

CROSS-REFERENCE TO RELATED APPLICATIONS

This application claims priority to, and is the National Stage of International Application No. PCT/US2013/06687 filed on Oct. 25, 2013 and claims priority to U.S. Provisional Patent Application Ser. No. 61/719,255, filed on Oct. 26, 2012. The contents of both applications are hereby incorporated by reference herein in their entirety.

STATEMENT OF FEDERALLY FUNDED RESEARCH

Not Applicable.

THE NAMES OF THE PARTIES TO A JOINT RESEARCH AGREEMENT

Not Applicable.

INCORPORATION-BY-REFERENCE OF MATERIALS FILED ON COMPACT DISC

Not Applicable.

TECHNICAL FIELD

The present disclosure relates generally to methods and compositions used in imaging of geological structures and more specifically to subsurface reservoir imaging under high salinity and/or temperatures conditions using polymer-grafted nanoparticles.

BACKGROUND ART

Without limiting the scope of the invention, its background is described in connection with methods and compositions used in imaging of geological structures. Geological structures have been characterized using electromagnetic methods; however, the majority of these methods have not utilized injected magnetic materials and have typically relied upon the low conductivity and permittivity of petroleum compared to brine, which is usually found concurrently with petroleum in geological structures. In addition, when injected magnetic materials have been used, the high salinities and elevated temperatures of the subsurface reservoirs result in aggregation of the magnetic materials and their adsorption (i.e., the adhesion of atoms, ions, or molecules from a gas, liquid, or dissolved solid to a surface) on mineral surfaces in the subsurface reservoirs. Although, polymer stabilizers have been used they have not provided sufficient electrostatic repulsion and/or are ineffective under the conditions present in the subsurface reservoirs. For example, U.S. Patent Publication Number 2009/0179649, entitled "Methods for Magnetic Imaging of Geological Structures," discloses methods for imaging geological structures including injecting magnetic materials into the geological structures, placing at least one magnetic probe in a proximity to the geological structures, generating a magnetic field in the geological structures, and detecting a magnetic signal. At least one magnetic probe may be on the surface of the geological structures or reside within the geological structures. The methods also include injecting magnetic materials into the geological structures, placing at least one magnetic detector in the geological structures, and measuring a resonant frequency in at least one magnetic detector. Methods for using magnetic materials in dipole-dipole, dipole-loop and loop-loop transmitter-receiver configurations for geological structure electromagnetic imaging techniques are also disclosed.

U.S. Pat. No. 4,291,271, entitled "Method for Determining Pore Size Distribution and Fluid Distribution in Porous Media," discloses determining the pore size distribution and the distribution of fluid in a porous media, such as a reservoir rock formation, by nuclear magnetic resonance spectrometry techniques. A sequence of three radio frequency pulses is applied to a sample which is placed in a large static magnetic field, and the resultant spin echo is measured and utilized to determine the pore size distribution in the porous media. If water is present in the sample, the sample is doped so as to substantially eliminate the nuclear magnetic resonance response of the hydrogen in water. The technique can be utilized to distinguish between hydrocarbon filled and water filled pores in the sample, thus providing information concerning the fluid distribution in the sample.

DISCLOSURE OF ASPECTS OF THE INVENTION

In this disclosure, standard American Petroleum Institute brine ("standard API brine") is composed of 8% wt. NaCl+ 2% wt. $CaCl_2$.

The present disclosure provides a method for assaying a geological structure comprising: injecting a magnetic nanoparticle dispersion into the geological structure wherein the magnetic nanoparticle dispersion comprises one or more magnetic nanoparticles, wherein one or more polymers are grafted to at least a surface of the one or more magnetic nanoparticles to form the magnetic nanoparticle dispersion that maintains a colloidal stability in the geological structure for a period of at least several days; generating a magnetic field in the geological structure with a magnetic probe; and detecting a magnetic signal produced from an interaction of the magnetic field and the magnetic nanoparticle dispersion injected into the geological structure.

The one or more magnetic nanoparticles comprise a magnetic metal oxide nanoparticle, a magnetic metal nanoparticle, or both. The magnetic metal oxide nanoparticle includes iron oxide. The geological structure may be a deposit selected from the group consisting of oil, gas, and combinations thereof. The magnetic nanoparticle dispersion is suitable for maintaining a colloidal stability in an environment comprising a standard API brine. The colloidal stability may be for about 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 4 months, 5 months, 6 months, 7 months, 8 months, 9 months, 10 months, 11 months, 1 year, 2 years, 3 years, 4 years, or more. The one or more magnetic nanoparticles may be iron oxide, iron, cobalt, magnetite, hematite, ferrites selected from nickel ferrite, aluminum ferrite, manganese ferrite, zinc ferrite, and cobalt ferrite, or combinations thereof. The one or more magnetic nanoparticles may be one or more amine-functional groups. The one or more polymers may be a random copolymer, wherein one member of the random copolymer is an acrylic acid monomer. The one or more polymers comprise a first monomer comprising an anchoring group and a second monomer comprising a stabilizing group. The anchoring group may be selected from the group consisting of acrylic acid, methacrylic acid, 4-vinylbenzoic acid, 3-acrylamido-3-methylbutanoate and N-acryloylalanine, and a combination thereof. The stabilizing group may be selected from the group consisting of 2-acrylamido-2-methyl propane sulfonate, vinylsulfonate, 3-sulfopropylmethacrylate, 3-[2-(N-methylacrylamido)-ethyldimethylammonio]propanesulfonate, 3-[N-(2-methacroyloyethyl)-N,N-dimethylammonio]propanesulfonate, and 3-(N,N-dimethylvinylbenzylammonio) propanesulfonate. The ratio of the stabilizing group to the anchoring group may be between about 14% and 95%. The one or more polymers may include a first monomer comprising a sulfonate group and a second monomer comprising an acrylate group. The one or more polymers may include a poly(acrylamido methyl propane sulfonate-co-acrylic acid) polymer. The poly(acrylamido methyl propane sulfonate-co-acrylic acid) polymer has a ratio of about 3:1 of 2-acrylanmido-2-methylpropanesulfonic acid to acrylic acid groups.

A composite suitable for imaging a geological structure comprising: one or more magnetic nanoparticles with a polymer grafted to a magnetic nanoparticle surfaces to form magnetic nanoparticle composites suitable for maintaining a colloidal stability in an environment comprising a standard API brine. The one or more magnetic nanoparticles may include a magnetic metal oxide nanoparticle, a magnetic metal nanoparticle, or both. The magnetic metal oxide nanoparticle comprises iron oxide. The environment may include a temperature from between 20° C. and 200° C. The maintaining of the colloidal stability is for about 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 4 months, 5 months, 6 months, 7 months, 8 months, 9 months, 10 months, 11 months, 1 year, 2 years, 3 years, 4 years, or more. The one or more magnetic nanoparticles may be selected from the group consisting of iron oxide, iron, cobalt, magnetite, hematite, ferrites selected from nickel ferrite, aluminum ferrite, manganese ferrite, zinc ferrite, and cobalt ferrite, and combinations thereof. The one or more magnetic metal nanoparticles may include one or more amine-functional groups. The polymer may include a random copolymer, wherein one member of the random copolymer is an acrylic acid monomer. The polymer may include a first monomer comprising an anchoring group and a second monomer comprising a stabilizing group. The anchoring group may be selected from the group consisting of acrylic acid, methacrylic acid, 4-vinylbenzoic acid, 3-acrylamido-3-methylbutanoate and N-acryloylalanine, and a combination thereof. The stabilizing group may be selected from the group consisting of 2-acrylamido-2-methyl propane sulfonate, vinylsulfonate, 3-sulfopropylmethacrylate, 3-[2-(N-methylacrylamido)-ethyldimethylammonio]propanesulfonate, 3-[N-(2-methacroyloyethyl)-N,N-dimethylammonio]propanesulfonate, and 3-(N,N-dimethylvinylbenzylammonio) propanesulfonate. The ratio of the stabilizing group to the anchoring group may be between about 14% and 95%. The polymer may be a poly(acrylamido methyl propane sulfonate-co-acrylic acid) polymer. The poly(acrylamido methyl propane sulfonate-co-acrylic acid) polymer may have a ratio of about 3:1 of 2-acrylanmido-2-methylpropanesulfonic acid to acrylic acid groups. The one or more of magnetic metal nanoparticles and the polymer may be connected by a covalent bond.

A method of making a composite suitable for imaging a geological structure comprising functionalizing one or more magnetic nanoparticles with an amine functional group; grafting a polymer to surfaces of the one or more magnetic nanoparticles to form one or more magnetic nanoparticle composites that exhibit colloidal stability in standard API brine, wherein the polymer comprises a first monomer comprising an anchoring group and a second monomer comprising a stabilizing group.

The second monomer may include a sulfonate group and the first monomer comprises an acrylate group. The anchoring group may include acrylic acid. The stabilizing group may include 2-acrylamido-2-methyl propane sulfonate. The polymer may be a poly(acrylamido methyl propane sulfonate-co-acrylic acid polymer. The poly(acrylamido methyl propane sulfonate-co-acrylic acid polymer may has a ratio of about 3:1. The grafting may further include an acid catalyzed heat driven amidation between the polymer and the plurality of magnetic metal nanoparticles. The grafting further may include forming multiple amide bonds via a condensation reaction between carboxylate groups on the polymer and amine groups on the surfaces of the plurality of magnetic metal nanoparticles, catalyzed by 1-ethyl-3-(3-dimethylaminopropyl)carbodiimide. The grafting may further include coating acrylic acid to the plurality of amine-functionalized magnetic metal nanoparticles; and performing free radical polymerization of a solution of AMPS monomer and the amine-functionalized magnetic metal nanoparticles coated with the acrylic acid.

Aspects of the present invention provide nanoparticles that can be transported through the harsh salinity and temperatures encountered in subsurface reservoirs to therefore have a major impact on enhanced oil recovery, carbondioxide sequestration, and environmental remediation. For example, an aspect of the present invention provides a steric stabilization of iron oxide ("IO") nanoparticles ("NPs") grafted with poly(acrylamido methyl propane sulfonate-co-acrylic acid or PAMPS-PAA), which not only display colloidal stability in standard API brine at 90° C. for 1 month, but also showed minimal undesirable adsorption on silica surfaces (0.4% monolayer NPs) in standard API brine.

Such stabilization was made possible by the low $Ca^{2+}$ affinity of the PAMPS groups that maintain solvation of PAMPS-PAA copolymer in standard API brine at 90° C. in spite of the well-known precipitation of PAA groups in the presence $Ca^{2+}$. The PAA groups, on the other hand, enabled robust attachment of PAMPS-PAA chains to amine-functionalized IO NPs by formation of multiple amide bonds per the PAMPS-PAA chain that maintained stability even after a 40,000 fold dilution. This approach can be readily adapted to stabilize a variety of other inorganic and organic NPs in environments exhibiting high salinity and temperatures.

According to aspects of the present invention, a series of sulfonated random and block copolymers were adsorbed on the surfaces of ~100 nm iron oxide ("IO") nanoclusters to provide colloidal stability in extremely concentrated brine composed of standard API brine at 90° C. A combinatorial materials chemistry approach, which employed $Ca^{2+}$-mediated adsorption of anionic acrylic acid-containing sulfonated polymers to pre-formed citrate-stabilized iron oxide ("IO") nanoclusters, enabled the investigation of a large number of polymer coatings. Initially, a series of poly(2-methyl-2-acrylamidopropanesulfonate-co-acrylic acid) ("PAMPS-PAA") (1:8 to 1:1 mol.:mol.), poly(styrenesulfonate-block-acrylic acid) (2.4:1 mol.:mol.), and poly(styrenesulfonate-alt-maleic acid) (3:1 mol.:mol.) copolymers were screened for solubility in standard API brine at 90° C. The ratio of 2-acrylanmido-2-methylpropanesulfonic acid ("AMPS") to acrylic acid ("AA") groups was varied to balance the requirement of colloid dispersibility at high salinity (provided by AMPS) against the need for anchoring of the polymers to the iron oxide surface (via the AA). IO NPs coated with PAMPS-PAA (1:1 mol.:mol.) exhibited colloidal stability in standard API brine at room temperature and 90° C., for up to one month. The particles were characterized before and after coating at ambient and elevated temperatures by a variety of techniques including colloidal stability experiments, dynamic light scattering, zeta potential, and thermogravimetric analysis.

Aspects of the present invention provide nanoparticles that are designed for colloidal stability and transport through a medium. Stable magnetic particle dispersions at high salinity with inexpensive polymers (e.g., sulfonated polymers) form colloidal dispersions to facilitate injection and transport through porous media, where one mechanism is electrosteric stabilization. Nanoparticles according to aspects of the present invention may be used to optimize polymer molecular weight ("MW") and coating thickness (e.g., hydrodynamic diameters 3 to 10 nm) to reduce cost, but yet provide sufficient colloid stabilization. The permanent attachment of stabilizer to particle surface at dilute reservoir conditions with a general combinatorial materials technique as disclosed herein is applicable to a wide range of particles. Aspects of the present invention provide for the prevention of stabilizer desorption from the particles surface by chemical crosslinking of the stabilizer to fix it in place. Aspects of the present invention also provide for the covalent grafting of polymers to functionalized nanoparticles and nanoparticles that have very low adsorption on anionic rock surfaces (e.g., negative charge on sulfonates, carboxylates) even at high salinities, including standard API brine. Aspects of the present invention also provide for tuning of magnetic nanoparticle adsorption on rock surfaces via the composition of the surface coating to facilitate imaging of the rock wettability (wettability describes the preference of a solid (e.g., rock or mineral surfaces) to be in contact with one fluid rather than another (e.g., either oil or water); see, e.g., W. Abdallah et al., "Fundamentals of Wettability," Oilfield Review, Summer 2007, pages 44-61, which is hereby incorporated by reference herein).

Aspects of the present invention provide magnetic nanoparticle composites for imaging a geological structure having a plurality of magnetic metal or metal oxide nanoparticles with polymers grafted to the surfaces of the magnetic metal or metal oxide nanoparticles to form magnetic nanoparticle composites suitable for maintaining a colloidal stability in a harsh salinity environment within the geological structure or in a standard API brine.

The magnetic nanoparticle composites are further suitable for maintaining a colloidal stability under harsh temperature conditions in the geological structure from between 20° C. and 200° C. and/or the colloidal stability may be maintained for about 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 4 months, 5 months, 6 months, 7 months, 8 months, 9 months, 10 months, 11 months, 1 year, 2 years, 3 years, 4 years or more.

The one or more magnetic nanoparticle composites may comprise iron oxide, iron, cobalt, magnetite, hematite, ferrites selected from nickel ferrite, aluminum ferrite, manganese ferrite, zinc ferrite, and cobalt ferrite, and combinations thereof and may include one or more functional groups. The one or more magnetic nanoparticle composites may include one or more amine-functional groups.

The polymer grafted to the magnetic nanoparticles may be a random copolymer, wherein a member of the random copolymer is an acrylic acid monomer. The polymer may be a first monomer comprising an anchoring group and a second monomer comprising a stabilizing group. For example, the anchoring group may be acrylic acid, methacrylic acid, 4-vinylbenzoic acid, 3-acrylamido-3-methylbutanoate, and/or N-acryloylalanine, or a combination thereof. The stabilizing group may be 2-acrylamido-2-methyl propane sulfonate, vinylsulfonate, 3-sulfopropylmethacrylate, 3-[2-(N-methylacrylamido)-ethyldimethylammonio]propanesulfonate, 3-[N-(2-methacroyloyethyl)-N,N-dimethylammonio]propanesulfonate, and/or 3-(N,N-dimethylvinylbenzylammonio) propanesulfonate, or a combination thereof. The polymer may have between 200 to 3000 repeat units of the anchoring group and/or the stabilizing group. The ratio of the stabilizing group to the anchoring group may be between about 14% and 95%. The polymer may include a first monomer comprising a sulfonate group and a second monomer comprising an acrylate group. The polymer may have a degree of polymerization of between about 500 and 3000. For example, the polymer may be a poly(acrylamido methyl propane sulfonate-co-acrylic acid) polymer. The poly(acrylamido methyl propane sulfonate-co-acrylic acid) polymer may have a ratio of about 3:1. The magnetic nanoparticles and the polymer may be connected by a covalent bond (e.g., an amide bond).

Aspects of the present invention provide a method of making magnetic nanoparticle composites for imaging a geological structure by forming magnetic metal or metal oxide nanoparticles; functionalizing the magnetic metal or metal oxide nanoparticles with one or more amine functional groups; providing a polymer comprising a first monomer comprising an anchoring group and a second monomer comprising a stabilizing group of one or more acrylic acid monomers; and forming covalent bonds (e.g., amide bonds) between the polymer and the magnetic metal or metal oxide nanoparticles to graft the polymer to the surfaces of the magnetic metal or metal oxide nanoparticles to form the magnetic nanoparticle composites suitable for maintaining colloidal stability under a harsh salinity environment of the geological structure or in a standard American Petroleum Institute brine.

The magnetic nanoparticle may also be suitable for maintaining a colloidal stability under high temperature conditions. The first monomer may be a sulfonate group and the second monomer may be an acrylate group. The method of making the magnetic nanoparticle composites may also comprise forming a random copolymer from the first monomer having an anchoring group and the second monomer having a stabilizing group. The anchoring group may be acrylic acid, methacrylic acid, 4-vinylbenzoic acid, 3-acrylamido-3-methylbutanoate, and/or N-acryloylalanine, or a combination thereof. The stabilizing group may be 2-acrylamido-2-methyl propane sulfonate, vinylsulfonate, 3-sulfopropylmethacrylate, 3-[2-(N-methylacrylamido)-ethyldimethylammonio]propanesulfonate, 3-[N-(2-methacroyloyethyl)-N,N-dimethylammonio] propanesulfonate, and/or 3-(N,N-dimethylvinylbenzylammonio) propanesulfonate, or a combination thereof. The polymer may have between 200 to 3000 repeat units of the anchoring group and/or the stabilizing group. The ratio of the stabilizing group to the anchoring group may comprise between about 14% and 95%. The polymer may have a degree of polymerization of between about 500 and 3000. The polymer may be a poly(acrylamido methyl propane sulfonate-co-acrylic acid) polymer. The poly(acrylamido methyl propane sulfonate-co-acrylic acid) polymer may include a ratio of about 3:1.

Aspects of the present invention provide a method for assaying a geological structure by providing magnetic metal or metal oxide nanoparticles with a polymer grafted to surfaces of the magnetic metal or metal oxide nanoparticles to form magnetic nanoparticle composites; combining the magnetic nanoparticle composites with a fluid to form a magnetic nanoparticle dispersion, wherein the magnetic nanoparticle dispersion is suitable for maintaining a colloidal stability under harsh salinity conditions within the geological structure or in a standard API brine; injecting the magnetic nanoparticle dispersion into the geological structure; placing at least one magnetic probe in a proximity to the geological structure; generating a magnetic field within the geological structure with the at least one magnetic probe; and detecting a magnetic signal resulting from the magnetic field generated within the geological structure.

The geological structure may comprise a deposit selected from the group consisting of oil, gas, and combinations thereof. The geological structure may be penetrated by at least one vertical wellbore, at least one horizontal wellbore, or a combination thereof. The magnetic nanoparticle dispersion may migrate from the injection site into the geological structure up to 2 m, 5 m, 10 m, 20 m, 50 m, 100 m, 150 m, 200 m, 250 m, 300 m, 350 m, 400 m, 450 m, 500 m, or more, or 15 cm, 30 cm, 100 cm, 1 m, or more into a core sample of a geological structure. The magnetic nanoparticle dispersion may have a retention of between 0.01 and 5 mg/m$^2$. The magnetic nanoparticle dispersion may have a retention of about 0.01, 0.05, 0.1, 0.2, 0.3, 0.4, 0.5, 0.6, 0.7, 0.8, 0.8, 0.9, 1.0, 1.5, 2, 2.5, 3, 4, or 5 mg/m$^2$. For example, the magnetic nanoparticle dispersion may have a retention of about 0.01, 0.05, 0.1, 0.2, 0.3, 0.4, 0.5, 0.6, 0.7, 0.8, 0.8, 0.9, 1.0, 1.1, 1.2, 1.3, 1.4, 1.5, 1.6, 1.7, 1.8, 1.8, 1.9, 2.0, 2.1, 2.2, 2.3, 2.4, 2.5, 2.6, 2.7, 2.8, 2.8, 2.9, 3.0, 3.1, 3.2, 3.3, 3.4, 3.5, 3.6, 3.7, 3.8, 3.8, 3.9, 4.0, 4.1, 4.2, 4.3, 4.4, 4.5, 4.6, 4.7, 4.8, 4.8, 4.9, 5.0, 5.1, 5.2, 5.3, 5.4, 5.5, 5.6, 5.7, 5.8, or 5.9 mg/m$^2$, or incremental variations thereof.

Aspects of the present invention provide magnetic nanoparticle composites suitable for transport through a porous media, wherein the magnetic nanoparticle composites comprise magnetic metal or metal oxide nanoparticles with a polymer grafted to the surfaces of the magnetic metal or metal oxide nanoparticles to form the magnetic nanoparticle composites, wherein the polymer comprises a first monomer comprising an anchoring group and a second monomer comprising a stabilizing group, and wherein the magnetic nanoparticle composites are suitable for maintaining a colloidal stability under harsh salinity conditions within the porous media or within a standard API brine, and wherein the magnetic nanoparticle composites have a particle adsorption that is sufficiently low that the magnetic nanoparticle composites migrate into the porous media. The magnetic nanoparticle composites may migrate up to 2 m, 5 m, 10 m, 20 m, 50 m, 100 m, 150 m, 200 m, 250 m, 300 m, 350 m, 400 m, 450 m, 500 m, or more into the porous media, or 15 cm, 30 cm, 100 cm, 1 m, or more into a core sample of a porous media, and/or have a retention of between 0.01 and 5 mg/m$^2$. For example, the magnetic nanoparticle composites may have a retention of about 0.01, 0.05, 0.1, 0.2, 0.3, 0.4, 0.5, 0.6, 0.7, 0.8, 0.8, 0.9, 1.0, 1.5, 2, 2.5, 3, 4, or 5 mg/m$^2$. Aspects of the present invention provide magnetic nanoparticle composites for altering the wettability of a porous media, wherein the magnetic nanoparticle composites comprise magnetic metal or metal oxide nanoparticles with a polymer grafted to the surfaces of the magnetic metal or metal oxide nanoparticles to form the magnetic nanoparticle composites, wherein the polymer comprises a first monomer comprising an anchoring group selected from the group consisting of acrylic acid, methacrylic acid, 4-vinylbenzoic acid, 3-acrylamido-3-methylbutanoate, and N-acryloylalanine, or a combination thereof, wherein the polymer further comprises a second monomer comprising a stabilizing group selected from the group consisting of 2-acrylamido-2-methyl propane sulfonate, vinylsulfonate, 3-sulfopropylmethacrylate, 3-[2-(N-methylacrylamido)-ethyldimethylammonio]propane sulfonate, 3-[N-(2-methacroyloyethyl)-N,N-dimethylammonio]propanesulfonate, and 3-(N,N-dimethylvinylbenzylammonio) propanesulfonate, or a combination thereof, and wherein the magnetic nanoparticle composites have a retention of between 1 and 80 mg/m$^2$ in the porous media.

DESCRIPTION OF THE DRAWINGS

For a more complete understanding of the features and advantages of aspects of the present invention, reference is now made to the detailed description along with the accompanying figures and in which:

FIG. 1a shows a chemical structure of poly(acrylic acid) ("PAA"), FIG. 1b shows a chemical structure of poly(maleic acid) ("PMA"), FIG. 1c shows a chemical structure of poly(butyl acrylate) ("PBA"), FIG. 1d shows a chemical structure of poly(styrenesulfonate) ("PSS"), and FIG. 1e shows a chemical structure of poly(2-acrylamido-2-methylpropanesulfonate) ("PAMPS").

FIG. 3a shows a chemical structure of hexanediamine, FIG. 3b shows a chemical structure of polypropylene glycol triamine ethers with six (PPG-6 triamine) and 30 (PPG-30 triamine) polypropylene groups, FIG. 3c shows a chemical structure of melamine, and FIG. 3d shows a chemical structure of a series of three polyethylene glycol diamines (PEG-2, PEG-33, and PEG-113 diamine).

FIGS. 8a-8b are SEM images of 8 μm colloidal silica spheres and 20-30 μm VYDAC® 101TPB2030 Silica, respectively, that were used as substrates for studying batch adsorption of nanoparticles in standard API brine.

FIG. 9a is a bright-field optical image of colloidal non-porous 8 μm silica spheres showing highly uniform particles.

FIG. 9b is a SEM micrograph of colloidal non-porous 8 μm silica spheres showing highly uniform particles.

FIG. 16a is digital image of the samples, FIG. 16b is a plot of the constant hydrodynamic diameters $D_H$ of the samples in standard API brine, and FIG. 16c is a digital image showing that after a serial dilution test to drive polymer desorption, PAMPS-PAA (3:1) grafted IO NPs remained stable at 0.2% wt. IO in standard API brine at 90° C. (left glass container), whereas IO NPs with electrostatically attached PAMPS-PAA aggregated (right glass container).

FIG. 28a shows digital images of the colloidal stability of PSS-b-PAA coated IO clusters in various saline conditions.

FIG. 28b is a graph of the hydrodynamic diameters measured by dynamic light scattering ("DLS") of the samples shown in FIG. 28a.

FIG. 29a shows a ratio of 5:1. FIG. 29b shows a ratio of 10:1. FIG. 29c shows a ratio of 20:1.

FIG. 44b is an image of an optical microscope photograph at 10× zoom of a LH IO-POEOMA (poly(oligo(ethyleneoxide)monomethyl ether methacrylate) grafted iron oxide particle clusters) emulsion sample diluted with synthetic seawater ("SSW") ("LH" represents Low grafting density and High molecular weight).

DETAILED DESCRIPTION

Figures 1A, 1B, 1C, 1D, 1E:
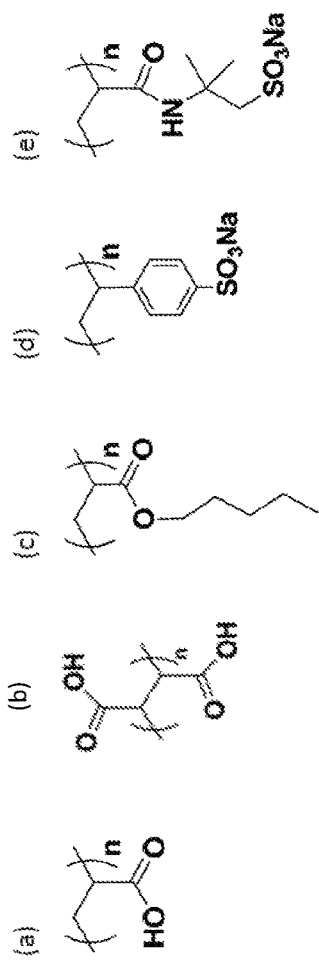
FIGS. 1a-1e show chemical structures of various building blocks for sulfonic acid copolymers, where

While the making and using of various aspects of the present invention are discussed herein, it should be appreciated that aspects of the present invention provide many applicable inventive concepts that can be embodied in a wide variety of specific contexts. The embodiments discussed herein are merely illustrative of ways to make and use the aspects of the present invention and do not delimit the scope of the invention.

To facilitate the understanding of the aspects of the present invention, a number of terms are defined below. The terminology herein is used to describe specific embodiments of the invention, but their usage does not delimit the invention. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As disclosed herein, a colloid is a substance microscopically dispersed throughout another substance, i.e., a colloidal dispersion. The stability of a colloidal system is the capability of the system to remain as it is. Stability is hindered by aggregation and sedimentation phenomena, which are driven by the colloids tendency to reduce surface energy. Reducing the interfacial tension will stabilize the colloidal system by reducing this driving force. Aggregation is due to the sum of the interaction forces between particles. If attractive forces (such as van der Waals forces) prevail over the repulsive ones (such as the electrostatic ones), particles aggregate in clusters.

Electrostatic stabilization and steric stabilization are two primary mechanisms for stabilization against aggregation. Electrostatic stabilization is based on the mutual repulsion of like electrical charges. In general, different phases have different charge affinities, so that an electrical double layer forms at any interface. Small (e.g., nanoscale) particle sizes lead to enormous surface areas, and this effect is greatly amplified in colloids. In a stable colloid, the mass of a dispersed phase is so low that its buoyancy or kinetic energy is too weak to overcome the electrostatic repulsion between charged layers of the dispersing phase. Steric stabilization comprises covering the particles in polymers, which prevents the particles to get close in the range of attractive forces. A combination of the two mechanisms is also possible (electrosteric stabilization). All the above mentioned mechanisms for minimizing particle aggregation rely on the enhancement of the repulsive interaction forces. In other words, colloidal stability in a colloidal suspension requires repulsive forces between colliding particles so that they do not aggregate. See, definition of a "colloid" at http://en.wikipedia.org/wiki/Colloid.

Aspects of the present invention provide a copolymer-coated stabilization of magnetic nanoclusters in an environment exhibiting high ionic strength and/or high temperature. Electrosteric stabilization of copolymer-coated nanoparticles is uncommon for high monovalent salinity (up to 5 M NaCl), and rarely reported for concentrated divalent cations. However, high mono- and divalent-concentrations are routinely encountered in subsurface applications, including electromagnetic imaging and oil recovery.

Stabilization of nanoparticles at high calcium salinity, especially at high temperatures (e.g., up to 100° C.), is challenging because of the high counterion association of calcium with anionic polymer stabilizers. With a goal of identifying a suitable polymer for NP stabilization in such high calcium, high temperature conditions, a combinatorial study was conducted by coating various compositions of acrylic/sulfonic acid copolymers on platform citrate-coated iron oxide ("IO") nanoclusters. Studies were conducted by selective choice of coating parameters (e.g., pH, concentration and type of electrolytes, temperature and polymer concentration). Based on these results, a select class of sulfonic acid copolymers was determined to provide nanoparticle stability in standard API brine for at least 3 weeks at 90° C. The disclosure herein describes electrosteric stabilization at these unusually harsh conditions. This enhanced stability enables the determination of NPs for various applications including, oil and/or gas exploration and production.

Aspects of the present invention provide adsorption of acrylic/sulfonic acid copolymer-coated iron oxide nanoclusters on silica microspheres at high divalent salinity. Minimizing the adsorption of engineered nanoparticles ("NPs") on rock surfaces is important for feasibility of subsurface applications and/or the environmental fate of NPs. Natural subsurface reservoir brines often have high salinity, including the presence of significant divalent cations including calcium, that lead to strong NP adsorption. Identified was a class of acrylic/sulfonic acid copolymer-coated iron oxide ("IO") nanoclusters that display enhanced colloidal stability in the presence of divalent cations. Disclosed herein is a combinatorial approach to study batch adsorption of IO coated with different polymers on silica microsphere models at various salinity and pH values. The isotherms provide the adsorption capacity and equilibrium adsorption constants for various conditions. Discovered was that a low adsorption capacity from these batch studies is an important condition for successful transport of the NPs in flow studies. Thus, in addition to providing the equilibrium adsorption capacity, the batch isotherms also save time for guiding the more laborious/expensive flow studies.

The design of metal and/or metal oxide nanoparticles that form stable colloidal suspensions in extremely concentrated brine and adsorb weakly on surfaces such as silica is of interest in controlling nanoparticle transport in porous media. As disclosed hereinafter, various copolymers containing acrylic acid and either 2-acrylamido-2-methylpropanesulfonate or styrenesulfonate functionalities were synthesized and coated on iron oxide nanoclusters to provide colloidal stability as well as to control the adsorption on silica in standard API brine. The nanocluster surface properties were further modified by coupling the acrylic acid groups in the copolymers with a series of diamines and triamines. The specific adsorption on colloidal silica microparticles ranged from <1 mg/m$^2$ for highly charged hydrophilic surfaces on the iron oxide particles to 22 mg/m$^2$ for the more hydrophobic amine-modified surfaces, corresponding to monolayer coverages from 0.2% to 11.5%, respectively. The specific adsorption (mg-IO/m$^2$-silica), monolayer coverage, and parameters for Langmuir isotherms are compared for IO nanoclusters as a function of the properties of the copolymers on their surfaces. The adsorption of nanoparticles on substrates is of fundamental and practical interest in a wide range of fields including catalysis, environmental remediation, and sensors.

Furthermore, this fundamental knowledge of nanoparticle adsorption is of broad practical interest, in particular, for transport of inorganic nanoparticles through porous subsurface reservoirs relevant to imaging and oil recovery. Recently, there has been great interest in using nanoparticles as contrast agents and sensors in imaging of geological structures (e.g., subsurface reservoirs) of interest in oil exploration. In these reservoirs, extremely high salinities are often encountered, for example, NaCl concentrations are often >5% wt., and CaCl$_2$ concentrations may reach 1-2% wt. or more. The extreme salinity reduces the thickness of double layers on charged particles, which weakens the electrostatic repulsion between the nanoparticles and the like-charged mineral surfaces. The weak electrostatic interactions often cause aggregation of nanoparticles (i.e., unstable suspensions) and strong nanoparticle adsorption on mineral surfaces, which would be detrimental to nanoparticle transport through the porous media in geological structures.

Most studies of nanoparticle adsorption on mineral surfaces and transport through porous media have examined salinities up to a maximum of a few hundred mM. A number of studies have investigated bare fullerene particles, the initial deposition rates of C60 fullerenes using a quartz crystal microbalance with dissipation monitoring ("QCM- D") in up to 100 mM NaCl or 3 mM $CaCl_2$, and found that higher salinities caused more rapid particle deposition. Furthermore, $CaCl_2$ induced adsorption to a greater degree than NaCl. Carboxyl-functionalized single-walled carbon nanotubes ("SWNT") in a column packed with quartz sand at salinities up to 55 mM KCl showed a strong increase in particle retention with salinity. C60 fullerenes with both batch and column studies on Ottawa sand and glass beads with 1 mM $CaCl_2$ have been studied. Even at this relatively low $CaCl_2$ concentration, relative to values often on the order of a few molar in subsurface oil reservoirs of interest in the current study, the deposition of particles increased 19 fold compared to adsorption in DI water. These batch adsorption values for C60 were in qualitative agreement of relative particle deposition levels in column studies.

The deposition of nanoparticles on mineral surfaces has been investigated for particles coated with carboxymethyl cellulose ("CMC"), poly(acrylic acid) ("PAA"), mixtures of PAA and poly(styrenesulfonate) ("PSS"), and triblock copolymers of poly(methacrylic acid) ("PMAA"), poly(methyl methacrylate) ("PMMA"), and PSS. At low ionic strength (≤200 mM ionic strength), the addition of the polymers to the bare particles in these studies were shown to decrease particle deposition on mineral surfaces in packed columns or two-dimensional ("2D") sandpacks. Unusually high salinities were investigated using PMAA-b-PMMA-b-PSS coatings for control of iron particle transport in sandpacks and deposition on a silica QCM-D detector with up to 1 M NaCl or 40 mM $CaCl_2$. According to Derjaguin-Landau-Verwey-Overbeek ("DLVO") theory, electrosteric repulsion between the particle and the substrate may be needed to mitigate particle deposition, and not just purely electrostatic repulsion.

Objectives of disclosed aspects of the present invention were to control the equilibrium adsorption of polymer-stabilized iron oxide nanoclusters on model silica microparticles in standard API brine. The composition of the polymer stabilizer was varied to achieve very low levels of nanocluster adsorption down to 1% of a monolayer for an IO concentration of ~0.2% wt. Referring to FIGS. 1a-1e, polymer coatings adsorbed on the iron oxide surfaces were comprised of PAA (see FIG. 1a), poly(maleic acid) ("PMA") (see FIG. 1b), poly(butyl acrylate) ("PBA") (see FIG. 1c), PSS (see FIG. 1d), and poly(2-acrylamido-2-methylpropanesulfonate) ("PAMPS") (see FIG. 1e) with various ratios of monomers in random, block, and alternating nanostructures or microstructures. As evidenced by batch measurements, the effects of nanocluster concentration, pH, and salinity on equilibrium nanocluster adsorption on silica microparticles were determined and rationalized in terms of the nanoparticle-silica interactions. It was observed that as the amount of a given polymer coating on the nanocluster surface increased, the nanocluster adsorption decreased. Additionally, the nanocluster adsorption was further tuned by modifying the surfaces of the coated particles with a series of diamines and triamines via condensation reactions with the carboxylate functional groups, which resulted in a range of particle hydrophobicities. The changes in these properties enabled tunability of the adsorption level from <1 mg/m$^2$ for highly charged hydrophilic surfaces to 22 mg/m$^2$ for more hydrophobic modified surfaces, while maintaining the colloidal stability of the particles in standard API brine. Furthermore, the specific adsorption (mg-IO/m$^2$-silica), monolayer coverage, and parameters for Langmuir isotherms were compared for the IO nanoclusters with a wide variety of coatings.

The materials utilized were as follows: Calcium chloride dihydrate, sodium chloride, hydrochloric acid, sodium hydroxide, melamine, PEG-2 diamine (1,8-Diamino-3,6-dioxaoctane), 1,6-hexanediamine, PEG-33 diamine (poly (ethylene glycol) bis(3-aminopropyl) terminated), PEG-113 diamine (item number NH2-PEG5000-NH2 commercially available from JenKem Technology), and 1-ethyl-3-(3-dimethylaminopropyl)carbodiimide ("EDC") were commercially obtained from commercial sources and used as received. PPG-6 (Jeffamine T403) and PPG-30 (Jeffamine T5000) are commercially available from Huntsman Corporation and were used as received. Monomers t-butyl acrylate ("tBA") and styrene were purchased from commercial sources and filtered through a short plug of basic alumina to remove the 4-methoxyphenol ("MEHQ") stabilizer and were degassed by bubbling with dry nitrogen for 15 minutes prior to use. N,N,N',N',N-pentamethyldiethylenetriamine, ethyl 2-bromoisobutyrate, acrylic acid, potassium persulfate, and sodium metabisulfite were obtained from commercial sources and used as received. The monomer 2-amino-2-methylpropanesulfonate ("AMPS") is commercially available from Lubrizol Corporation and was used as received. Deionized water from a Barnstead Nanopure system was used for studies.

Synthesis of poly(2-acrylamido-3-methylpropanesulfonate-co-acrylic acid) ("PAMPS-PAA"): The PAMPS-PAA copolymers were synthesized by the following general procedure, with varying amounts of reagents given in Table 1.

TABLE 1

| Polymer | AA (mmol) | AMPS (mmol) | $K_2S_2O_8$ (mmol) | $NaS_2O_5$ (mmol) | Polymer Yield (g) |
|---|---|---|---|---|---|
| 1:2 PAA-PAMPS | 2.4 | 4.8 | 0.72 | 0.72 | 1.1 |
| 2:1 PAA-PAMPS | 6.9 | 3.3 | 0.51 | 0.51 | 1.2 |

A three-necked round bottom flask equipped with a magnetic stir bar, a nitrogen inlet, and a reflux condenser was charged with an AMPS monomer, potassium persulfate, and sodium metabisulfite under an atmosphere of nitrogen. The flask was sealed with rubber septa, and deionized water that was previously degassed by bubbling with nitrogen for 30 minutes was added via a nitrogen-purged syringe or a cannula to the reaction flask, such that the concentration of monomer was 1.0 M. With constant stirring, acrylic acid was added to the reaction flask via a nitrogen-purged syringe. The flask was placed in an oil bath maintained at 80° C. and stirred at that temperature for 16 hours. The reaction mixture was then cooled to room temperature and the water was removed under reduced pressure. The resulting white solid was then dried under reduced pressure until a constant mass was reached.

Synthesis of poly((t-butylacrylate-co-n-butylacrylate)-b-styrene") ("PtBA-PnBA-PS"): Under an atmosphere of nitrogen, an oven-dried 50 mL Schlenk flask with a magnetic stir bar was charged with 320 mg (2.2 mmol) of copper(I) bromide. The flask was sealed with a rubber septum secured with copper wire and was evacuated and backfilled with nitrogen three times before 4.8 mL (33.3 mmol) of n-butyl acrylate and 4.9 mL (33.3 mmol) of tert-butyl acrylate were added via gas-tight syringes that had been purged with nitrogen. After one freeze-pump-thaw cycle, 0.5 mL (2.4 mmol) of N,N,N',N',N-pentamethyldiethylenetriamine was added via a nitrogen-purged gas-tight syringe. After a second freeze-pump-thaw cycle, 105 µL (0.72 mmol) of ethyl 2-bromoisobutyrate was added via a gas-tight syringe that had been purged with nitrogen. After two more freeze-pump-thaw cycles, the reaction mixture was allowed to return to ambient temperature, and the reaction flask was backfilled with nitrogen and placed in an oil bath at 50° C. The reaction mixture was allowed to stir for 4.5 hours after which an aliquot was removed from the reaction and analyzed by gel permeation column chromatography ("GPC") ($M_n$=9976, $M_w/M_n$=1.24) prior to addition of 5.8 mL (50.6 mmol) of styrene. After a further 18 hours of stirring at 50° C., the reaction mixture was cooled to room temperature, taken up into tetrahydrofuran ("THF") and passed through a plug of neutral alumina to remove the metal/ligand catalyst system. The resulting polymer solution was concentrated under reduced pressure and purified by precipitation into a mixture of methanol and water (1/1, v/v).

Synthesis of poly((acrylic acid-co-n-butylacrylate)-b-sytrenesulfonate) ("(PAA-PBA)-b-PSS"): A 1 L round bottom flask was charged with PtBA-PnBA-PS (prepared per the process previously described) dissolved in 300 mL of chloroform. In a separate flask with a stir bar, a solution of 80 mL of acetic anhydride in 100 mL of chloroform was cooled to 0° C. Concentrated sulfuric acid (45 mL) was added dropwise, and the mixture was stirred at 0° C. for a further 10 minutes before it was added to the flask containing the polymer solution. The reaction mixture was heated to 60° C. and stirred for 16 hours, then was cooled to room temperature and slowly poured into methanol. The solution was neutralized by slow addition of 3.0 M NaOH, and the organic solvents were removed under reduced pressure. The resulting aqueous solution was loaded into dialysis tubing and dialyzed against DI water for 3 days. After dialysis, the desired polymer was isolated as an orange glassy solid by concentration and drying under reduced pressure (11.0 g, 46% yield over 2 steps).

Synthesis of citrate-stabilized iron oxide nanoclusters: Iron oxide nanoclusters were synthesized by a standard coprecipitation approach.

Polymer coating of citrate-stabilized iron oxide nanoclusters: The citrate-stabilized iron oxide nanoclusters were coated with copolymer stabilizers. Anionic copolymers were adsorbed to negatively charged iron oxide nanoparticles through the mediation of $Ca^{2+}$ divalent ion bridging. A polymer solution at pH 7 and a concentrated $CaCl_2$ solution were mixed together, and a citrate-stabilized iron oxide dispersion was added to the mixture while stirring. The reaction mixture with a final concentration of 1% iron oxide, 5% polymer, and 5% $CaCl_2$ was heated to 90° C. under vigorous stirring. After 1 hour, the reaction mixture was cooled to room temperature, and the polymer-coated iron oxide nanoparticles were separated and washed with DI water twice to remove excess polymer and $CaCl_2$. Polymer coating with PSS-PMA (3:1) and (PAA-PBA)-b-PSS (1:1:2) was performed by a one-step addition during the coprecipitation of the IO.

Modification of polymer coating with amines: Amines were reacted with carboxylate functional groups in the polymer coating to form amide linkages with 1-ethyl-3-(3-dimethylaminopropyl)carbodiimide ("EDC") as the catalyst. A stock dispersion of polymer-coated iron oxide nanoparticles was diluted with DI water to reach a final concentration of 1% (w/v). A 10 mg/mL aqueous solution of EDC was then quickly injected to the dispersion of polymer-coated iron oxide nanoparticles with vigorous magnetic stirring, followed by quick addition of a 10 mg/mL aqueous solution of the modifier. The number of amines added to the solution relative to the number of carboxylate groups on the polymer ([$NH_2$]/[$COO^-$], by mole) was varied from 0.1% to 100% to vary the properties of the polymer coating. The reaction mixture was stirred at room temperature for another 24 hours. The excess modifier and EDC were removed by centrifugation of the mixture at 10,000 rpm for 20 minutes and washed with DI water twice. The final dispersion was formed in DI water with probe sonication.

Figures 3A, 3B, 3C, 3D:
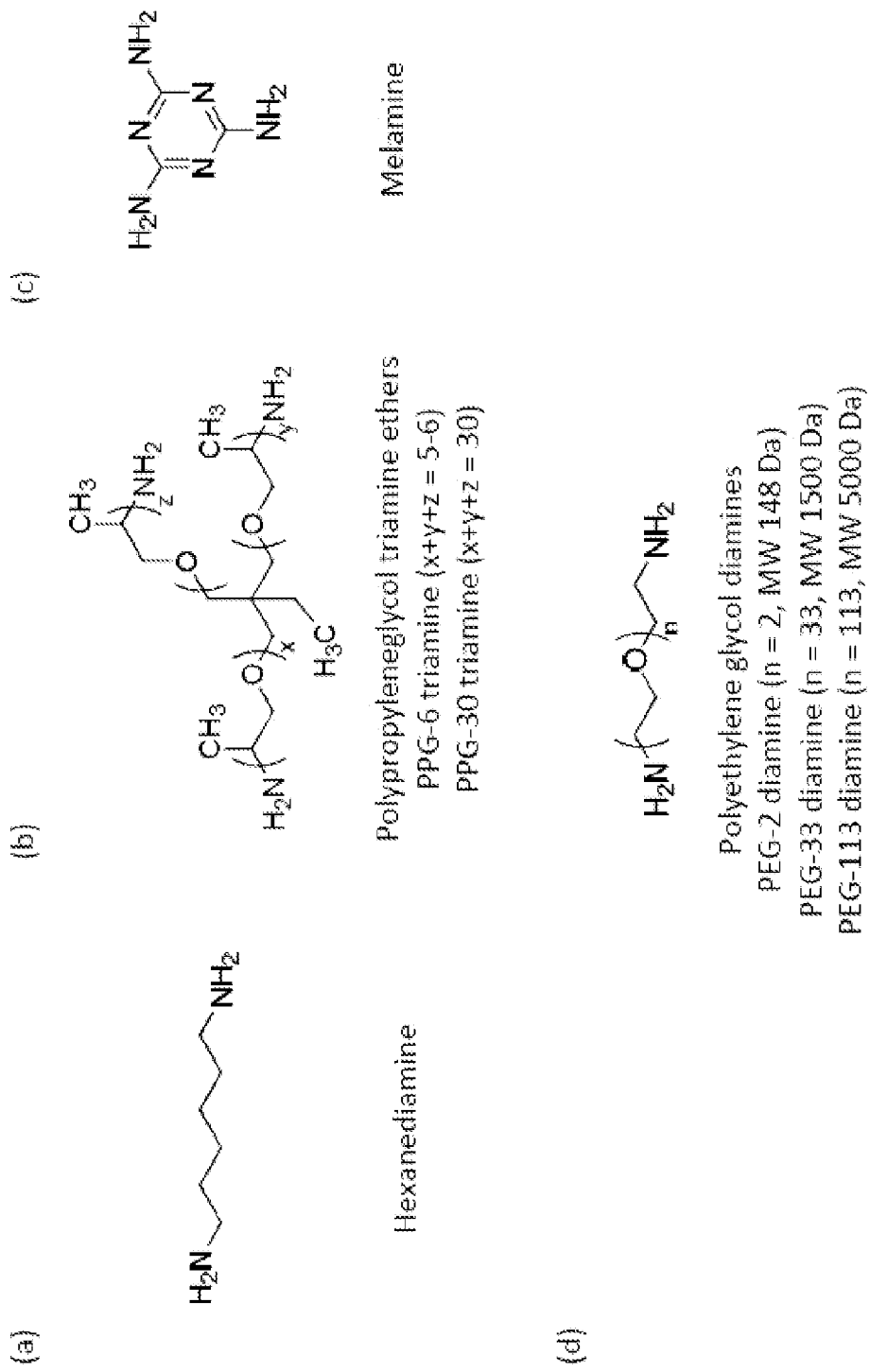
FIGS. 3a-3d show chemical structures of amine modifiers, where

The total number of carboxylate groups in the polymer coating was calculated based on the weight fraction of polymer coating in dried iron oxide nanoparticles from the TGA data and the known fraction of AA in the polymer. The ratio of EDC to carboxylate groups in the monomer was chosen as unity. The various types of amine functionalized modifiers utilized are shown in FIGS. 3a-3d and include 1,6-hexanediamine (FIG. 3a), melamine (FIG. 3c), a series of poly(ethyleneglycol) diamines (PEG-2, PEG-33, and PEG-113 diamines) (FIG. 3d), and two poly(prolyeneglycol) triamines (PPG-6 and PPG-30 triamines) (FIG. 3b).

Adsorption of polymer-coated iron oxide nanoclusters on silica: A batch technique was used to measure the nanocluster adsorption on silica microparticles including 8 µm colloidal silica microspheres (see FIG. 8a) (product number SIOP800-01-1KG commercially obtained from Fiber Optic Center Inc., New Bedford, Mass.) and VYDAC® silica particles (see FIG. 8b) (product number 101TPB2030 commercially obtained from Grace, Deerfield, Ill.). The colloidal silica was washed at least five times with DI water to remove fines. Scanning electron microscopy was used to characterize the morphology of silica substrates using a Zeiss Supra 40VP Scanning Electron Microscope equipped with an in-lens secondary electron detector. The samples were prepared by drying several drops of silica dispersion on a silicon substrate and then coating with a thin layer of platinum.

In a glass vial, 2.0-3.5 mL of aqueous dispersion of IO nanoclusters was added to 0.2-1.0 g silica. The initial concentration of iron oxide ranged from 0.005% to 0.2% w/v. To control the pH in VYDAC® silica studies, additional NaOH solution was added directly to the silica prior to adding the nanocluster dispersion. The glass vials were sealed and shaken overnight on a LW Scientific Model 2100A Lab Rotator at 200 rpm, after which the mixture was left undisturbed to allow the silica adsorbent to sediment by gravity. The concentration of the iron oxide nanoparticles in the supernatant was determined by measuring the UV-vis absorbance at 575 nm after dilution of the samples, where necessary, such that the absorbance was below 2. The specific adsorption and monolayer coverage of IO nanoclusters to silica microspheres was calculated based on the difference in the supernatant concentrations and volumes before and after adsorption. For all particles tested, there was a strong linear correlation between absorbance at 575 nm and the IO concentration in solution. In the VYDAC® silica studies, the final concentration of IO in the supernatant was corrected for the inaccessible pore volume (0.6 g/mL) in the silica and any added NaOH solution added at the beginning of the study.

Characterization of iron oxide nanoparticles: Zeta potential of iron oxide nanoparticles was measured using a Brookhaven ZetaPALS instrument at room temperature. Electrophoretic mobility of iron oxide nanoparticles in 10 mM KCl (Debye length $\kappa^{-1}$=3 nm) was collected at a 15° scattering angle. 10 measurements with 30 cycles for each run were averaged, and zeta potential was converted from the electrophoretic mobility using the Smoluchowski equation ($\kappa a \gg 1$).

Dynamic light scattering ("DLS") analysis was performed to measure the hydrodynamic diameter of nanoclusters in DI water using a Brookhaven ZetaPlus instrument at 90° scattering angle. The collected autocorrelation functions were fitted with the CONTIN algorithm, which is well-known in the art. All measurements were made over a period of 3 minutes, and at least three measurements were performed on each sample. The concentration of iron oxide for the measurements was approximately 0.005%, giving a measured count rate of approximately 500 kcps.

Thermogravimetric analysis ("TGA") was used to measure the organic content, of the iron oxide nanoclusters. All measurements were conducted using a Mettler-Toledo TGA/SDTA851e instrument under nitrogen atmosphere at a heating rate of 5° C./min from 25 to 800° C. The percentage loss of weight was reported as the mass fraction of organic coating on the iron oxide.

Flame atomic absorption spectrometry ("FAAS") was used to measure the concentration of iron in the dispersion. All measurements were performed using a GBC 908AA flame atomic absorption spectrometer (commercially available from GBC Scientific Equipment Pty Ltd) at 242.8 nm with an air-acetylene flame.

Characterization of polymer-coated nanoclusters: Copolymers with PAA (see FIG. 1a) or PMA (see FIG. 1b) anchor groups and PSS (see FIG. 1d) or PAMPS (see FIG. 1e) salt-tolerant sulfonate groups were coated on iron oxide ("IO") nanoclusters to provide colloidal stability in standard API brine and to serve as platforms for further chemical modification for control of IO adsorption on silica substrates. A sulfonated terpolymer with a hydrophobic PBA group (see FIG. 1c) was also synthesized for coating IO nanoclusters. Table 2 shows hydrodynamic diameter, zeta potential, stability in standard API brine, and % wt. organics of iron oxide ("IO") nanoclusters coated with a series of sulfonated copolymers. Referring to Table 2, adsorption of various PAMPS-PAA and PSS-b-PAA copolymers on IO nanoclusters was conducted by a recently reported two-step approach where first the IO particles were synthesized with a citrate coating and subsequently coated with a polymer. The PSS-PMA (3:1)- and (PAA-PBA)-b-PSS (1:1:2)-coated IO nanoclusters were synthesized by addition of the polymer during the coprecipitation of the IO. With the exception of the PSS-PMA-coated IO nanoclusters that were measured to have a hydrodynamic diameter of 60 nm, all of the polymer-coated IO clusters ranged in diameter from 110 nm to 169 nm. The IO nanoclusters prepared by the two-step adsorption route gave moderately to highly negative zeta potentials (−24 to −45 mV in DI water), whereas the one-step synthesis approach resulted in highly negative zeta potentials. Notably, the zeta potential displayed by the PSS-PMA-coated nanoclusters was the most negative, at −59 mV in DI water, likely due to the fact that the maleic acid groups comprise twice as many carboxylic acid groups per repeat unit as acrylic acid. The IO nanoclusters synthesized by the one-step coprecipitation method, however, had the smallest amount of polymer on the surface (10-11% organics as shown in Table 2) and were unstable in standard API brine. IO nanoclusters prepared by the two-step method had much larger amounts of adsorbed polymer (15-30% organics as shown in Table 2), which was likely responsible for stability in standard API brine. The amount of adsorbed polymer was generally larger for copolymers with a higher PAA anchor group content.

TABLE 2

| Coating | Mol. Wt. (kDa) | Hydrodynamic Dia. of coated IO nano-clusters (nm) | Zeta Potential (mV) | Stability in standard API brine | Organics by TGA (% wt.) |
|---|---|---|---|---|---|
| PAMPS-PAA (1:1) | 212 | 142 | −39[a] | Stable | 22 |
| PAMPS-PAA (1:1) | 52 | 110 | −25[a] | Stable | 25 |
| PAMPS-PAA (1:6) | 46 | 155 | −37[a] | Stable | 30 |
| PAMPS-PAA (1:2) | 77 | 166 | −44[b] | Stable | 28 |
| PAMPS-PAA (2:1) | 611 | 169 | −45[b] | Stable | 19 |
| PSS-b-PAA (2.4:1) | 40 | 139 | −24[b] | Stable | 15 |
| PSS-PMA (3:1) | 20 | 60 | −59[b] | Unstable | 11 |
| (PAA-PBA)-b-PSS (1:1:2) | 29 | 130 | −50[b] | Unstable | 10 |

[a]measured in 10 mM KCl at pH 8.
[b]measured in DI water

Adsorption of polymer-coated nanoclusters on silica microspheres (unmodified): The effects of various polymer coatings (see FIGS. 1a-1e), nanocluster concentrations, and pHs on the equilibrium adsorption of IO nanoclusters on colloidal silica microspheres are summarized in Table 3.

TABLE 3

| Coating | pH | Initial IO Conc. (% w/v) | % IO adsorbed | Equilibrium IO conc. (% w/v) | Specific Adsorption of IO (mg/m²-silica) | % Mono-layer coverage |
|---|---|---|---|---|---|---|
| PAMPS-PAA (1:1)-212 kDa | 8 | 0.010 | 33% | 0.007 | 0.57 | 0.3% |
|  | 8 | 0.010 | 51% | 0.005 | 0.88 | 0.5% |
|  | 8 | 0.050 | 15% | 0.043 | 1.27 | 0.7% |
|  | 8 | 0.050 | 18% | 0.041 | 1.52 | 0.8% |
|  | 8 | 0.100 | 15% | 0.085 | 2.58 | 1.3% |
|  | 8 | 0.200 | 7% | 0.185 | 2.56 | 1.3% |
|  | 10 | 0.050 | 8% | 0.046 | 0.71 | 0.4% |
| PAMPS-PAA (1:1)-52 kDa | 8 | 0.010 | 12% | 0.009 | 0.20 | 0.1% |
|  | 8 | 0.090 | 5% | 0.087 | 1.72 | 1.5% |
|  | 8 | 0.200 | 4% | 0.192 | 1.32 | 1.1% |
| PAMPS-PAA (1:6)-46 kDa | 8 | 0.050 | 5% | 0.047 | 0.46 | 0.2% |
| PAMPS-PAA (1:2)-77 kDa | 8 | 0.010 | 10% | 0.009 | 0.16 | 0.1% |
|  | 8 | 0.010 | 21% | 0.008 | 0.36 | 0.2% |
| PAMPS-PAA (2:1)-611 kDa | 8 | 0.010 | 38% | 0.006 | 0.66 | 0.3% |
|  | 8 | 0.010 | 42% | 0.006 | 0.72 | 0.4% |
| PSS-b-PAA (2.4:1)-40 kDa | 8 | 0.010 | 20% | 0.008 | 0.35 | 0.2% |

The % IO adsorbed quantifies the amount of adsorption relative to the initial concentration of IO in solution. When less than 10% of the initial IO was adsorbed, the uncertainty increased significantly given the small change measured in the supernatant. The equilibrium IO concentration and the specific adsorption are thermodynamic properties at equilibrium. The percent monolayer coverage ("% ML") is the adsorption level of nanoclusters compared to an ideal, 2D close-packed monolayer of spheres.

Figure 2:
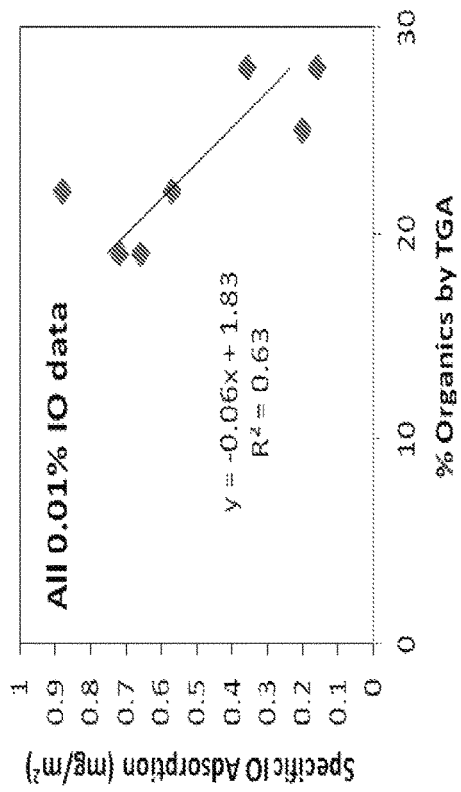
FIG. 2 is a graph of the specific adsorption of various PAMPS-PAA-coated IOs at 0.01% wt. starting IO concentration that correlated negatively and linearly with adsorbed polymer content on IO nanoclusters (% organics determined by thermogravimetric analysis ("TGA")). Data includes PAMPS-PAA (1:1)-212 kDa, PAMPS-PAA (1:1)-52 kDa, PAMPS-PAA (1:2)-77 kDa, and PAMPS-PAA (2:1)-611 kDa coated IOs.

The polymer coating on the nanoclusters provides electrosteric repulsion between the nanoclusters and the silica as a kinetic barrier to adsorption, where more adsorbed polymer is expected to provide a larger barrier. Thermodynamically, this repulsion offsets the van der Waals and any specific attraction between the particles and the substrate (i.e., silica). The added electrosteric repulsion with the polymer stabilizer minimizes adsorption of polymer-coated nanoparticles at high salinity, despite the reduced double layer thickness. The polymer coatings were structurally varied in their constituent monomers, ratios of monomer units, and molecular weights, and each of these factors had an effect on the adsorption of the particles to silica. Overall, the PAMPS-PAA (1:1)-212 kDa polymer coating resulted in the highest silica adsorption with 2.58 mg-IO/m$^2$-silica at 0.085% w/v IO, representing a 1.3% ML. Upon decreasing the IO concentration to 0.009% w/v IO, the lowest specific adsorption level was 0.16 mg-IO/m$^2$-silica displayed by the 77 kDa PAMPS-PAA (1:2) coated clusters, which corresponded to 0.1% ML. A clear trend was not observed between the ratio of AMPS:AA at a fixed IO concentration (~0.01% w/v). However, referring to FIG. 2, the adsorption dropped from ~0.7 mg/m$^2$ for PAMPS-PAA (2:1) coated nanoclusters to ~0.2 mg/m$^2$ for PAMPS-PAA (1:2)-coated nanoclusters as the % organics increased from 19% to 28%, respectively, which indicated that the amount of organic content on the particles was important to minimizing adsorption. FIG. 2 is a graph of the specific adsorption of various PAMPS-PAA coated IOs at 0.1% wt. starting IO concentration correlated negatively and linearly with adsorbed polymer content on IO nanoclusters (% organics determined by TGA). Data includes PAMPS-PAA (1:1)-212 kDa, PAMPS-PAA (1:1)-52 kDa, PAMPS-PAA (1:2)-77 kDa, and PAMPS-PAA (2:1)-611 kDa coated IOs from Table 3. The need for a sufficient amount of polymer coating was further corroborated by the observation that the specific adsorption at an IO concentration of approximately 0.2% w/v of the PAMPS-PAA (1:1)-52 kDa polymer, which comprised 25% wt. of the IO, was observed to be approximately 50% lower than that of the PAMPS-PAA (1:1)-212 kDa polymer, which displayed a slightly lower polymer loading of 22% wt. The lower specific adsorption with the 52 kDa polymer-coated nanoclusters also correlated with the slightly smaller particle size (hydrodynamic diameter of 110 nm vs. 142 nm, respectively), which led to greater electrosteric repulsion and weaker van der Waals attraction. However, the monolayer coverage of the two PAMPS-PAA coated particles was similar as a result of the smaller hydrodynamic diameter for the 52 kDa coated clusters, as the mass of particles constituting a monolayer is less for smaller diameter particles.

The PSS-b-PAA (2.4:1) coated particles, which had a higher sulfonate content and a block copolymer architecture, but only 15% organic content (see Table 2) displayed low levels of adsorption similar to PAMPS-PAA (1:1)-52 kDa, PAMPS-PAA (1:6)-46 kDa, and PAMPS-PAA (1:2)-77 kDa at 0.010% w/v IO in the initial solution. It is likely that in the block copolymer architecture, the sulfonate groups repelled the silica surface more effectively, as they were not mixed with the more strongly adsorbing carboxylate groups, particularly in high salinity. This structure places the stabilizing sulfonate groups towards the outer surface of the particles, which may reduce Ca$^{2+}$ bridging of carboxylate groups, near the iron oxide surface, to the silica surface. For the 212 kDa PAMPS-PAA (1:1) coated particles, an increase in pH from pH 8 to 10 resulted in nearly a 50% reduction in adsorption by modifying the various ionic interactions between monomer groups, dissolved ions, and the silica surface.

While there are several reports on batch adsorption of heavy metal ions like Pb$^{2+}$, Zn$^{2+}$, Cd$^{2+}$, Co$^{2+}$, Cu$^{2+}$, Mn$^{2+}$ and As, literature on batch adsorption of NPs on substrates is rare. Adsorption of bare 95 nm C60 fullerene aggregates on 360 μm diameter glass beads or Ottawa sand is seen in Table 4.

TABLE 4

| Conditions | Particle concentration (% w/v) | Adsorbent Material properties | Specific adsorption (mg/m$^2$)$^a$ | % ML$^c$ |
|---|---|---|---|---|
| 1.0 mM CaCl$_2$ buffered to pH 7 with 0.065 mM NaHCO$_3$ | 0.0009 | 360 μm Ottawa sand (Specific Surface area = 6.4 × 10$^{-3}$ m$^2$/g) | 0.625 | 0.79 |
| 1.0 mM CaCl$_2$ buffered to pH 7 with 0.065 mM NaHCO$_3$ | 0.00121 | 360 μm Glass beads (Specific Surface area = 6.4 × 10$^{-3}$ m$^2$/g)$^b$ | 0.141 | 0.18 |
| DI water | 0.00122 | 360 μm Ottawa sand (Specific Surface area = 6.4 × 10$^{-3}$ m$^2$/g) | 0.033 | 0.04 |
| DI water | 0.00122 | 360 μm Glass beads (Specific Surface area = 6.4 × 10$^{-3}$ m$^2$/g)$^b$ | 0.022 | 0.03 |

$^a$Calculated based on particle retention and collector specific surface area.
$^b$Assumed equal to given value for Ottawa sand.
$^c$Assumed density equal to 1.678 g/cm$^3$.

The NP concentrations tested (about 0.0009-0.0012% w/v C60) were two orders of magnitude lower than the highest NP concentration in this study (0.192% w/v IO). Electrostatically stabilized bare C60 particles showed low adsorption in DI water (about 0.022-0.033 mg-C60/m$^2$ or about 0.03-0.04% ML), which rapidly increased to about 0.14-0.63 mg/m$^2$ or 0.18-0.79% ML in just 1 mM CaCl$_2$ (ionic strength=3 mM). In comparison, PAMPS-PAA (1:1)-212 coated IO nanoclusters displayed similar adsorption values 0.57-0.88 mg/m$^2$ (0.3-0.5% ML) with 600 fold higher salinity (e.g., standard API brine) at a higher 0.005-0.007% w/v IO due to the electrosteric stabilization provided by PAMPS-PAA.

Studies of nanoparticle adsorption using 1-dimensional ("1D") column flow studies are much more common than batch studies, but very few have used high salinity brines. The retention of polymer-coated zero-valent iron ("ZVI") nanoparticles in brine (≥100 mM NaCl or ≥40 mM CaCl$_2$) with sandpacks has been studied as indicated in Table 5. Although a side-by-side comparison between these studies and our batch adsorption data is somewhat complicated by additional particle retention mechanisms in a continuous flow configuration (e.g., hydrodynamic effects, pore-scale mechanisms), specific retention (mg/m$^2$) from the column studies may be compared with those from our batch studies. ZVI particles coated with PMAA$_{48}$-b-PMMA$_{17}$-b-PSS$_{650}$ and PMAA$_{42}$-b-PMMA$_{26}$-b-PSS$_{462}$ triblock copolymers on 300 μm silica sand at 100 mM NaCl have been studied and found specific retention of about 0.029-0.035 mg/m$^2$ with an injected iron concentration of 0.3% w/v (see Table 5). The reported retention values were lower than the values in this study (see Table 3), but at an 18 fold lower salinity than standard API brine. Table 3 shows the adsorption of a series of polymer-coated IO nanoclusters on colloidal silica microspheres in standard API brine before amine modification.

TABLE 5

| Reference | Particle properties | Particle concentration (% w/v) | Salinity | Adsorbent material properties | Specific Retention (mg/m$^2$)$^a$ |
|---|---|---|---|---|---|
| Saleh et al. 2007$^d$ | ZVI with PMAA$_{48}$-b-PMMA$_{17}$-b-PSS$_{650}$ | 0.3 injected (plateau not given) | 100 mM NaCl + 1 mM NaHCO$_3$ at pH 7.4 | 300 µm diameter silica sand, (Specific gravity of 2.65 g/cm$^3$)$^c$ | 0.029 |
| Saleh et al. 2007$^d$ | ZVI with PMAA$_{42}$-b-PMMA$_{26}$-b-PSS$_{462}$ | 0.3 injected (plateau not given) | 100 mM NaCl + 1 mM NaHCO$_3$ at pH 7.4 | 300 µm diameter silica sand, (Specific gravity of 2.65 g/cm$^3$)$^c$ | 0.035 |
| He et al. 2009$^e$ | ZVI with 90 kDa carboxymethyl cellulose | 0.02 injected, 0.0164 plateau$^b$ | 40 mM CaCl$_2$ | 250-420 µm diameter quartz sand (Specific surface area = 0.00681 m$^2$/g) | 8.37 |

$^a$Calculated based on particle retention and collector surface area.
$^b$Plateau value read from FIG. 3 in He et al. 2009.
$^c$From Saleh et al. 2008.
$^d$Saleh et al., "Surface Modifications Enhance Nanoiron Transport and NAPL Targeting in Saturated Porous Media," Environmental Engineering Science 24(1): 45-57 (2007).
$^e$He et al., "Transport of carboxymethyl cellulose stabilized iron nanoparticles in porous media: Column experiments and modeling," Journal of Colloid and Interface Science 334(1): 96-102 (2009).

ZVI particles coated with 90 kDa carboxymethyl cellulose ("CMC") on 250-420 µm quartz sand at 40 mM CaCl$_2$ have been studied and found specific retention of about 8.4 mg/m$^2$ with an injected iron concentration of 0.02% w/v, which is much higher than the adsorption values in this study for unmodified polymer-coated IO nanoclusters. Table 5 is a literature summary of column studies with polymer-coated nanoparticles at highest salinity conditions tested (≥100 mM NaCl or ≥40 mM CaCl$_2$). The high retention may be attributed in part to Ca$^{2+}$ bridging of carboxylate groups in CMC to the substrate.

Polymers composed of sulfonic acid groups, especially AMPS, bind weakly to Ca$^{2+}$ and as a result were found to be soluble in water with high calcium ion concentrations. The weak Ca$^{2+}$ binding of AMPS-based copolymers can be ascribed to their highly acidic nature, comparatively long side chains (relative to PAA) leading to increased conformational freedom and to the hydrophilic amide group that promotes solubility. In contrast, carboxylic acid groups including polyacrylic acid (hydrophobic backbone) and alginic acid (hydrophilic polysaccharide) bind strongly to calcium ions. According to calorimetry, this strong binding is mostly entropically driven, and has been attributed to dehydration of the Ca$^{2+}$ ions, which may be expected to be favored by polymers with hydrophobic backbones. Consequently, these interactions lead to collapse of the polymer chains, as characterized by precipitation and gelation. Based on the classic concept, polymer-stabilized colloidal particles undergo critical flocculation at conditions that are similar to phase boundaries for the polymers in solution. Therefore, the sulfonic acid polymer-coated particles, particularly PAMPS-PAA IO nanoclusters in this study, remained stable in standard API brine. The chains likely exhibited an extended conformation from the IO surface due to high solubility of PAMPS-PAA in standard API brine. The extended chains, with a Flory-Huggins solvency parameter of <0.5, provide electrosteric stabilization against IO nanocluster aggregation due to increased osmotic pressure when two polymer-coated IO nanoclusters approach each other. Similarly, the extended PAMPS-PAA chains also minimize adsorption on silica, even at high salinity, given electrosteric repulsion with both osmotic and elastic contributions.

Adsorption of amine-modified polymer-coated nanoclusters on silica microspheres: The hydrophilic PAMPS-PAA coated IO nanoclusters were modified with a series of diamines and triamines with varying levels of hydrophobicity, as shown in FIGS. 3a-3d. FIGS. 3a-3d show chemical structures of amine modifiers, where FIG. 3a shows a chemical structure of hexanediamine, FIG. 3b shows a chemical structure of polypropylene glycol triamine ethers with six (PPG-6 triamine) and 30 (PPG-30 triamine) polypropylene groups, FIG. 3c shows a chemical structure of melamine, and FIG. 3d shows a chemical structure of a series of three polyethylene glycol diamines (PEG-2, PEG-33, and PEG-113 diamine). The amine modifiers were designed to cover a range of molecular weights (126 to 5000 Da) and hydrophobic character (melamine, short hydrocarbon, ethylene oxide, propylene oxide). The number of amines initially added to the polymer coating of the IO nanoclusters ([NH$_2$]/[COO$^-$], by mole) was varied from 0.1% to 100% to control the degree of modification. For each level of modification, after characterizing the dispersion stability, the adsorption of IO nanoclusters on silica microspheres in standard API brine was tuned.

Figure 5:
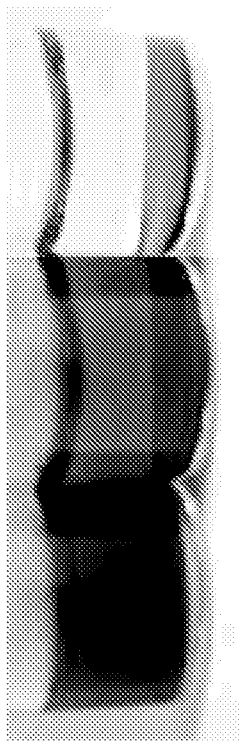
FIG. 5 shows a digital image of classes of behavior of IO dispersions in standard API brine after adsorption on silica microspheres. The left glass container shows a white silica layer with low adsorbing particles. The middle glass container shows a brown colored silica layer due to adsorbed IO nanoclusters with intermediate adsorbing conditions. The right glass container shows a brown colored silica layer due to adsorbed IO nanoclusters with high adsorbing conditions. The left glass container contains unmodified PAMPS-PAA (1:1)-212 kDa coated IO nanoclusters; the middle glass container contains PAMPS-PAA (1:1)-212 kDa coated IO nanoclusters modified at 1% level hexanediamine; the right glass container contains PAMPS-PAA (1:1)-212 kDa coated IO nanoclusters modified at 5% level hexanediamine.

The silica adsorption results for PAMPS-PAA- and PSS-b-PSS coated IO nanoclusters modified to varying degrees with amines are summarized in Table 6; representative photographs of low, medium, and high adsorption are shown in FIG. 5. Table 6 shows the adsorption of sulfonated copolymer-coated IO nanoclusters modified with various di- and tri-amine modifiers, as shown in FIGS. 3a-3d. Unless mentioned otherwise, all studies were conducted on PAMPS-PAA (1:1, 212 kDa) coated IO nanoclusters. FIG. 5 shows a digital image of classes of behavior of IO dispersions in standard API brine after adsorption on silica microspheres. The left glass container shows a white silica layer with low adsorbing particles. The middle glass container shows a brown colored silica layer due to adsorbed IO nanoclusters with intermediate adsorbing conditions. The right glass container shows a brown colored silica layer due to adsorbed IO nanoclusters with high adsorbing conditions. The left glass container contains unmodified PAMPS-PAA (1:1)-212 kDa coated IO nanoclusters; the middle glass container contains PAMPS-PAA (1:1)-212 kDa coated IO nanoclusters modified at 1% level hexanediamine; the right glass container contains PAMPS-PAA (1:1)-212 kDa coated IO nanoclusters modified at 5% level hexanediamine.

In all cases at pH 8, the adsorption increased upon modification with amines relative to the corresponding unmodified polymer-coated nanoclusters in Table 3. In general, the added amine modifier did not significantly change the hydrodynamic diameter or zeta potential of the nanoclusters. For a given modifier, the level of silica adsorption increased with increasing % modification up to a certain limit, beyond which no further increase was observed. This trend was observed for the case of melamine (PAMPS-PAA 1:1-212 kDa), where adsorption rises from 4.6 to 9.6 mg/m$^2$ upon increasing the extent of modification from 12.5% and 50%. Beyond 50%, however, the adsorption reached a plateau, suggesting that the nanocluster surface had been saturated with the amine modifier. A similar saturation behavior was observed for PPG-6 triamine (PAMPS-PAA 1:1-212 kDa) and PEG-2 diamine (PAMPS-PAA 1:1-212 kDa) at 12.5% and 1% modification, respectively.

The effect of the molecular weight and the chemical structure of the amine modifiers on the adsorption was investigated at pH 8 for PAMPS-PAA 1:1 (212 kDa) coated IOs. The extent of adsorption correlated with both the hydrophobicity and the molecular weight of the amine modifier. The extent of adsorption at pH 8 increased in the order PEG-113 diamine>PPG-6 triamine>PEG-33 diamine>Hexanediamine>PEG-2 diamine>melamine. For a 5% modification level of the largest and most hydrophobic modifier, PPG-30 triamine, the nanoclusters were unstable in standard API brine, and therefore adsorption on silica was not studied. Adsorption with an even higher molecular weight modifier, PEG-113 diamine (5000 Da) at 1% modification, however, did not cause aggregation and led to a highly increased IO adsorption of 22.4 mg/m$^2$ or 11.5% ML. The moderately sized PEG-33 diamine (1500 kDa) at 1% modification also produced a highly increased adsorption of 15.1 mg/m$^2$ or 7.8% ML, whereas the smallest PEG-2 diamine (148 Da) at 5% modification only moderately increased the adsorption (7.8 mg/m$^2$ or 4% ML). A smaller hydrophobic PPG-6 triamine (440 Da) on the other hand was as effective as the PEG-113 diamine at increasing the adsorption to a high level of 21 mg/m$^2$ or 11% ML, but only at 12.5% or higher modification. The low molecular weight modifier, hexanediamine, which is similar in MW to PEG-2 diamine but more hydrophobic, increased adsorption from 7.4 to 13.5 mg/m$^2$ at 1% and 100% modification, respectively. In summary, the specific adsorption was tuned over a wide range with the amine modification. In comparison, the values were either well below or well above the retention level of about 8.4 mg/m$^2$ found for carboxymethyl cellulose-coated Fe nanoparticles, reported by He et al. on quartz sand in 40 mM $CaCl_2$ (see Table 5).

Figure 4:
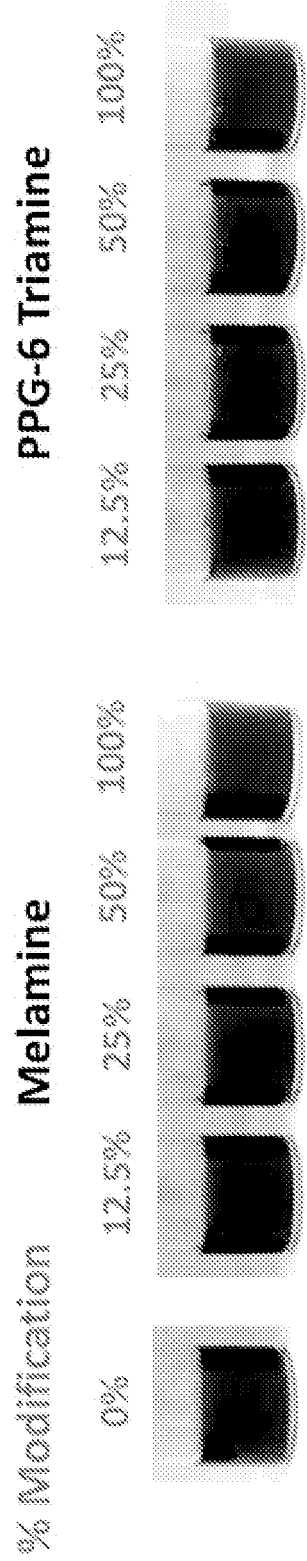
FIG. 4 shows digital images of PAMPS-PAA (1:1)-212 kDa coated IO nanoclusters dispersed in standard API brine at 0.2% wt. IO. The digital images left to right show unmodified IO nanoclusters at a 0% modification level, melamine modified at 12.5%, 25%, 50%, and 100% modification levels, and PPG-6 triamine modified at 12.5%, 25%, 50%, and 100% modification levels.

As shown in Table 6, the measured zeta potentials in 10 mM KCl at pH 8 ranged from −24.4 to −40.9 mV for hexanediamine-modified PSS-b-PAA and PAMPS-PAA (2:1), respectively. As shown in Table 2, the corresponding value for unmodified PAMPS-PAA (2:1) was only slight more negative at −45 mV. The lower molecular weight modifiers (melamine, hexanediamine, and PEG-2 diamine), especially melamine, added a higher density of amine groups to the surface of the nanoclusters than the higher molecular weight modifiers for a given amount of amine-terminated modifiers. The presence of ammonium groups on unreacted ends of diamines may have contributed positive charges at pH 8, however, the zeta potential of the amine-modified nanoclusters were still highly negative in 10 mM KCl, and dispersions of the particles remained stable in standard API brine, as shown in FIG. 4. FIG. 4 shows digital images of PAMPS-PAA (1:1)-212 kDa coated IO nanoclusters dispersed in standard API brine at 0.2% wt. IO. The digital images left to right show unmodified IO nanoclusters at a 0% modification level, melamine modified at 12.5%, 25%, 50%, and 100% modification levels, and PPG-6 triamine modified at 12.5%, 25%, 50%, and 100% modification levels. Nearly all of the modified IO nanoclusters were found to maintain a stable dispersion in standard API brine. The only exception was the particles modified with the largest hydrophobic PPG-30 triamine at 5% where aggregation of IO nanoclusters was observed. Thus, the total number of added positive charges was relatively small, which is not surprising given the large number of negative charges in the non-reactive sulfonate groups and the unmodified carboxylates. Additionally, an amine modifier may be expected to form multiple amide bonds to crosslink the polymer coating on the particle, reducing the number of added positive charges.

TABLE 6

| Modifier | Initial [NH$_2$]/[COO$^-$] added, by mole (%) | Hydrodyn diameter (nm) | Zeta (mV) | pH | Starting IO conc. (% w/v) | % IO Adsorbed | Equilibrium IO conc. (% w/v) | Specific Adsorption of IO (mg/m$^2$-silica) | Monolayer coverage (%) |
|---|---|---|---|---|---|---|---|---|---|
| Hexane-diamine | 0.1 | | | 8 | 0.05 | 48 | 0.026 | 4.2 | 2.1 |
| | 1 | 134 | | 8 | 0.05 | 86 | 0.007 | 7.4 | 3.8 |
| | 100 | 154 | −37.7 ± 8.2 | 8 | 0.1 | 39 | 0.062 | 13.5 | 7.5 |
| | 1 | | | 10 | 0.05 | 73 | 0.013 | 6.3 | 3.2 |
| Hexane-diamine (PAMPS-PAA 2:1) | 100 | 137 | −40.9 ± 4.7 | 8 | 0.05 | 32 | 0.034 | 2.8 | 1.4 |
| Hexane-diamine (PSS-b-PAA 2.4:1) | 100 | 138 | −24.4 ± 1.9 | 8 | 0.05 | 16 | 0.042 | 1.4 | 0.7 |
| Melamine | 12.5 | | | 8 | 0.2 | 13 | 0.173 | 4.6 | 2.4 |
| | 25 | | | 8 | 0.2 | 18 | 0.1065 | 6.1 | 3.1 |
| | 50 | | −38.9 ± 2% | 8 | 0.2 | 28 | 0.144 | 9.6 | 5.0 |
| | 100 | | | 8 | 0.2 | 23 | 0.155 | 7.7 | 4.0 |
| | 12.5 | | | 10 | 0.05 | 16 | 0.042 | 1.4 | 0.7 |

TABLE 6-continued

| Modifier | Initial [NH₂]/[COO⁻] added, by mole (%) | Hydrodyn diameter (nm) | Zeta (mV) | pH | Starting IO conc. (% w/v) | % IO Adsorbed | Equilibrium IO conc. (% w/v) | Specific Adsorption of IO (mg/m²-silica) | Monolayer coverage (%) |
|---|---|---|---|---|---|---|---|---|---|
| | 25 | | | 10 | 0.05 | 26 | 0.037 | 2.3 | 1.2 |
| | 50 | | −48 4 ± 0.4 | 10 | 0.05 | 20 | 0.040 | 1.8 | 0.9 |
| | 100 | | | 10 | 0.05 | 27 | 0.037 | 2.3 | 1.2 |
| PPG-6 triamine | 1 | 138 | −25.1 ± 16% | 10 | 0.05 | 79 | 0.011 | 6.8 | 3.5 |
| | 2 | 148 | −38.3 ± 7% | 10 | 0.05 | 83 | 0.009 | 7.0 | 3.6 |
| | 5 | 129 | −33.0 ± 6% | 10 | 0.05 | 84 | 0.008 | 7.2 | 3.7 |
| | 12.5 | | | 8 | 0.2 | 55 | 0.091 | 18.7 | 9.7 |
| | 25 | | | 8 | 0.2 | 59 | 0.081 | 20.3 | 10.5 |
| | 50 | | −33.7 ± 0.9 | 8 | 0.2 | 62 | 0.077 | 21.2 | 10.9 |
| | 100 | | | 8 | 0.2 | 54 | 0.093 | 18.5 | 9.5 |
| | 50 | | −43.8 ± 0.8 | 10 | 0.05 | 100 | 0 | >8.5 | >4.4 |
| PEG-2 diamine | 0.1 | | −29.3 ± 11% | 8 | 0.05 | 71 | 0.015 | 6.1 | 3.1 |
| | 0.1 | | " | 8 | 0.2 | 12 | 0.177 | 4.0 | 2.0 |
| | 2 | | −25.6 ± 15% | 8 | 0.05 | 60 | 0.02 | 5.2 | 2.7 |
| | 5 | 126 | −34.1 ± 12% | 8 | 0.05 | 91 | 0.005 | 7.8 | 4.0 |
| | 0.1 | | | 10 | 0.05 | 19 | 0.04 | 1.7 | 0.9 |
| | 1 | | | 10 | 0.05 | 63 | 0.018 | 5.5 | 2.8 |
| | 2 | | | 10 | 0.05 | 60 | 0.020 | 5.2 | 2.7 |
| | 5 | | | 10 | 0.05 | 79 | 0.011 | 6.8 | 3.5 |
| PEG-33 diamine | 1 | | | 8 | 0.2 | 44 | 0.112 | 15.1 | 7.8 |
| PEG-113 diamine | 1 | | | 8 | 0.2 | 65 | 0.070 | 22.39 | 11.5 |

The presence of ammonium groups would likely increase the adsorption via electrostatic interaction with oppositely charged silica at pH 8. To study this contribution, adsorption was also studied at pH 10, at which primary amines would not be protonated and would be neutral. When hexanediamine, PEG-2 diamine, or PPG-6 triamine were used, no significant change in adsorption was observed with pH. However, the adsorption with melamine was lower at pH 10 than 8. Moreover, adsorption values were observed that were close to those for the unmodified nanoclusters, that is 1.4-2.3 mg/m² or <1.2% ML. The zeta potential of 50% melamine-modified IO nanoclusters became more negative when measured in 10 mM KCl at pH 10 (−48.4 mV) compared to the corresponding value at pH 8 (−38.9 mV). Similarly, 50% PPG-6 triamine-modified IO nanoclusters showed a more negative zeta potential in 10 mM KCl at pH 10 (−43.8 mV) compared to −33.7 mV at pH 8. Thus, protonation of the amine groups, while contributing somewhat to the zeta potential, did not drop the potential significantly, indicating that a relatively small number of amine groups were present compared to the number of unmodified carboxylates and non-reactive AMPS groups.

Modification with hexanediamine was also studied with two other polymer coated IO nanoclusters, PAMPS-PAA (2:1) and PSS-b-PAA (2.4:1), which have a higher proportion of sulfonate groups. When the PAMPS-PAA (2:1) coated clusters were modified at a modification level of 100%, the $SiO_2$ adsorption observed, 1.4% and 0.7% ML, was well below the value of 7.5% ML observed for PAMPS-PAA (1:1)-212 kDa. Given that the sulfonate groups are unreactive, it is not surprising that modification with hexanediamine produces a smaller reduction of adsorption for these polymers with a higher sulfonate proportion. Then, a block copolymer stabilizer was compared with a random copolymer. Although the sulfonate:AA monomer ratio is about the same, the block copolymer PSS-b-PAA showed lower adsorption than the random PAMPS-PAA (2:1), likely due to the block backbone structure, which places the stabilizing sulfonate groups towards the outer surface of the particles. Furthermore, $Ca^{2+}$ bridging of carboxylate groups to the silica surface may be reduced when the carboxylate functionalities are near the iron oxide surface, as noted with the unmodified PSS-b-PAA-coated IO nanoclusters.

Figure 6A:
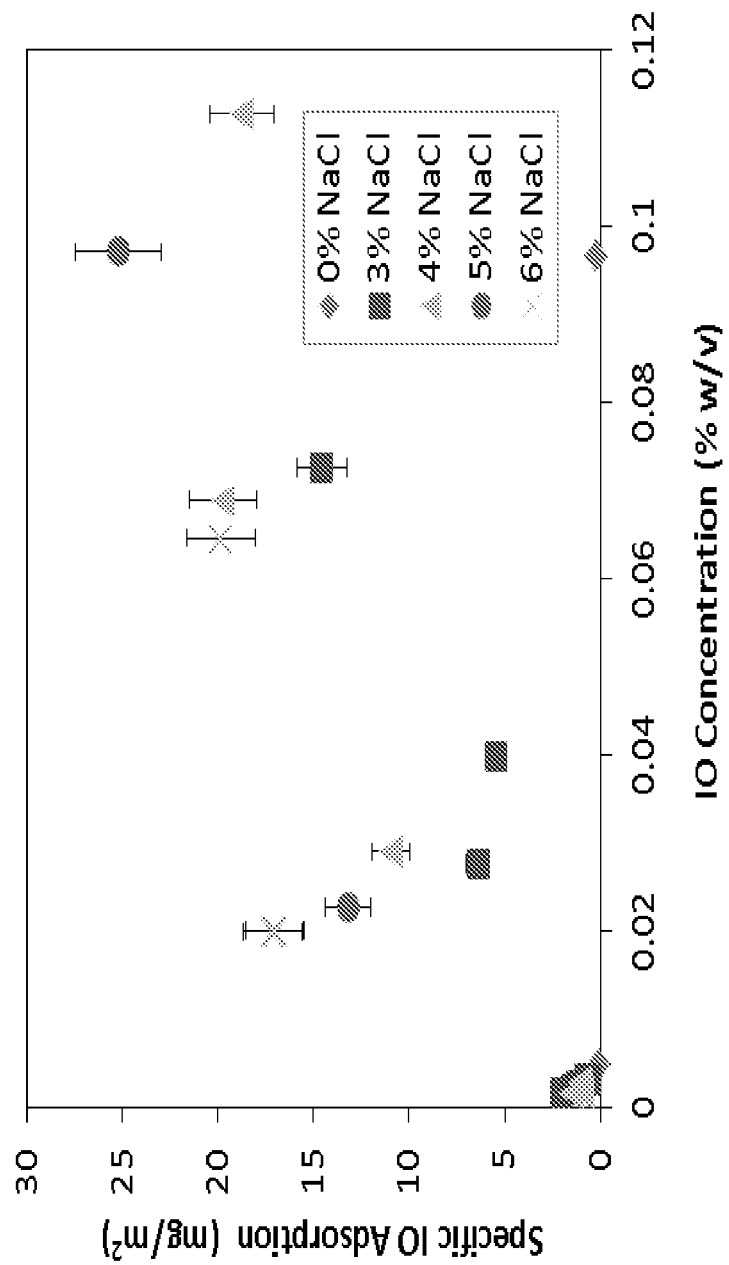
FIG. 6a is a graph of the adsorption of IO nanoclusters on VYDAC® Silica at pH 7-8 with Hexanediamine-modified (PAA-PBA)-b-PSS (1:1:2) coating in 0%, 3%, 4%, 5%, and 6% NaCl solutions.
Figure 6B:
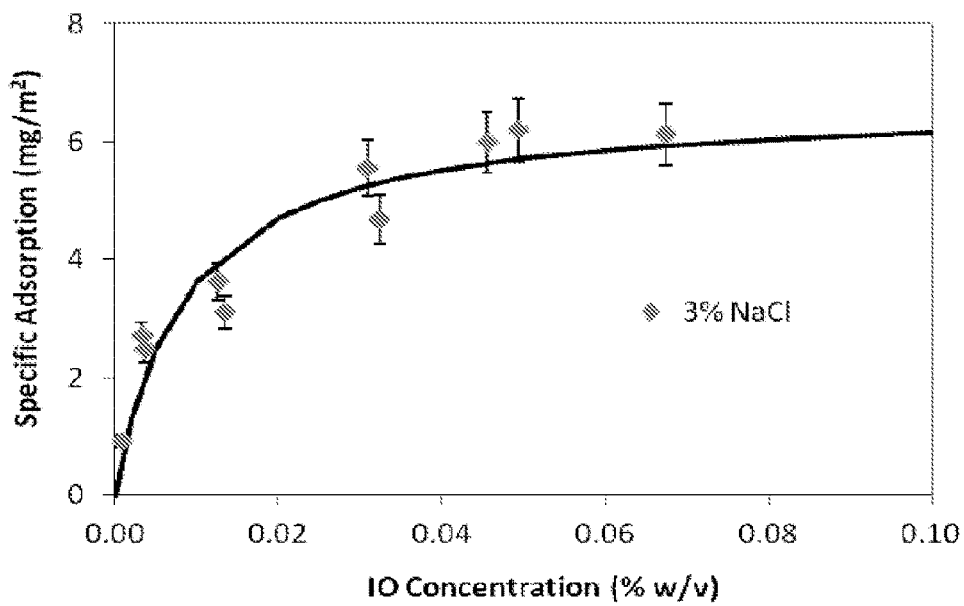
FIG. 6b is a graph of the adsorption of IO nanoclusters on VYDAC® Silica at pH 7-8 with Hexanediamine-modified PSS-b-PAA (2.4:1) coating in 3% NaCl.

Polymer-coated IO nanocluster adsorption isotherms: FIGS. 6a-6b show adsorption isotherms of IO nanoclusters with two different block polymer coatings used to tune the adsorption of IO nanoclusters on VYDAC® silica at various salinities and a pH range of 7 to 8. FIG. 6a is a graph of the adsorption of IO nanoclusters on VYDAC® silica at pH 7-8 with Hexanediamine-modified (PAA-PBA)-b-PSS (1:1:2) coating in 0%, 3%, 4%, 5%, and 6% NaCl solutions. FIG. 6b is a graph of the adsorption of IO nanoclusters on VYDAC® silica at pH 7-8 with Hexanediamine-modified PSS-b-PAA (2.4:1) coating in 3% NaCl. With no salt present, the adsorption remained low, at a level of <0.2 mg/m² at IO concentrations up to 0.097% w/v. However as the salinity was increased, the level of adsorption increased markedly with iron oxide concentration. The highest observed adsorption level was 25.2 mg/m² with 0.097% w/v IO in 5% NaCl solution.

Figure 7A:
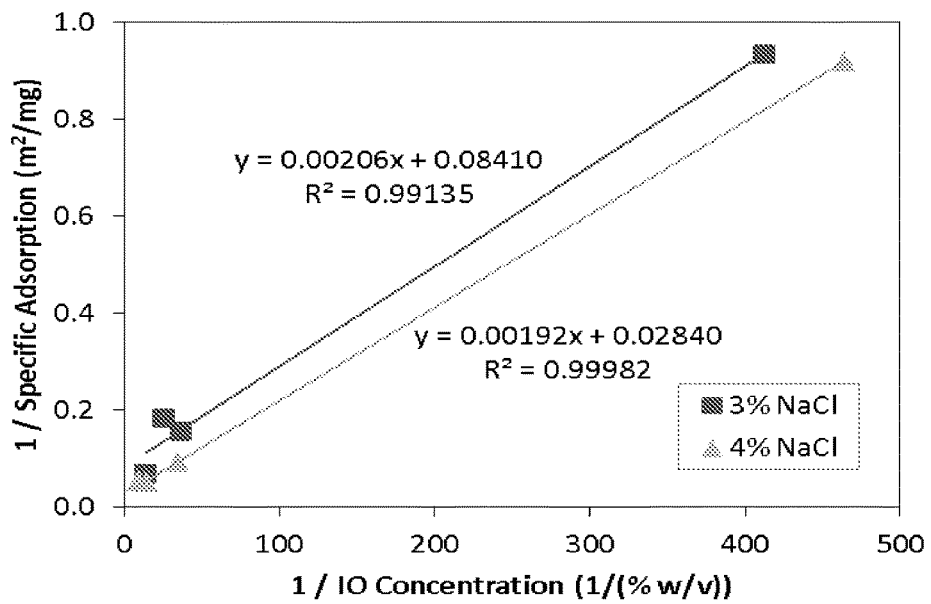
FIG. 7a is a graph of the adsorption isotherms of IO nanoparticles with Hexanediamine-modified (PAA-PBA)-b-PSS (1:1:2) coating on VYDAC® Silica at pH 7-8 in 3% and 4% NaCl.
Figure 7B:
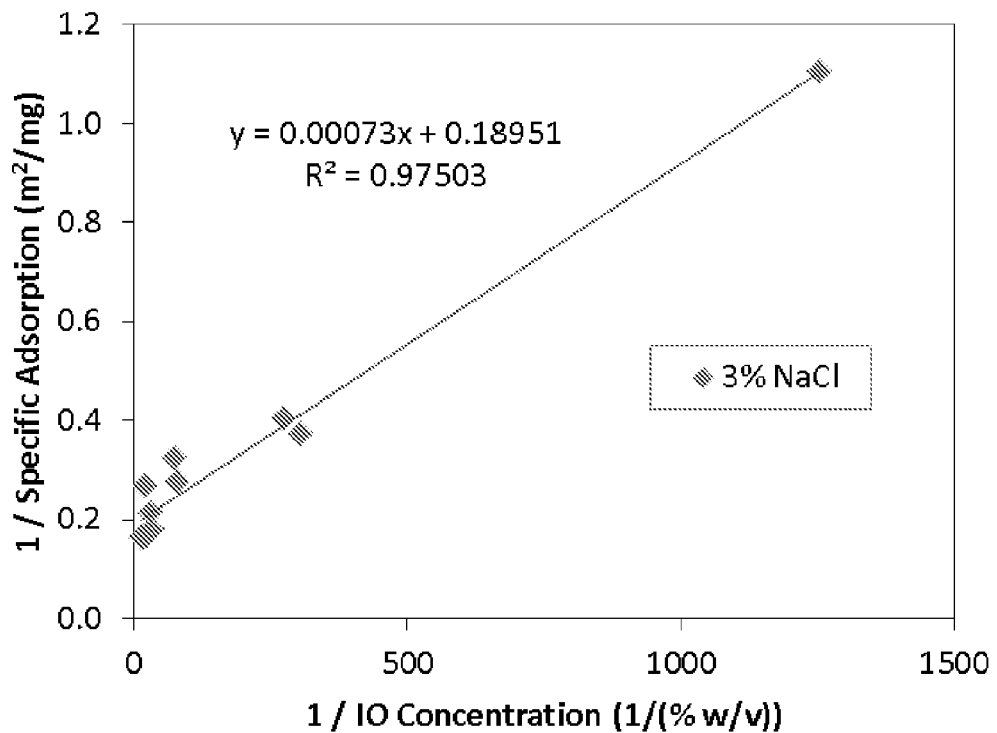
FIG. 7b is a graph of the adsorption isotherms of IO nanoparticles with Hexanediamine-modified PSS-b-PAA coating on VYDAC® Silica at pH 7-8 in 3% NaCl.
Figure 7C:
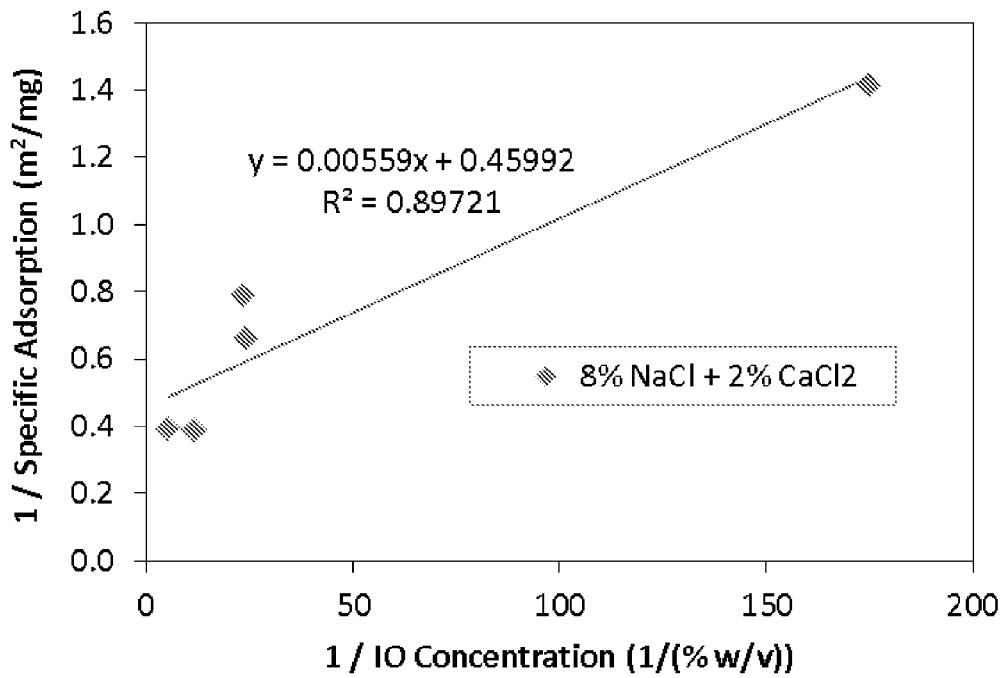
FIG. 7c is a graph of the adsorption isotherms of IO nanoparticles with unmodified PAMPS-PAA (1:1)-212 kDa on colloidal silica microspheres at pH 8 in standard API brine.

The data are linearized in a Langmuir plot in FIG. 7a for 3 and 4% NaCl, and the Langmuir parameters are given in Table 7. FIG. 7a is a graph of the adsorption isotherms of IO nanoparticles with hexanediamine-modified (PAA-PBA)-b-PSS (1:1:2) coating on VYDAC® silica at pH 7-8 in 3% and 4% NaCl per data from FIG. 6a. FIG. 7b is a graph of the adsorption isotherms of IO nanoparticles with hexanediamine-modified PSS-b-PAA coating on VYDAC® silica at pH 7-8 in 3% NaCl per data from FIG. 6b. FIG. 7c is a graph of the adsorption isotherms of IO nanoparticles with unmodified PAMPS-PAA (1:1)-212 kDa on colloidal silica microspheres at pH 8 in standard API brine per data from Table 3. Table 7 is a table of the adsorption isotherm parameters determined from FIGS. 7a-7c for polymer-coated IOs at pH 7-8 on silica.

TABLE 7

| Coating | Salinity | Silica | $A_c$ (g-IO/g-silica) | $A_c$ (mg-IO/m²-silica) | $k_{ads}/k_{des}$ (m³) | Monolayer coverage (%) |
|---|---|---|---|---|---|---|
| Hexanediamine-modified (PAA-PBA)-b-PSS | 3% NaCl | VYDAC® | 0.0014 | 12 | $1.2 \times 10^{-17}$ | 7.1 |
| | 4% NaCl | VYDAC® | 0.0042 | 35 | $4.5 \times 10^{-18}$ | 21 |
| Hexanediamine-modified PSS-b-PAA | 3% NaCl | VYDAC® | 0.00063 | 5.3 | $9.6 \times 10^{-17}$ | 2.9 |
| 1:1 AA: AMPS 212 kDa | API Brine | 8 μm colloidal | 0.0013 | 2.2 | $3.2 \times 10^{-17}$ | 1.1 |

The slope (m) (see Equation 1) of the fitted line is expressed in units of $10^7$ m$^{-1}$ and the intercept (b) (see Equation 2) in units of m²/mg-IO. Isotherm parameters were determined using the following equations:

$$m = \left(\frac{k_{des}}{k_{ads}}\right)\left(\frac{\rho_a}{A_c}\right)M_p \quad \text{(Equation 1)}$$

$$b = \frac{\rho_a}{A_c} \quad \text{(Equation 2)}$$

where $k_{des}/k_{ads}$ is the ratio of the rate of desorption to the rate of adsorption (m$^{-3}$), $M_p$ is the mass of one nanocluster (g), $A_c$ is the adsorption capacity on the collector surface (g-IO/g-silica), and $\rho_a$ is the specific surface area of silica (m²/g-silica). Using the specific surface area of the silica, $A_c$ can be converted to (mg-IO/m²-silica). For hexanediamine-modified (PAA-PBA)-b-PSS coated IO nanoclusters (see FIGS. 6a and 7a), increased salinity from 3% NaCl to 4% NaCl resulted in a nearly 3 fold increase in $A_c$ and a nearly 3 fold decrease in $k_{ads}/k_{des}$ (see Table 7). The calculated $A_c$ increases from 7.1% to 21% ML at 3% and 4% NaCl, respectively.

FIG. 6b shows the equilibrium adsorption isotherm of hexanediamine-modified PSS-b-PAA coated nanoclusters measured in 3% NaCl for an IO concentration up to 0.07% w/v, and the linearized Langmuir plot is given in FIG. 7b. Adsorption initially increased to 6 mg/m² at concentrations of up to 0.05% w/v IO, and plateaued at higher IO concentrations. As shown in Table 7, the calculated $A_c$ values for the PSS-b-PAA coated nanoclusters at 5.3 mg-IO/m² were 2.5 fold lower than for the polymer with the hydrophobic PBA group at the same 3% wt. NaCl. As shown in Table 8, adsorption of the hexanediamine-modified PSS-b-PAA particles was also measured in 8% NaCl, 2% CaCl₂, and standard API brine. Table 8 is a table of the adsorption of unmodified PSS-b-PAA IO nanoclusters and hexanediamine-modified PSS-PMA IO nanoclusters on VYDAC® silica.

TABLE 8

| Coating | pH | Salinity | Starting IO conc. (% w/v) | % IO Adsorbed | Equilibrium IO conc. (% w/v) | Specific Adsorption of IO (mg/m²-silica) | Monolayer coverage (%) |
|---|---|---|---|---|---|---|---|
| PSS-b-PAA | 7 | 8% NaCl | 0.006 | 86.5 | 0.0008 | 2.28 | 1.3 |
| | 7 | 2% CaCl₂ | 0.003 | 40.2 | 0.0016 | 0.486 | 0.27 |
| | 8 | API Brine | 0.010 | 52.3 | 0.0045 | 2.28 | 1.3 |
| | 8 | API Brine | 0.004 | 30.5 | 0.0030 | 0.59 | 0.33 |
| PSS-PMA | 7 | 3% NaCl | 0.099 | <1% | 0.099 | <0.58 | <0.75 |

With only 8% NaCl in solution, the adsorption was measured to be 2.3 mg/m², indicating that 86.5% of the particles initially in solution adsorbed to the VYDAC® silica, and the adsorption with only 2% CaCl₂ in solution was lower at 0.5 mg/m² with 0.0016% w/v IO. When the particles were dispersed in standard API brine, with both 8% NaCl and 2% CaCl₂ in solution, the measured adsorption was 0.6 mg/m² with 0.0030% w/v IO and increased to 2.3 mg/m² at 0.0048% w/v IO. At each of these concentrations, the adsorption values were similar as for 3% NaCl in FIG. 6b. In contrast, the adsorption of (PAA-PBA)-b-PSS coated nanoclusters could not be studied in standard API brine as they were not colloidally stable.

FIG. 7c is for unmodified PAMPS-PAA(1:1)-212 kDa (data from Table 3). Here the adsorption values were the lowest at each IO concentration compared to both hexanediamine-modified PAA-b-PSS and (PAA-PBA)-b-PSS, despite a much higher salinity. Furthermore, the lower values are reflected in the lowest calculated values for $A_c$ and monolayer fraction at 2.2 mg-IO/m² and 1.1% ML, respectively, as shown in Table 7. Referring to Table 2, the low adsorption may reflect the higher polymer loading, lower hydrophobicity of the AMPS functionality versus PSS, the higher MW of the polymer, and the fact that these were not modified with any amines.

As a result of the foregoing, aspects of the present invention provide low adsorption (<1 mg/m², 0.2% of monolayer) of polymer-coated ~100 nm iron oxide nanoclusters on silica microspheres in standard API brine by: (1) coating the particles with a sufficient amount of a sulfonated copolymer, and (2) providing a sufficient level of a sulfonated component (2-acrylamido-2-methylpropanesulfonate or styrenesulfonate) in the copolymer for electrosteric repulsion with the negatively charged silica surface. A wide range of coatings were investigated with a combinatorial materials chemistry approach, in which the nanoparticle synthesis process was separated from the coating process. In most cases, the nanocluster adsorption on silica decreased with an increase in the amount of organic material on the nanoclusters, as measured by TGA, due to the increased electrosteric interactions between the nanoclusters and the silica surfaces. Based on parameters obtained from fitting Langmuir isotherms, the lowest adsorption was observed for PAMPS-PAA(1:1)-212 kDa (1.1% monolayer coverage) reflecting the high polymer loading, low hydrophobicity of the AMPS functionality versus PSS, the higher MW of the polymer, and the fact that these were not modified with any amines. The incorporation of hydrophobic butylacrylate monomers into copolymers containing styrenesulfonate and AA produced a large increase in adsorption and caused the particles to lose colloidal stability in standard API brine.

In an effort to systematically tune the adsorption of IO on rock surfaces, a series of PAMPS-PAA coatings were synthesized, where the AA groups were modified with various amines, including melamine, hexanediamine, PEG diamines, and polypropylene glycol ("PPG") triamines. When amines with a variety of molecular weights, hydrophobicities (based on choice of amine), and levels of functionalization were used as modifiers, the stability in standard API brine was still maintained. The adsorption of modified PAMPS-PAA coated IO nanoclusters on silica microspheres ranged from 1.2% to 11.5% monolayer coverage. A trend in the adsorption levels was observed, and followed the order: melamine<PEG-2 diamine<hexanediamine<PEG-33 diamine<PPG-6 triamine<PEG-113 diamine, indicating that the adsorption increased with MW and hydrophobicity of the amine. The ability to tune the adsorption level is useful for a variety of subsurface applications, including electromagnetic subsurface imaging.

As previously indicated, the interest has grown markedly in the last few years in nanotechnology for subsurface reservoirs to facilitate oil and gas recovery, image subsurface reservoirs, aid sequestration of $CO_2$, and benefit environmental remediation. In subsurface reservoirs, the high salinities (>>1 M) and often elevated temperatures up to ~150° C., typically cause nanoparticle aggregation, as well as excessive undesired adsorption of nanoparticles on mineral surfaces. Low molecular weight stabilizers on nanoparticle surfaces do not provide sufficient electrostatic repulsion at high ionic strength, given extensive charge screening in very thin double layers. However, ionic and zwitterionic polymer chains on nanoparticle surfaces have been designed to provide sufficient steric and electrosteric stabilization in highly concentrated NaCl up to 5 M. Unfortunately, the polymer stabilizers often collapse, becoming ineffective at high temperatures (e.g., 50° C. to 150° C.) in NaCl brines, and even at 25° C. when concentrated divalent ions are present. Thus, hereinafter are disclosed polymer coatings to stabilize nanoparticles in concentrated brines containing divalent ions at high temperature and to resist adsorption on mineral surfaces.

Polymer stabilizers on nanoparticle surfaces can prevent nanoparticle flocculation if the pure polymer in the same solvent does not undergo phase separation. As the salinity increases, the lower critical solution temperature ("LCST") for the nonionic polymer polyethylene glycol ("PEG") (without nanoparticles) decreases as the hydrogen bonding with water is weakened. Polyacrylic acid ("PAA") remains soluble in 1 M NaCl at 90° C., but precipitates even with low $Ca^{2+}$ at ambient temperature due to specific-ion complexation and hydration, as shown by NMR and calorimetry measurements. In contrast, highly acidic sulfonated polymers display low $Ca^{2+}$ binding affinities, and therefore remain soluble even at high temperatures, especially those containing high levels of styrenesulfonate or 2-acrylamido-2-methylpropanesulfonate ("AMPS").

Polyelectrolyte chains on nanoparticle surfaces, which interact favorably with concentrated brine, do not collapse and provide steric and electrosteric stabilization. For example, PAA or polymethacrylic acid ("PMAA") stabilizes latexes and iron oxide ("IO") nanoparticles ("NPs") in 1-3.5 M $Na^+$ or $K^+$ at room temperature. In contrast, $Ca^{2+}$ and $Mg^{2+}$ induces flocculation of alginate-coated hematite NPs even at 5 mM. IO NPs with adsorbed PAA-PVS/polystyrenesulfonate ("PSS") copolymers were stable even in 5 M NaCl at room temperature, given the solvation of each group. Furthermore, PSS-based copolymers stabilized NP dispersions in relatively dilute solutions of 0.1 M $Mg^{2+}$ or $Ca^{2+}$ at room temperature. The same anionic polymers that provide repulsion between nanoparticles can also minimize NP adsorption on negatively charged bulk surfaces, for example silica as a mimic of sandstone. Despite various studies of transport of polymer-stabilized NPs in porous media, relatively few studies have examined NP adsorption isotherms on silica in either DI water or 1 mM $Ca^{2+}$, and none have explored highly concentrated brines with divalent ions.

In porous media, the large volumes and mineral surface areas provide a strong thermodynamic driving force for desorption of adsorbed polymers from nanoparticle surfaces. Acrylic acid-based polymers adsorbed on iron oxide by only charge-transfer complexes are readily susceptible to desorption. For more permanent attachment, predesigned polymers with the desired composition and molecular weight may be covalently attached to NP surfaces by a "grafting to" technique. A large number of anchor groups m for multipoint covalent grafting for enhanced stability, especially in harsh environments.

Disclosed herein are iron oxide NPs with covalently grafted copolymers that form stable dispersions in standard API brine even at 90° C., and adsorb only very weakly on silica microparticles. The pre-synthesized poly(2-methyl-2-acrylamidopropanesulfonate-co-acrylic acid) (PAMPS:PAA 3:1) copolymer had a high proportion of solvated AMPS stabilizer groups to provide low binding affinity for calcium ions, yet a sufficient fraction of acrylic acid anchor groups for permanent multipoint attachment. The grafting onto amine-functionalized IO NPs via a multipoint amidation reaction was found to be permanent, as demonstrated by stable dispersions even after 40,000 fold serial dilution. As shown by DLS measurements, the hydrodynamic diameter of the pure polymer underwent little contraction at high salinity and temperature, which was as expected given the weak $Ca^{2+}$ interactions. Consequently, favorable solvation of extended PAMPS-PAA brushes on the IO surfaces is shown to provide steric stabilization between nanoparticles, and nanoparticles with the silica surfaces. These weak interactions with silica result in extremely low adsorption with a 0.4% monolayer coverage despite the extreme salinity.

Materials utilized: Iron(II) chloride tetrahydrate, iron(III) chloride hexahydrate, citric acid monohydrate, 30% ammonium hydroxide, 3-aminopropyl triethoxy silane ("APTES"), glacial acetic acid, calcium chloride dihydrate, sodium chloride, hydrochloric acid, sodium hydroxide, 1-ethyl-3-(3-dimethylaminopropyl)carbodiimide ("EDC"), acrylic acid, potassium persulfate, sodium metabisulfite, and polyacrylic acid sodium salt (5 kDa) were obtained from commercial sources and used as received. The monomer 2-amino-2-methylpropanesulfonate ("AMPS") was commercially obtained from Lubrizol corporation and used as received. Colloidal silica microspheres (8 µm, product number SIOP800-01-1KG) were commercially purchased from Fiber Optic Center Inc., New Bedford, Mass., USA. Deionized ("DI") water from a Barnstead Nanopure system was used.

Synthesis of poly(2-acrylamido-3-methylpropanesulfonate-co-acrylic acid) ("PAMPS-PAA"): The PAMPS-PAA random copolymers with a AMPS:AA ratio of 3:1 were synthesized by the following procedure. A three-necked round bottom flask equipped with a magnetic stir bar, a nitrogen inlet and a reflux condenser was charged with an AMPS monomer, potassium persulfate, and sodium metabisulfite under a nitrogen atmosphere. The flask was sealed with rubber septa and deionized water that was previously degassed by bubbling with nitrogen for 30 minutes was added via a nitrogen-purged syringe or a cannula to the reaction flask, such that the concentration of monomer was 1.0 M. With stirring, acrylic acid was added to the reaction flask via a nitrogen-purged syringe. The flask was placed in an oil bath thermostated at 80° C. and stirred at that temperature for 16 hours. The reaction mixture was then cooled to room temperature and the water was removed under reduced pressure. The resulting white solid was then dried under reduced pressure until a constant mass was reached.

Synthesis of iron oxide nanoparticles: Iron oxide ("IO") nanoparticles ("NPs") were prepared by the coprecipitation of Fe(II) and Fe(III) chlorides in an alkaline solution. A mixture of 2.15 g $FeCl_2.4H_2O$ and 5.87 g $FeCl_3.6H_2O$ (1:2 mole ratio), and 0.125 g of citric acid were dissolved in 100 mL DI water. The solution was heated to 90° C. under magnetic stirring followed by injection of 25 mL of 30% wt. aqueous $NH_4OH$ solution to nucleate the IO NPs. The NP growth was continued for 2 hours at 90° C. The mixture was then cooled to room temperature and centrifuged to recover 2.5 g of IO NPs that were dispersed in 50 mL of DI water with a Branson probe sonication microtip.

Amine-functionalization of IO NPs: Hydrolysis and condensation of APTES was conducted by mixing 12.5 ml of APTES in 125 g of a 5% wt. acetic acid solution. After an hour of acid hydrolysis, which has been shown to form dimers and higher oligomers of APTES, pH was adjusted to 8 using 1 N NaOH solution. The reaction mixture was further diluted with DI water followed by the addition of 50 ml of IO NP solution (2.5 g of IO) to reach a total volume of 500 ml and a final IO concentration of 0.5% w/v. This mixture was placed in a water bath at 65° C. for 20-24 hours under magnetic stirring. After removal from the bath, the cooled NPs were separated with a strong magnet, supernatant was discarded, and the NPs were washed twice with 200 ml of DI water. Then, the washed NPs were dispersed in 50 ml of DI water, pH was adjusted to 6 with 1 N HCl, NPs were probe sonicated for 30 minutes, and centrifuged at 4000 rpm for 10 minutes to remove large clusters. The amine-functionalized IOs in the supernatant were retained for grafting PAMPS-PAA polymer. The typical yield at the end of APTES functionalization was 60-70% IO.

Grafting of PAMPS-PAA on amine IO NPs: The amine-functionalized IO NP clusters were coated with the PAMPS-PAA(3:1) copolymer by forming amide bonds between the PAA anchoring groups and the amine groups on the IO surface. Grafting was conducted by first dissolving polymer with 1 N NaOH to pH=6, followed by addition of 20% wt. NaCl solution, DI water, and amine IO stock solution under vigorous magnetic stirring to reach a final concentration of 1% IO, 5% polymer, and 3% NaCl. The pH was again adjusted to 6, and after 5-10 minutes, EDC (same moles as PAA) was added to facilitate amide bond formation. The reaction was continued overnight at room temperature under constant stirring. The polymer-coated iron oxide NPs were separated by centrifugation and washed with DI water twice to remove excess polymer and NaCl. The NPs were finally dispersed in DI water at ~2% w/v IO. Typical IO yield after this procedure was 70-90% IO. A high polymer to IO ratio (5:1) and NaCl encouraged enhanced adsorption of polymer on NPs and formed thick polymer layers. Electrostatically attached PAMPS-PAA IO NPs were prepared for the polymer desorption test by a similar procedure, except that EDC was not added.

Adsorption of polymer-coated IO NPs on silica: A batch technique was used to measure the IO NP adsorption on 8 µm colloidal silica microspheres. The colloidal silica was washed at least five times with DI water to remove fines. Optical and scanning electron microscopy images showed uniformly sized silica spheres, as shown in FIGS. 9a-9b. FIG. 9a is a bright-field optical and FIG. 9b is a SEM micrograph of colloidal 8 µm silica spheres showing highly uniform particles. BET measurements indicated a surface area of 0.58 $m^2$/g, which was consistent with the non-porous nature of colloidal silica. In a glass vial, 2 mL of aqueous dispersion of IO nanoclusters was added to 1 g of silica. The initial concentration of IO ranged from 0.05% to 1% w/v. The glass vials were sealed and shaken overnight on a LW Scientific Model 2100A Lab Rotator at 200 rpm at room temperature, after which the mixture was left undisturbed to allow the silica adsorbent to sediment by gravity. The concentration of the IO NPs in the supernatant was determined by measuring the UV-vis absorbance at 575 nm after dilution of the samples, where necessary, such that the absorbance was below 2. For all particles tested, there was a strong linear correlation between absorbance at 575 nm and the IO concentration in solution. The specific adsorption and monolayer coverage of IO nanoclusters to silica microspheres was calculated based on the difference in the supernatant concentrations and volumes before and after adsorption.

Polymer desorption test: The PAMPS-PAA-grafted IO NPs were diluted 200 fold to 0.01% w/v IO in 1 M NaCl solution and equilibrated for 24 hours to allow desorption of non-covalently attached polymer. The NPs were centrifuged at 15,000 g and dispersed in DI water after discarding the supernatant. The dilution and equilibration steps were repeated, followed by NP separation by centrifugation and redispersion of IO NPs in DI water by probe sonication. These two rounds of 200 fold dilution amounted to a 40,000 fold dilution of the initial IO solution. The final IO sample was tested for stability in standard API brine at 90° C. As a control, electrostatically attached PAMPS-PAA on IO NPs (prepared without EDC) was also subjected to a similar dilution test followed by assessment of colloidal stability in standard API brine at 90° C.

Characterization of the IO NPs: Dynamic light scattering ("DLS") analysis was performed to measure the hydrodynamic diameter of PAMPS-PAA polymer and grafted IO NPs in DI water and standard API brine using a Brookhaven ZetaPlus instrument at 90° scattering angle. The built-in temperature controller allowed DLS measurements at higher temperatures. The collected autocorrelation functions were fitted with the CONTIN algorithm. Measurements were made over a period of 3 minutes, and at least three measurements were performed on each sample. The measurements were conducted with a 02% wt. PAMPS-PAA and 0.005% wt. IO NPs solution that gave a measured count rate of approximately 35 and 500 kcps, respectively. Electrophoretic mobility of PAMPS-PAA polymer and grafted IO NPs was measured with a Brookhaven ZetaPlus instrument at a 15° scattering angle at room temperature. Mobility of iron oxide nanoparticles was collected in 10 mM KCl (Debye length $\kappa^{-1}$=3 nm). A set of 10 measurements with 30 cycles for each run were averaged. Electrophoretic mobility measurements at higher salinity were collected at 3 V and 20 Hz frequency to overcome polarization issues. Thermogravimetric analysis ("TGA") was used to measure the organic content of the IO NPs after APTES functionalization and PAMPS-PAA grafting. Measurements were conducted using a Mettler-Toledo TGA/SDTA851e instrument under air at a heating rate of 5° C./min from 25 to 800° C. The percentage loss of weight was reported as the mass fraction of organic coating on the iron oxide. Transmission electron microscopy ("TEM") was performed on a FEI TECNAI G2 F20 X-TWIN TEM. A dilute aqueous dispersion of the IO NP clusters was deposited onto a 200 mesh carbon-coated copper TEM grid for imaging. Flame atomic absorption spectrometry ("FAAS") was used to measure the concentration of iron in the dispersion. Measurements were performed using a GBC 908AA flame atomic absorption spectrometer (GBC Scientific Equipment Pty Ltd) at 242.8 nm with an air-acetylene flame. Superconducting quantum interference device ("SQUID") was used to measure the magnetization curves of powders of IO NPs before and after polymer coating with a Quantum Design MPMS SQUID magnetometer. M-H loops were collected at 300 K. Liquid magnetic susceptibility was measured with a Bartington susceptometer operated at a frequency of 696 Hz.

Figures 10A, 10B, 10C, 10D:
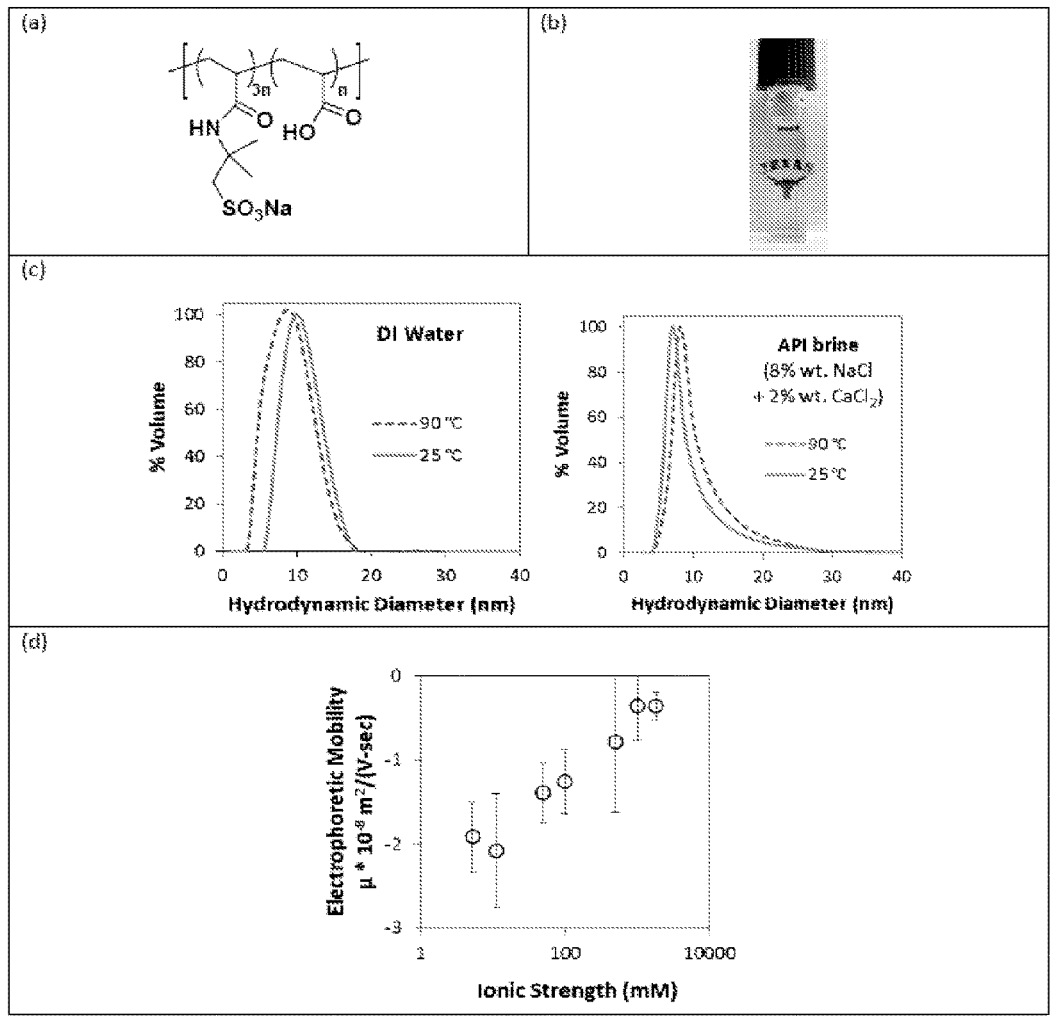
FIG. 10a shows the chemical structure of poly(2-acrylamido-2-methylpropanesulfonate-co-acrylic acid) (PAMPS-PAA 3:1).
FIG. 10b shows a digital image of a PAMPS-PAA (3:1) dispersion that remains soluble in standard API brine at 90° C. as confirmed by visually observed clear solution.
FIG. 10c shows a first graph on the left of the volume-weighted hydrodynamic diameter ("$D_H$") of PAMPS-PAA (3:1) that was maintained at ~10 nm in DI water at 25° C. and 90° C., and shows a second graph on the right of the volume-weighted hydrodynamic diameter ($D_H$) of PAMPS-PAA (3:1) that was maintained at ~10 nm in standard API brine at 25° C. and 90° C. with minimal contraction and aggregation in standard API brine.
FIG. 10d is a plot of electrophoretic mobility of PAMPS-PAA (3:1) in a series of combined $Na^+$ and $Ca^{2+}$ solutions at pH 8 and fixed Na/Ca mole ratio=7.6 (same as standard API brine).
Figure 11:
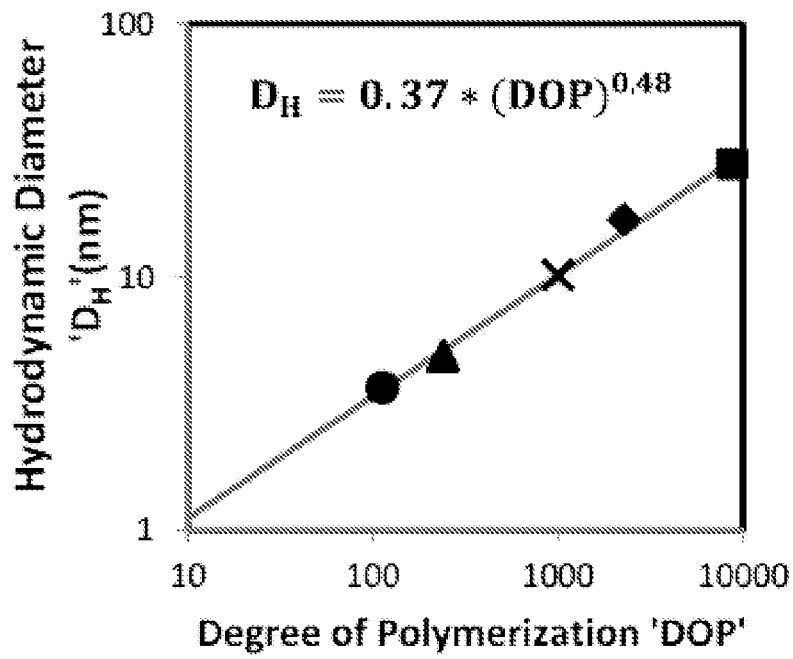
FIG. 11 is a plot of the correlation between volume-weighted hydrodynamic diameter and degree of polymerization of commercial polymers that was used to estimate degree of polymerization of synthesized polymers.

PAMPS-PAA phase behavior, hydrodynamic diameter, and electrophoretic mobility in brine: A random copolymer of 2-acrylamido-2-methylpropanesulfonate ("AMPS") and acrylic acid ("AA") with a monomer ratio of AMPS:AA=3:1 (see FIG. 10a) was synthesized by aqueous free radical polymerization, and its composition was confirmed by proton NMR. Referring to FIG. 11, The molecular weight ("MW") of the synthesized PAMPS-PAA was estimated by correlating the hydrodynamic diameter ($D_H$) to the degree of polymerization ("DOP") of anionic copolymers of known MWs at pH 8 in 1 M NaCl. FIG. 11 is a plot of the correlation between volume-weighted hydrodynamic diameter, $D_H$, and degree of polymerization, DOP, for the following polyelectrolytes in 1 M NaCl at pH 8: 20 kDa poly(styrene sulfonate-co-maleic acid) sodium salt with a 3:1 monomer ratio commercially obtained from Sigma-Aldrich, DOP=113 (designated in plot by •); 40 kDa poly (acrylic acid-b-styrene sulfonate) sodium salt with a 70:170 block composition synthesized by atom transfer radical polymerization ("ATRP"), and a molecular weight ("MW") determined by gel permeation chromatography before sulfonation, DOP=240 (designated in plot by ▲); 200 kDa poly(acrylamide-co-acrylic acid) sodium salt with a 1:3 monomer ratio commercially obtained from Sigma Aldrich, DOP=2266 (designated in plot by ♦); 2 MDa poly(acrylamide-methyl-propane sulfonte) commercially obtained from Sigma-Aldrich, DOP=8734 (designated in plot by ■). The correlation size exponent was 0.48, which is close to the random coil configuration and consistent with similar measurements on acrylic acid and sulfonic acid copolymers. Based on the correlation indicated in the plot in FIG. 11 by the x designator, a 10 nm $D_H$ of PAMPS-PAA (3:1) translated to a DOP of 1000 and a MW of 200 kDa.

A similar correlation between $D_H$ and DOP for poly (acrylic acid-co-sulfonic acid) was validated by static light scattering measurements. The $D_H$ of 10 nm for the PAMPS-PAA (3:1) translated to a DOP of approximately 1000 (750 AMPS:250 AA groups) and a MW of approximately 200 kDa. As shown in FIG. 10b, a 2 mg/mL solution of PAMPS-PAA remained visually clear after 24 hours at 90° C. in standard API brine. The observed lack of phase separation in these very harsh salinity and temperature conditions has rarely been reported. The polymer conformation was investigated by dynamic light scattering to determine the hydrodynamic diameter in DI water and standard API brine at both 25 and 90° C. (results shown in FIG. 10c). In each case, a $D_H$ of approximately 10 nm was observed, which indicated that PAMPS-PAA chains did not undergo significant aggregation or collapse. While a slight tail in the volume distribution measured in standard API brine indicated that a small amount of aggregation occurred, the overall distribution indicated only modest chain contraction upon addition of the concentrated ions. In both DI water and standard API brine, minimal changes were observed when the temperature was increased from 25 to 90° C.

The electrophoretic mobility (u) of PAMPS-PAA was determined in a series of saline solutions with a fixed $Na^{2+}/Ca^{2+}$ mole ratio=7.6 (same as standard API brine) up to 1.8 M ionic strength at pH 8. As shown in FIG. 10d, at an ionic strength of 10 mM, a $\mu$ of $-2 \times 10^{-8}$ m$^2$/(V-sec) was measured, which indicated that the PAMPS-PAA chains were highly charged, and that the sulfonic acid (pKa=1) and acrylic acid (pKa=4.5) groups were mostly deprotonated. The magnitude of $\mu$ decreased with increasing ionic strength to a value of $-0.4 \times 10^{-8}$ m$^2$/(V-sec) at 1.8 M ionic strength (standard API brine) due to the screening of the charges by the counterions with very thin double layers at the extremely high ionic strength. However, the maintenance of a significant negative charge even at such high salinity of both $Na^+$ (1.4 M) and $Ca^{2+}$ (0.18 M) suggests that the $Ca^{2+}$ ions do not fully neutralize all of the anionic sites on the PAMPS-PAA by either nonspecific or specific binding. In contrast, the magnitude of the electrophoretic mobility for other less hydrophilic sulfonate polymers, including PSS, was reported to decrease much more rapidly even at low divalent ion concentrations of 7 mM $Mg^{2+}$ due to strong ion binding and weaker hydration.

The observed effects of cations on the conformation, phase behavior, and electrophoretic mobility of PAMPS-PAA were consistent with the previously reported behavior of the respective homopolymers in the presence of salts. Polyacrylic acid ("PAA") is a weak polyelectrolyte (pKa=4.5), and consequently the carboxylate anion interacts strongly with divalent counterions at pH≥7. As previously shown by $^{23}Na$ NMR relaxation measurements, Na-PAA exhibits relatively weak binding between $Na^+$ and the anionic acrylate, yet much stronger interactions with $Ca^{2+}$. In fact, this strong association of PAA with multivalent cations is a reason PAA is often chosen as an anchor group for metal oxide NPs. Isothermal calorimetry studies have demonstrated that the association of PAA with $Ca^{2+}$ is endothermic, however the binding is driven by the entropy gained via the release of 10 water molecules and 2 $Na^+$ ions per bound $Ca^{2+}$. In accord with the favorable entropy for binding of $Ca^{2+}$, increased precipitation of PAA with $Ca^{2+}$ has been observed with rising temperature. Neutron and light scattering measurements close to the phase boundary demonstrated that the radius of gyration ("$R_g$") and $D_H$ of PAA decreased more than two fold upon complexation with $Ca^{2+}$ at concentrations of 2.5 mM PAA and 1 mM $Ca^{2+}$. At higher $Ca^{2+}$ concentrations, this complexation leads to decreased solvation and polymer precipitation. Relative to PAA, more hydrophilic polycarboxylates including polyasparte ("PAsp") and polyacrylamide-co-methyl butanoate ("PAMB") with amide functionalities exhibit reduced $Ca^{2+}$ binding and enhanced solubility in $Ca^{2+}$ brines even at temperatures up to 70° C. relative to the more hydrophobic PAA.

Figure 12:
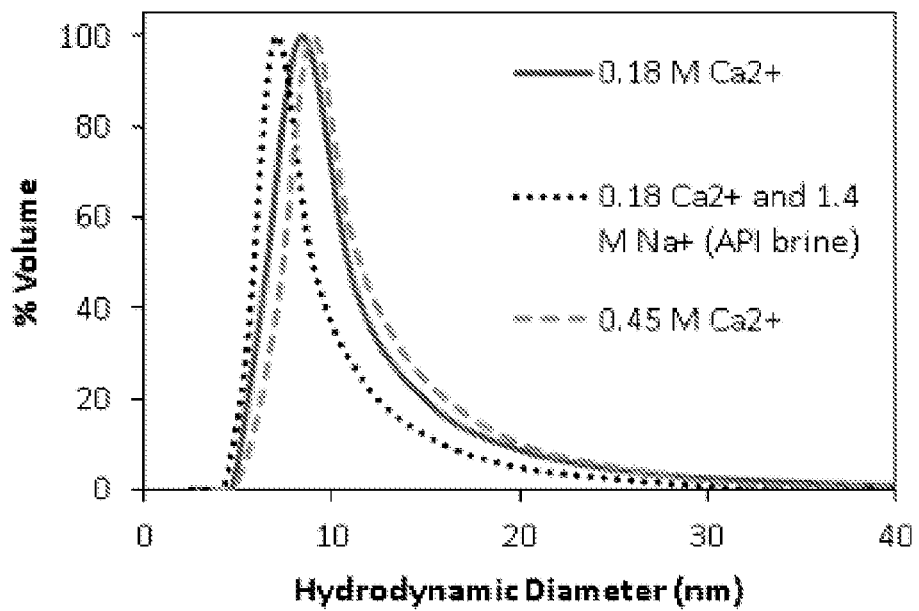
FIG. 12 is a graph showing hydrodynamic diameters ("$D_H$") of PAMPS-PAA (3:1) in 0.18 M $Ca^{2+}$, standard API brine and 0.45 M $Ca^{2+}$ at room temperature and pH 8 showing unchanged $D_H$ in all media.

In contrast to polycarboxylates, PAMPS is a much more strongly acidic polyelectrolyte (pKa=1) and thus interacts more weakly with divalent cations. $^{23}Na$ NMR spectroscopy revealed that the coupling constant for Na-PAMPS is maintained with added $Ca^{2+}$ even at PAMPS/$Ca^{2+}$ molar ratio of 1.4 (0.4 mM monomer and 0.6 mM $Ca^{2+}$), suggesting relatively weak binding to $Ca^{2+}$. In addition to the high acidity of PAMPS' sulfonate group, the hydrophilic amide group (see FIG. 10a) favors hydration, to further weaken $Ca^{2+}$ binding. Even for polyelectrolytes such as PAMPS with weak specific ion complexation, the ionic strength has a large effect on the polymer conformation. At low salinities, the counterions in the polyelectrolyte chains with their associated waters of hydration produce osmotic swelling. At very high salinities (≥1 M), however, this osmotic driving force decreases, and furthermore the charges on the polyectrolyte chain are highly screened by the presence of free ions in solution. These two factors cause the chains to contract to the size of an uncharged polymer, as was reported for PSS and PAA in solutions of varying $Ca^{2+}$ content. Interestingly, PAMPS-PAA appeared to be relatively resistant to this phenomenon, as evidenced by the very slight contraction observed only in narrowing of the $D_H$ distribution when changing from DI water to standard API brine (see FIG. 10c). While it is possible that the presence of $Na^+$ may dilute the effect of stronger interactions of PAMPS-PAA with $Ca^{2+}$, the observed $D_H$ profile of PAMPS-PAA in pure $Ca^{2+}$ solutions (0.18 M and 0.45 M $Ca^{2+}$) also showed little contraction compared to DI water, and was very close to the standard API brine $D_H$ profile. FIG. 12 is a graph showing minimal contraction compared to DI water, and was nearly identical to that observed in standard API brine.

Hydrodynamic diameters measured by DLS of 200 kDa PAMPS-PAA (3:1) in 0.18 M $Ca^{2+}$, standard API brine and 0.45 M $Ca^{2+}$ at room temperature and pH 8: The lack of chain collapse in high ionic strength solutions reflects the judicious design of the copolymer. The 750 hydrated PAMPS groups in the copolymer chain do not bind specifically to $Ca^{2+}$, and furthermore mask the much more favorable $Ca^{2+}$ binding of the 250 PAA groups, thereby preventing significant collapse of the chain. The statistical distribution of the monomer units throughout the polymer backbone places stabilizing AMPS groups adjacent to AA groups, which promotes hydration of AA and weakens $Ca^{2+}$ binding relative to a pure PAA chain.

Subsequent efforts were focused on examining the effect of temperature on the conformation of PAMPS-PAA by measuring the hydrodynamic diameter at 90° C. (see FIG. 10c). Remarkably, the PAMPS-PAA chains were observed to undergo minor contraction at high salinities (1.4 M $Na^+$ and 0.18 M $Ca^{2+}$ brine) both at ambient and high temperatures up to 90° C. (see FIG. 10c), which was consistent with the maintenance of sufficient negative charge as shown in the electrophoretic mobility and the macroscopically clear phase observed after 24 hours. Moreover, the observed maintenance of $D_H$ at high temperature was in good agreement with previous studies in which PSS and PAMPS copolymers in salt-free solutions were shown to maintain their scattering profile in DI water up to 55° C. by small angle X-ray and neutron scattering. Additionally, macroscopically clear phases have been reported for poly(AMPS-co-acrylamide) copolymers in 3% $CaCl_2$ up to 100° C. Overall, the high acidity and hydrophilicity of the AMPS groups in PAMPS-PAA promoted hydration and reduced $Ca^{2+}$ affinity, providing excellent solvation even in the presence of PAA. The detailed characterization of PAMPS-PAA in highly concentrated standard API brine at 90° C. provided a basis for understanding its behavior as a stabilizer when grafted on nanoparticles.

Figure 13A:
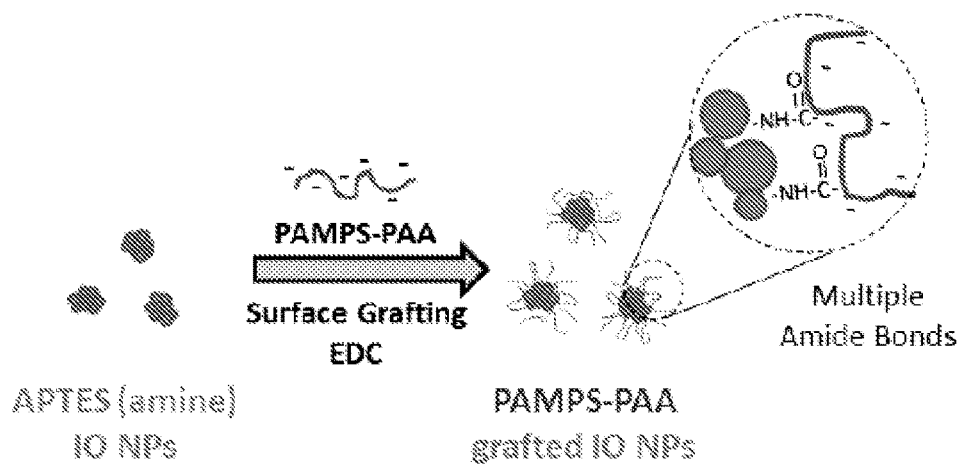
FIG. 13a is a schematic showing PAMPS-PAA multi-point grafting to amino propyl triethoxy silane ("APTES")-functionalized iron oxide ("IO") nanoparticles ("NPs") via amidation.
Figure 14:
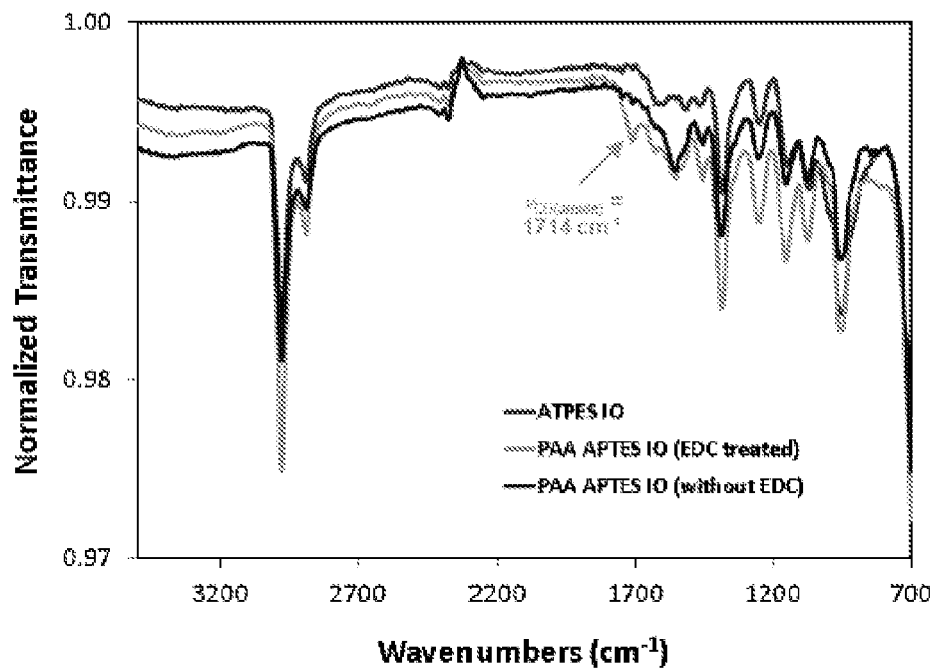
FIG. 14 is a graph of the FTIR spectra of APTES IO and PAA coated IO NPs.

To achieve robust covalent attachment of the synthesized PAMPS-PAA to the IO surface, a "grafting to" process was utilized, which enables direct attachment of pre-formed copolymers with desired molecular weight and well-defined composition. This process circumvents the limitations of the alternative, the "grafting from" approach, including the need for surface grafted initiators, catalysts, and oxygen-free conditions. As shown in FIG. 13a, PAMPS-PAA was grafted to amine-functional iron oxide ("IO") nanoparticles ("NPs") by formation of multiple amide bonds via a condensation reaction between the carboxylate groups on the polymer and IO surface amine groups, catalyzed by 1-ethyl-3-(3-dimethylaminopropyl)carbodiimide ("EDC"). Referring to Table 9, the amine groups on the surfaces of the IO NPs were installed by conjugation with (3-aminopropyl)triethoxysilane ("APTES") as evidenced by (i) a positive electrophoretic mobility of +1.9×10$^{-8}$ m$^2$/(V-sec) at pH 6, (ii) the presence of 7% wt. organics by thermogravimetric analysis, and (iii) FTIR spectroscopy, which revealed the expected peaks corresponding to Si—O (1070 and 1150 cm$^{-1}$), N—H (1622, 1387, and 957 cm$^{-1}$) and C—H (2980 cm$^{-1}$) moeities (see FIG. 14). Table 9 is a summary of colloidal and magnetic properties of IO nanoclusters before and after the PAMPS-PAA (3:1) grafting.

TABLE 9

| Property | APTES IO | PAMPS-PAA (3:1) grafted APTES IO |
|---|---|---|
| Hydrodynamic diameter $D_H$ (nm) | 55 ± 7[a,b] | 165 ± 24[a,c] |
| Electrophoretic mobility μ (10$^{-8}$ m$^2$/(V-sec) | +1.9 ± 0.3[a] (pH 6) | −2.8 ± 0.2[a] (pH 8) |
| % organics by TGA | 7 | 15 |
| Magnetic Susceptibility of IO liquid dispersion at 700 Hz (SI units) | 0.105 (2.1% wt. IO) | 0.083 (1.7% wt. IO) |
| Magnetic Susceptibility/g-Fe (SI units)[d] | 7.0 | 6.8 |

[a]Reported value is the average of five independent studies.
[b]$D_H$ of APTES IOs measured in DI water.
[c]$D_H$ of PAMPS-PAA grafted IOs measured in standard API brine.
[d]Susceptibility of ~2% wt. IO dispersion measured in DI water and converted to SI units (/g-Fe).

Figure 13D:
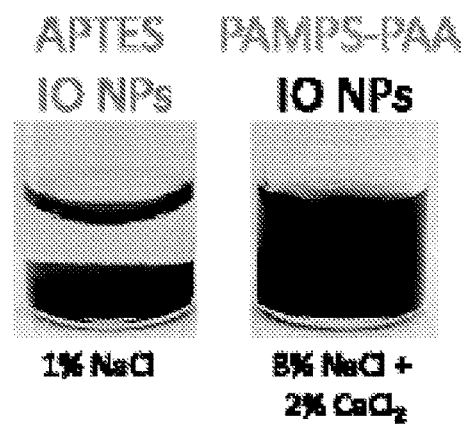
FIG. 13d shows two digital images of dispersions of APTES IO in 1% NaCl (left image) and PAMPS-PAA grafted IO NPs in standard API brine (right image).
Figure 13B:
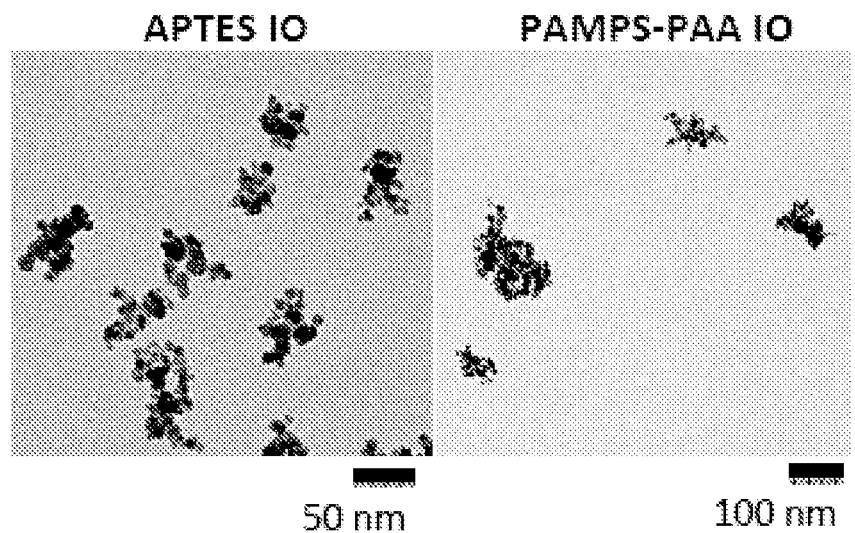
FIG. 13b shows transmission electron microscopy images of APTES IO NPs (left image) and PAMPS-PAA (3:1) grafted IO NPs (right image).
Figure 13C:
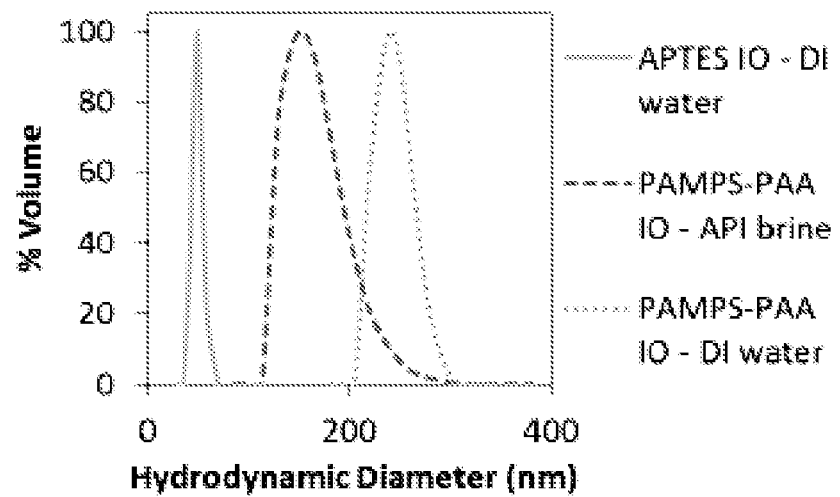
FIG. 13c is a graph of the volume-weighted hydrodynamic diameter distribution of APTES IO NPs in DI water, and PAMPS-PAA grafted IO NPs in DI water and standard API brine at pH 8.

Referring to FIG. 13b, analysis by transmission electron microscopy ("TEM") revealed that ~50 nm diameter amine-coated nanoclusters ("APTES IO") were composed of primarily IO NPs with a mean diameter of 8 nm. FIG. 13b shows transmission electron microscopy images of APTES IO NPs (left image) and PAMPS-PAA (3:1) grafted IO NPs (right image). Referring to FIG. 13c and Table 9, a $D_H$ of 55 nm was measured for the APTES IO, which was in good agreement with the cluster diameter observed by TEM, and was consistent with the small size of the aminopropyl groups on the surface (<1 nm). FIG. 13c shows a graph of the volume-weighted hydrodynamic diameter distribution of APTES IO NPs in DI water, and PAMPS-PAA grafted IO NPs in DI water and standard API brine at pH 8.

Figure 15:
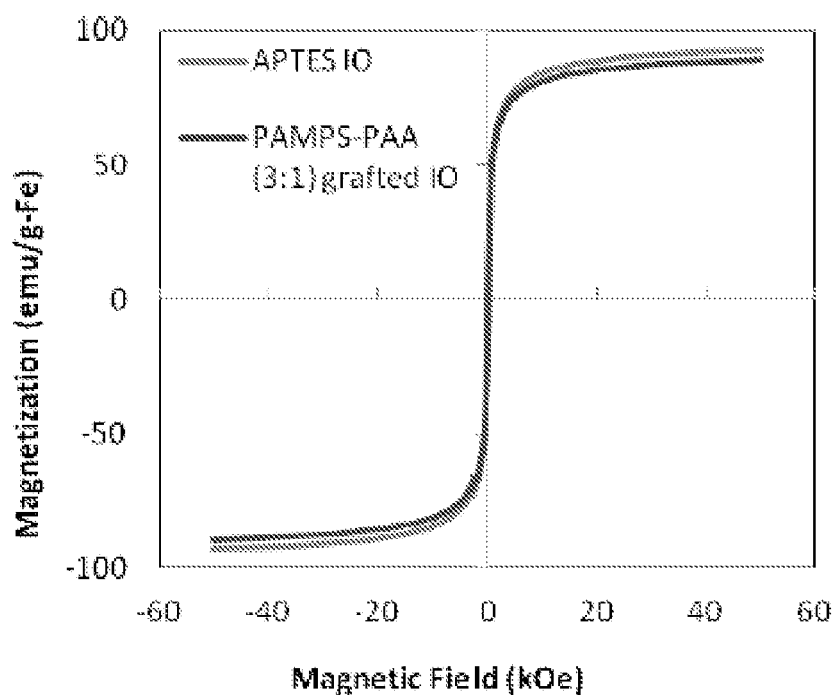
FIG. 15 is a plot of the magnetization curves of powders of APTES IO NP clusters before and after grafting with a PAMPS-PAA (3:1) copolymer, both displaying very similar saturation magnetization.

While the covalent grafting of the anionic PAMPS-PAA on the cationic amine surface at pH 6 was expected to be favorable by the electrostatic attraction at low graft densities, as the graft density increases the negative charge in the brush layer will inhibit further grafting. The grafting procedure was therefore performed in the presence of NaCl to screen the charges. After grafting with anionic PAMPS-PAA, the electrophoretic mobility was reversed to a negative value of −2.8×10$^{-8}$ m$^2$/(V-sec) at pH 8 and the organic content increased to 15% wt., as measured by TGA (see Table 9). After PAMPS-PAA grafting, the volume-based magnetic susceptibility of the liquid dispersion changed little from 7 to 6.8/g-Fe (see Table 9), and the saturation magnetization, as shown in FIG. 15, was also essentially unchanged at ~90 emu/g-Fe, indicating that the magnetic properties of IO NPs were not significantly affected by the grafting process. FIG. 15 is a plot of the magnetization curves of APTES IO NP clusters before and after grafting with a PAMPS-PAA (3:1) copolymer, both displaying very similar saturation magnetization at 92.9 and 89.5 emu/g-Fe, respectively.

After polymer grafting, the $D_H$ of the IO particles in DI water increased from 55±7 to 258±34 nm, as determined by DLS and TEM (see FIGS. 13b, 13c). This increase was much larger than expected from the grafting of PAMPS-PAA with an $R_g$ of only 10 nm. Presumably, the grafting process led to aggregation of clusters, and/or to a process such as Ostwald ripening, whereby primary particles diffuse from smaller to larger clusters to lower the interfacial energy. Furthermore, the size of clusters may have been influenced by short-ranged attraction versus long-ranged repulsion between primary particles, which is mediated by the polymer as reported for nanoclusters of proteins and Au NPs. Nonetheless, as shown in FIG. 13d, the PAMPS-PAA grafted IO NPs were found to form stable dispersions in standard API brine at room temperature, whereas before grafting, the APTES IO aggregated in only 1% NaCl. FIG. 13d shows digital images of dispersions of APTES IO in 1% NaCl (left image) and PAMPS-PAA grafted IO NPs in standard API brine (right image). Notably, the dispersions appeared uniform and stable visually and did not settle, thus demonstrating the first example of stabilization of polyelectrolyte coated inorganic NPs at such high divalent salinity. Moreover, the dispersions maintained their stability at elevated temperatures (e.g., 90° C.). The stability of the dispersions suggests that the polymer chains remained solvated in the brine and provided excellent steric stabilization. The exceptional stability was corroborated by measuring the $D_H$ in standard API brine at room temperature and at 90° C. over an extended period of time.

Notably, a decrease in $D_H$ from 258±34 nm in DI water to 165±24 nm in standard API brine (see Table 9 and FIG. 13c) was observed, which may have been caused by increased cluster density due to weaker electrostatic repulsion between primary particles and/or reduced osmotic swelling. Regardless, the $D_H$ measured in standard API brine at 90° C. remained constant ($D_H$=180-200 nm) over a period of 30 days, demonstrating that the clusters were exceptionally stable, and that only a negligible amount of aggregation occurred (see FIG. 16b). Together with the visual observations (see FIG. 16a), the high temperature DLS results confirm that the grafted IO NPs colloidal dispersions exhibited remarkable colloidal stability in standard API brine at 90° C. for 1 month. This result constitutes the first demonstration of long-term stability of inorganic NPs at high temperatures at high salinity with divalent ions.

Figures 16A, 16B, 16C:
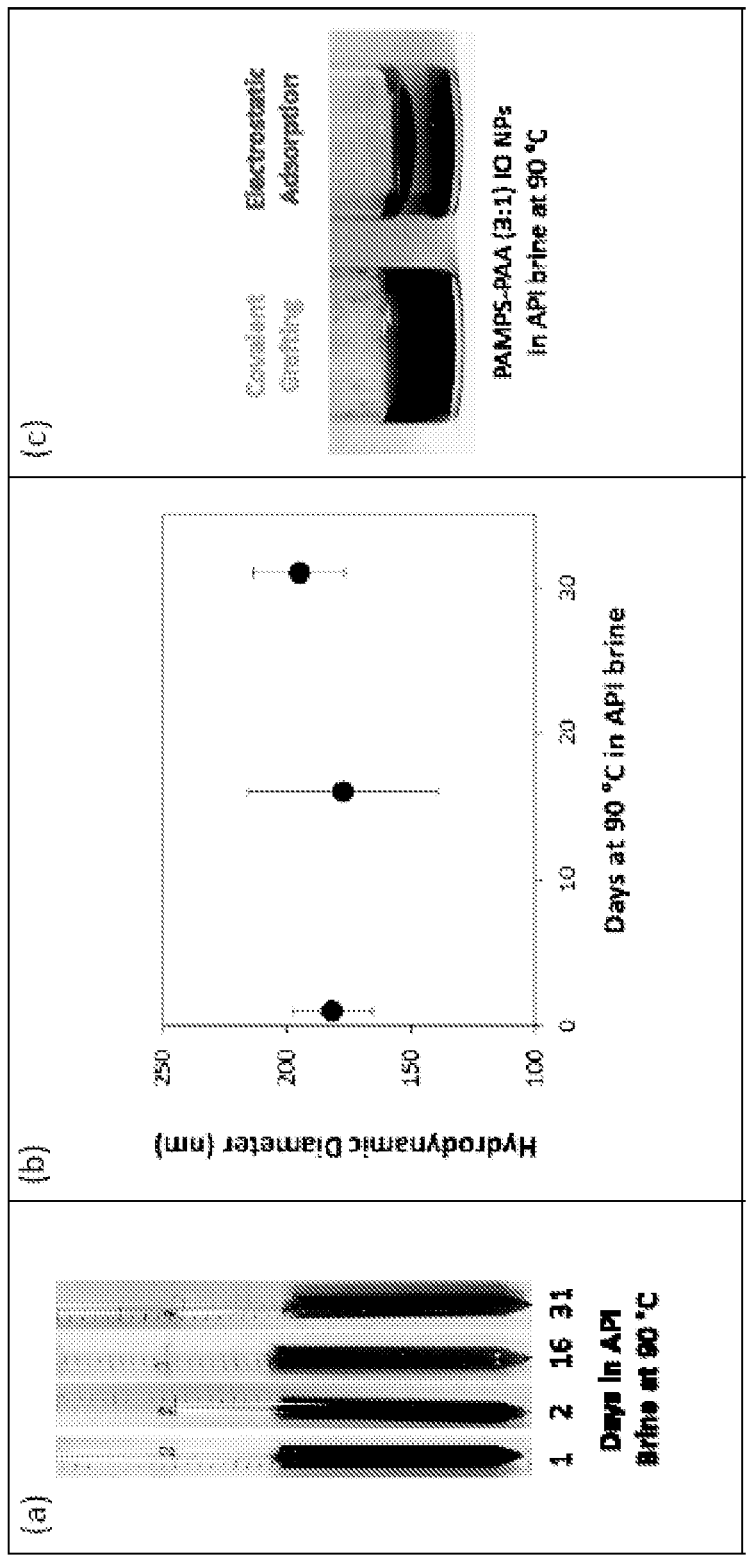
FIGS. 16a-16c show the characterization of PAMPS-PAA (3:1) grafted APTES IOs stable in standard API brine at 90° C. for up to 31 days, where

Further efforts were directed towards determining whether the PAMPS-PAA chains were covalently grafted to the IO NP surfaces, rather than physically adsorbed. To this end, the dispersions were diluted by a factor of 40,000 to concentrations of 0.01% w/v IO. FIG. 16c is a digital image showing that after a serial dilution test to drive polymer desorption, PAMPS-PAA (3:1) grafted IO NPs remained stable at 0.2% wt. IO in standard API brine at 90° C. (left glass container), whereas IO NPs with electrostatically attached PAMPS-PAA aggregated (right glass container). After dilution, the recovered particles were found to be stable in standard API brine at 90° C. for 24 hours at a concentration of 0.2% w/v IO, indicating that the polymer must have remained on the IO NP surface. In contrast, when no EDC was used during the grafting process and PAMPS-PAA was simply electrostatically adsorbed onto IO NPs, the particles aggregated in less than 30 minutes in standard API brine at 90° C. after the dilution was conducted. Presumably after such a drastic dilution, the highly hydrophilic polymer would desorb from the NP surface and diffuse into the aqueous phase if not covalently attached, thus the observed stability of the particles treated with polymer and EDC strongly suggests that the polymer is covalently attached to the IO. Unfortunately, attempts to investigate the grafting via IR spectroscopy to identify amide bonds between PAMPS-PAA and amine IOs was ineffective given the inability to distinguish between the peaks corresponding to the grafting amide bonds and the amide bonds in the AMPS side groups. As an alternative control, a PAA homopolymer was grafted to APTES IOs via the same EDC-catalyzed amidation method. A broad peak at 1700 cm$^{-1}$ (see FIG. 14) indicated that amide bonds were formed between PAA and APTES IO by the EDC-catalyzed grafting reaction. On the contrary, when EDC was not used, no amide peak was observable in the IR spectrum.

As demonstrated by the dilution test, the covalent bonding of PAMPS-PAA to nanoparticle surfaces provided much more robust attachment than chemisorption, for example by reversible charge-transfer complexes between iron cations and polycarboxylates as shown in FIGS. 13 and 16. Furthermore, unlike the generally reported single covalent bond attachment of terminal functional polymer chains, aspects of the present invention accomplish an attachment of PAMPS-PAA chains through formation of multiple amide bonds facilitated by the presence of approximately 250 AA groups per PAMPS-PAA chain. The stable amide bonds between IO NPs and PAMPS-PAA ensured that the AMPS groups maintained steric stabilization. Even if a fraction of the covalent bonds degraded, multiple attachments were still left, which likely helped maintain colloidal stability of PAMPS-PAA grafted IO NPs in standard API brine at 90° C. even after a 40,000 fold dilution (see FIG. 16c).

Figure 17:
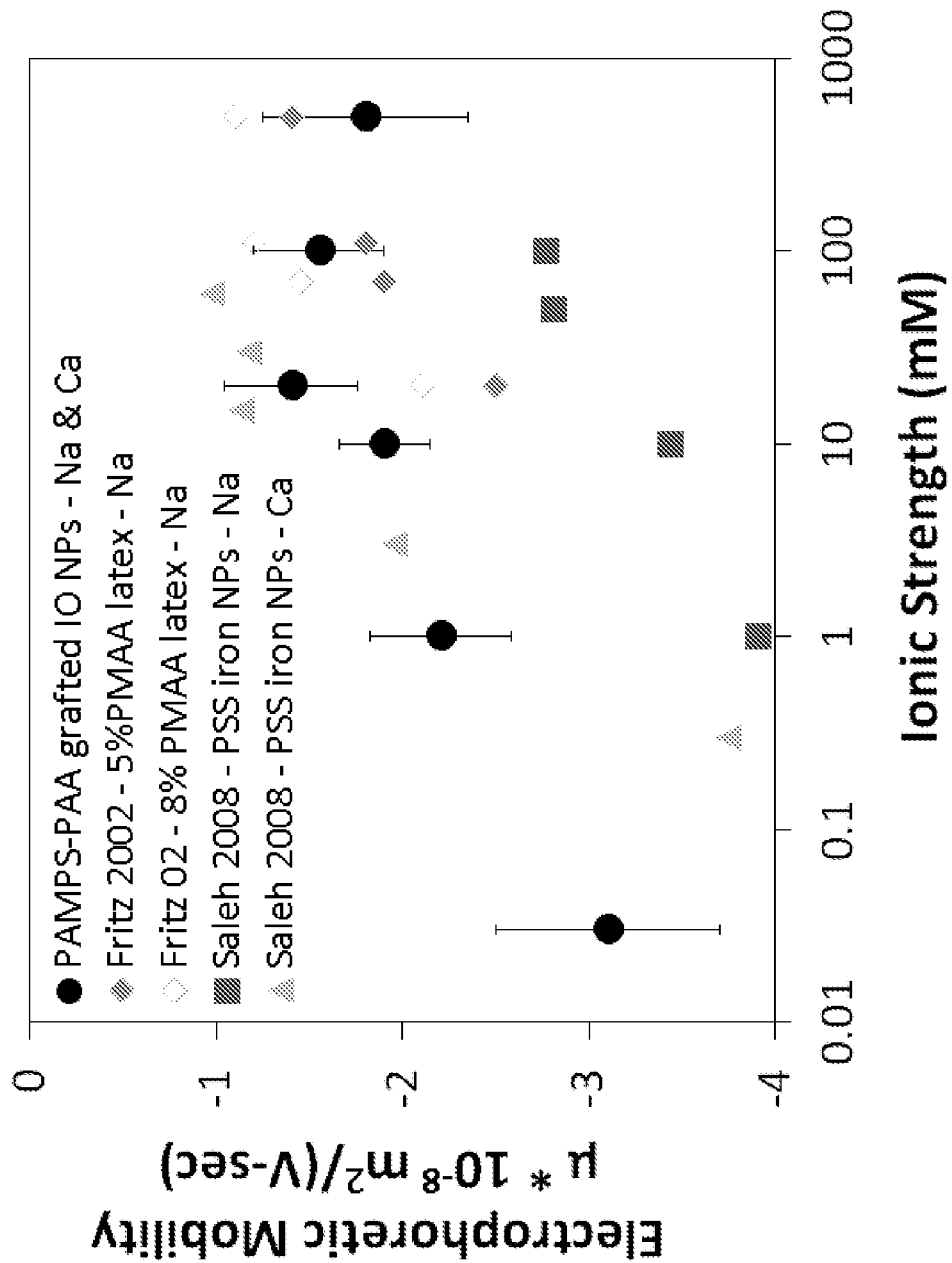
FIG. 17 is a plot of electrophoretic mobility of PAMPS-PAA (3:1) grafted IO NPs versus ionic strength in combined $Na^+$ and $Ca^{2+}$ solutions compared to mobility values of nanoparticles from literature in $Na^+$ or $Ca^{2+}$ solutions.

Referring to FIG. 17, the electrophoretic mobilities (u) of PAMPS-PAA grafted IO NPs were measured in a series of NaCl and CaCl$_2$ solutions with a fixed molar ratio of 7.6:1, which is analogous to the ratio in standard API brine. FIG. 17 is a plot of electrophoretic mobility of PAMPS-PAA (3:1) grafted IO NPs versus ionic strength in combined Na$^+$ and Ca$^{2+}$ solutions (Na$^+$:Ca$^{2+}$ mole ratio=7.6, same as standard API brine) at pH 8 (designated in plot by •). Literature mobility data for other polyelectrolyte-coated NPs including PMAA-stabilized latex and PSS-coated iron NPs is also shown (designated in plot by ■, ▲, and ♦). At low salinity, the μ was observed to be highly negative, −3×10$^{-8}$ m$^2$/(V-sec) in DI water (0.03 mM), reflecting the large number of charges in the polyelectrolyte. The magnitude of the mobility decreased to −2×10$^{-8}$ m$^2$/(V-sec) in a 10 mM solution of both salts, and remained constant within experimental error at a value of −1.8×10$^{-8}$ m$^2$/(V-sec) in 500 mM NaCl and CaCl$_2$). Unlike the measurements in FIG. 10d with pure PAMPS-PAA, μ of the grafted NPs could not be measured above 500 mM due to a large growth in experimental uncertainty, which is quite common for extreme salinities. The reduction in magnitude to a μ of −1.8×10$^{-8}$ m$^2$/(V-sec) at 0.5 M ionic strength (380 mM Na$^+$ and 50 mM Ca$^{2+}$) suggested that significant screening of the charges on the polyelectrolyte occurred, as expected at such high ionic strength. However, the residual mobility indicated that the Ca$^{2+}$ did not bind all of the sulfonate groups, as was also observed for the pure PAMPS-PAA (see FIG. 10d).

The remarkable stability of the PAMPS-PAA grafted IO NPs may be explained by classical concepts in colloid chemistry. According to the classic concept of Napper, the colloidal stability of the PAMPS-PAA-grafted IO NPs (see FIGS. 16a-16c) at all salinities and temperatures may be anticipated, given the limited collapse of the pure polymer (see FIG. 10b). The total interaction potential between two polymer-coated particles is a function of steric repulsion, electrostatic repulsion, and van der Waals attraction. At high salinity (e.g., standard API brine), electrostatic interactions within the polyelectrolyte layer are highly screened by the ions, and the brush may be considered as a neutral polymer. The steric repulsion to the energy barrier comes from two distinct mechanisms: (i) osmotic repulsion between overlapping chains, and (ii) entropy of elastic repulsion. The osmotic repulsion depends upon the particle diameter, brush length relative to the distance between particle surfaces, polymer volume fraction in the brush layer, and the Flory-Huggins interaction parameter $\chi$.

The equilibrium structure of dense polyelectrolyte brushes is governed by a balance between short-ranged excluded volume, long-ranged electrostatic interactions, and the osmotic effects of the counterions in the brush layer, in many ways as described above for pure polyelectrolytes. At low salt concentrations, highly concentrated confined counterions in the brush generate an osmotic pressure that stretches the chains. However, when the concentration of added salt approaches the ion concentration within the brush layer, screening of the electrostatic repulsion and reduction in the osmotic pressure cause the brushes to contract. Eventually, the highly screened polyelectrolyte brush will behave similarly to an uncharged brush. The contraction of polymer brushes with salinity was observed by DLS for polymethacrylic acid ("PMAA")-coated latex NPs, where the brush thickness decreased from 22.3 nm at 100 mM NaCl to 15.8 nm at only 500 mM NaCl at pH 7. Similarly, the thickness of PSS brushes on latex NPs decreased from 65 nm at 0.1 mM $Mg^2$ to 28 nm at 100 mM $Mg^{2+}$.

The charge of the brush layer, which influences the brush conformation may be studied directly in terms of the electrophoretic mobility. Relatively few studies have reported $\mu$ of anionic polyelectrolyte-coated NPs up to the high salinity levels shown in FIG. 17. For each of these colloids coated with various anionic polyelectrolytes, the magnitude of the mobility decreased with ionic strength, but was still significant, more than $-1 \times 10^{-8}$ $m^2/(V\text{-sec})$, even at extremely high ionic strength on the order of 0.5 M. The overall decrease in magnitude was less than two fold in nearly all cases. For the one exception with PSS-coated iron NPs, the change was much more in $Ca^{2+}$ than $Na^+$, consistent with the stronger electrostatic attraction for $Ca^{2+}$ and specific binding as seen with NMR. For the more hydrophilic PAMPS-PAA grafted IO NPs, the mobility remained more negative and measurable at a higher ionic strength of 500 mM relative to only 60 mM for the more hydrophobic PSS. Interestingly, the $\mu$ for PAMPS-PAA IO NPs was as negative at 0.5 M for the combined Ca and Na electrolyte as for Na only in the case of PMAA latex NPs, despite the stronger electrostatic interactions for the divalent cation. Thus, the high fraction of AMPS functional groups, which do not bind $Ca^{2+}$ specifically, in PAMPS-PAA are particularly effective for maintaining a significant mobility and thus particle charge even at extremely high salinity. Given the observed particle mobility in addition to the morphology of the pure polymer measured by DLS, it is likely that the grafted chains on the IO nanoclusters are only partially collapsed, which is further consistent with the impressive colloidal stability.

Steric stabilization has been demonstrated in solutions of up to 5 M NaCl at room temperature for NPs coated with PAA, PMAA, and copolymers containing poly(vinylsulfonate) and/or PSS. Here, the segment-solvent interactions were favorably attractive ($\chi<\frac{1}{2}$) because of the weak affinity of $Na^+$ for the carboxylate or sulfonate anions. When divalent ions are present, PSS-coated iron NPs were stable only up to 100 mM $Ca^{2+}$ at room temperature, and PSS-grafted latex NPs precipitated above 100 mM $Mg^{2+}$. These results are consistent with partial chain collapse of PSS in the presence of divalent ions as observed by small angle neutron scattering ("SANS") and NMR. The divalent ion binding is likely promoted by dehydration of sulfonates due to hydrophobicity of the styrene group. Thus, PSS segment-solvent interactions become repulsive ($\chi>\frac{1}{2}$) at high divalent ion concentrations causing loss of steric stabilization. In contrast, PAMPS-PAA grafted IO NPs remained stable in highly concentrated standard API brine at both room temperature and at 90° C. The highly hydrophilic and acidic AMPS group that binds weakly to $Ca^{2+}$ ensures attractive PAMPS segment-solvent interactions even in the presence of $Ca^{2+}$ with a favorable $\chi$ ($<\frac{1}{2}$) for steric stabilization in standard API brine. The favorable $\chi$ is also evident in the phase behavior and conformation of the pure polymer. When the distance of approach between two NPs becomes closer than the brush thickness, compression of the polymer chains causes a loss in entropy or elastic repulsion. The high MW of PAMPS-PAA and graft density each contribute to the high entropic elastic repulsion contribution. Furthermore, the residual charge, as shown in the electrophoretic mobility, provides a degree of electrostatic repulsion between overlapping brushes that further contributes to the colloidal stability. In summary, the highly screened polymer brushes behaved as neutral brushes with favorable solvation to provide steric stabilization even at high temperatures in standard API brine, similarly to the earlier results for PMAA in NaCl brines at room temperature.

Figures 18A, 18B, 18C:
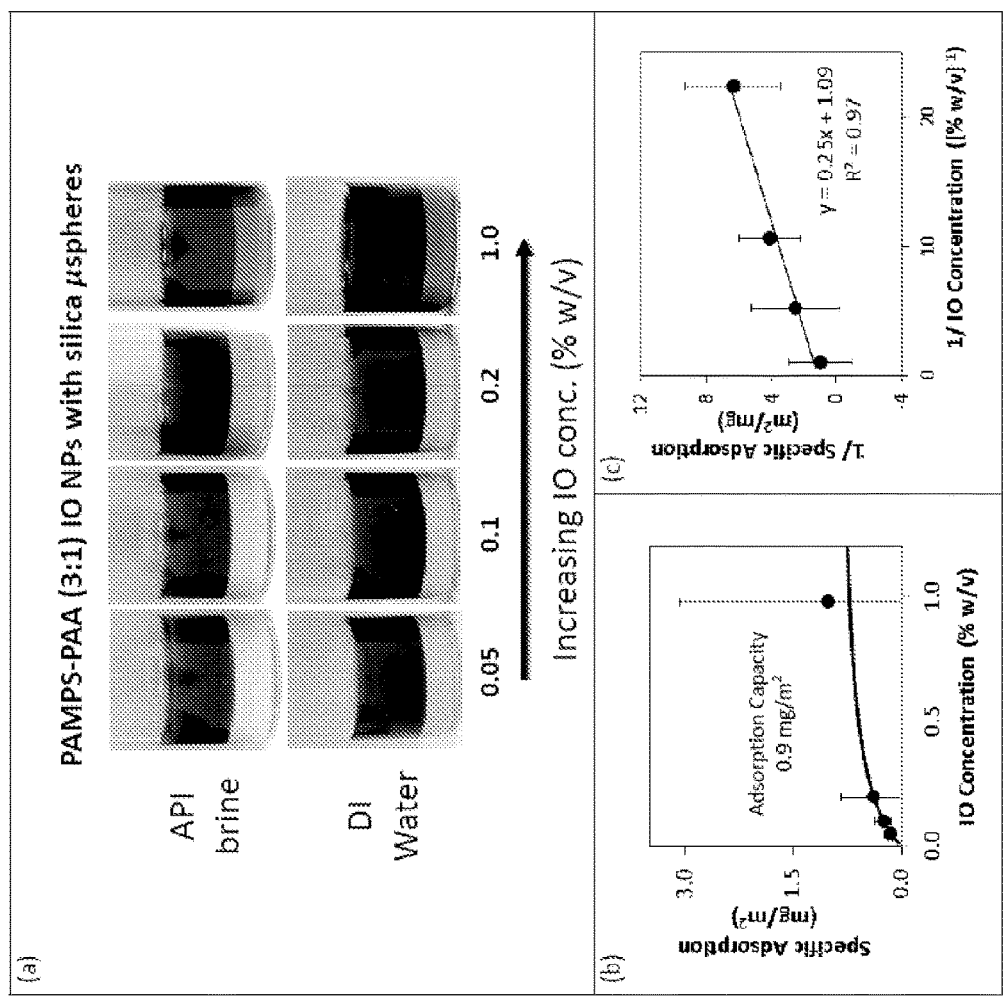
FIG. 18a shows digital images of PAMPS-PAA (3:1) grafted iron oxide ("IO") nanoclusters in standard API brine (top image) and DI water (bottom image) displaying very low adsorption on silica at IO concentrations ranging from 0.05% to 1% w/v IO.
FIG. 18b shows a graph of the IO adsorption isotherm data in standard API brine of FIG. 18a expressed as a fit to a Langmuir adsorption model in standard units showing an adsorption capacity of 0.9 mg-IO/$m^2$-silica.
FIG. 18c shows a graph of the IO adsorption isotherm data in standard API brine of FIG. 18a expressed as a fit to a Langmuir adsorption model in inverse units showing an adsorption capacity of 0.9 mg-IO/$m^2$-silica.

Adsorption of PAMPS-PAA grafted IO NPs on silica: The batch adsorption technique allows for rapid simple measurement of equilibrium nanoparticle adsorption behavior relative to measurement of nanoparticle retention in flow study in porous media where additional effect of filtration and hydrodynamics may be present. The IO adsorption on silica microspheres was observed visually (see FIG. 18a) and quantified by measuring the change in IO concentration before and after equilibration (see FIG. 18b and Table 10). FIG. 18a shows a digital image of PAMPS-PAA (3:1) grafted iron oxide ("IO") nanoclusters in standard API brine (top row) and DI water (bottom row) displaying very low adsorption on silica at IO concentrations ranging from 0.05% to 1% w/v IO. Each sample vial contains 2 mL of IO dispersion at pH 8 and 1 g of colloidal silica and was equilibrated for 16-20 hours. IO adsorption isotherm data in standard API brine expressed as a fit to a Langmuir adsorption model in standard units is shown in FIG. 18b and inverse units is shown in FIG. 18c. Table 10 is a table of the adsorption data of PAMPS-PAA (3:1) IO nanoclusters on 8 μm colloidal silica microspheres in standard API brine and DI water at pH 8 at varying IO concentrations.

TABLE 10

| Initial IO Conc. (% wt.) | Medium | % IO Adsorbed$^a$ | Final Eq. IO Conc. (% w/v)$^b$ | Specific adsorption (mg-IO/$m^2$)$^c$ | % Monolayer |
|---|---|---|---|---|---|
| 0.1 | DI water | 2 | 0.098 | <0.04 | 0.03 |
| 0.2 | DI water | 2 | 0.197 | <0.11 | 0.05 |
| 1.0 | DI water | 1 | 1.00 | <1.1 | 0.4 |
| 0.05 | standard API brine | 7 | 0.047 | 0.16 ± 0.07 | 0.1 |
| 0.1 | standard API brine | 5 | 0.095 | 0.24 ± 0.11 | 0.1 |

TABLE 10-continued

| Initial IO Conc. (% wt.) | Medium | % IO Adsorbed[a] | Final Eq. IO Conc. (% w/v)[b] | Specific adsorption (mg-IO/m$^2$)[c] | % Monolayer |
|---|---|---|---|---|---|
| 0.2 | standard API brine | 4 | 0.192 | 0.4 ± 0.4 | 0.2 |
| 1.0 | standard API brine | 2 | 0.975 | 1.0 ± 2.1 | 0.4 |
| 0.2[c] | standard API brine | 48[c] | 0.103[c] | 16.6 ± 1.3[c] | 8.6[c] |

[a]The specific surface area of colloidal silica was measured to be ~0.58 m$^2$/g.
[b]Average of four independent studies; uncertainty in specific adsorption based on error propagation analysis.
[c]Control sample data at 0.2% w/v initial IO conc. is also shown as an example of IOs with high adsorption where insufficient polymer grafting leads to poor stabilization.

For either DI water or standard API brine, after overnight equilibration at pH 8, the settled silica microspheres were white at low IO concentration and lightly colored at 1.0%. In DI water, the difference between the initial and final concentration, reported as % IO adsorbed, was very small for all samples (≤2%). Based on the volume of the solution and the surface area of silica, the calculated specific adsorption values were smaller than the experimental uncertainty and hence only upper bounds are reported. At the higher IO conc. of 1% w/v, the specific adsorption was <1.1 mg-IO/m$^2$ silica. In standard API brine, the % IO adsorbed was modestly higher than in DI water. The calculated specific adsorption in standard API brine at the highest IO conc. of 1% w/v was 1.0±2.1 mg/m$^2$, which corresponds to a low 0.4% monolayer coverage of NPs. For comparison, a strongly adsorbing IO NP sample resulted in 48% IO adsorption in standard API brine at 0.103% w/v IO equilibrium concentration to give a specific adsorption value of 16.6 mg/m$^2$ or 8.6% monolayer coverage.

The isotherm in FIGS. 18b-18c exhibited the behavior of a Langmuir adsorption isotherm. A linearized Langmuir plot of IO adsorption in inverse IO concentration and specific adsorption units (see FIG. 18c) resulted in a reasonable correlation coefficient (R$^2$=0.97) where the slope (0.25×10$^7$ m$^{-1}$) and intercept (1.09 m$^2$/mg-IO) are $$m = \left(\frac{k_{des}}{k_{ads}}\right)\left(\frac{\rho_a}{A_c}\right)M_p \quad \text{(Equation 1)}$$

$$b = \frac{\rho_a}{A_c} \quad \text{(Equation 2)}$$

where $k_{des}/k_{ads}$ is the ratio of the rate of desorption to the rate of adsorption (m$^{-3}$), $M_p$ is the mass of one nanoparticle (g), $A_c$ is the adsorption capacity on the collector surface (g-IO/g-silica), and $\rho_a$ is the specific surface area of silica (m$^2$/g-silica). Using the specific surface area of the silica, $A_c$ can be converted to (mg-IO/m$^2$-silica). The specific adsorption capacity $A_c$ was 0.9 mg-IO/m$^2$-silica (or 0.4% monolayer) and the equilibrium constant ($k_{des}/k_{ads}$) 3.2×10$^{17}$ m$^{-3}$ (see FIG. 18c). This is the first report demonstrating low equilibrium adsorption capacity of iron oxide NPs on silica in high salinity (1.8 M ionic strength) and with high divalent ion concentration (180 mM Ca$^{2+}$).

The very low adsorption for PAMPS-PAA grafted IO NPs suggests the well-solvated extended polymer chains on the surface provided steric stabilization with the silica surface. The chain extension again reflects high acidity and high hydrophilicity for the polymer with low Ca$^{2+}$ affinity. Here only the particle surface contained polymer chains for steric repulsion, unlike the case of the interactions between two polymer coated nanoparticles. However, a single steric polymer layer provided sufficient repulsion in our case, in conjunction with the electrostatic repulsion with the anionic silica surface, to provide very low adsorption.

Relatively few studies have reported retention of nanoparticles on silica. For carboxymethyl cellulose ("CMC") coated zero-valent iron ("ZVI") NPs on quartz sand in 40 mM CaCl$_2$, the specific retention was 8.4 mg/m$^2$ at an injected concentration of 0.02% w/v iron in a flow study. The carboxylate group in CMC has high Ca affinity that decreases attractive segment-solvent, lowers chain extension, and weakens steric repulsion. Retention of highly-acidic triblock PMAA-PMMA-PSS copolymer stabilized ZVI NPs on silica sand was relatively low for 10 mM Na and 0.5 mM Ca, but the filtration length (to remove 99% of the particles) decreased by over an order of magnitude when these concentrations were raised to 100 and 5 mM, respectively.

In summary, the foregoing has demonstrated magnetic iron oxide ("IO") nanoparticles ("NPs"), with permanently grafted acrylic acid-co-sulfonic acid random copolymers, were sterically stabilized at high salinities, even for temperatures up to 90° C. even after one month. A high 3:1 ratio of the stabilizer group, acrylamido-methyl-propane sulfonic acid ("AMPS") to the acrylic acid ("AA") anchor group provided sufficient chain solvation even in standard API brine). Simultaneously, the number of AA anchor groups provided sufficient multipoint grafting for permanent attachment upon 40,000 fold dilution, without reducing Ca$^{2+}$ resistance. The pure PAMPS-PAA (without nanoparticles) binded weakly to calcium ions as characterized by DLS and electrophoretic mobility, as expected from NMR studies of PAMPS. Therefore, when grafted on the IO nanoparticles, the extended highly solvated chains provided steric stabilization of the nanoparticles and weak interactions with silica surfaces. The Langmuir adsorption capacity on silica was only 0.9 mg-IO/m$^2$ even at the extreme standard API brine salinity. Neither the amine functionalization nor the grafting degraded the magnetic susceptibilities significantly. The stable IO dispersions with low adsorption on silica, even at extreme salinities and temperatures, are of great interest for enhancing nanoparticle transport through subsurface porous media to facilitate electromagnetic imaging of reservoirs.

In the following disclosed aspects of the present invention, a series of sulfonated random and block copolymers were adsorbed on the surface of ~100 nm iron oxide ("IO") nanoclusters to provide colloidal stability in standard API brine at 90° C. A combinatorial materials chemistry approach, which employed Ca$^{2+}$-mediated adsorption of anionic acrylic acid-containing sulfonated polymers to pre-formed citrate-stabilized IO nanoclusters, enabled the investigation of a large number of polymer coatings. Initially, a series of poly(2-methyl-2-acrylamidopropanesulfonate-co-acrylic acid) ("PAMPS-PAA") (1:8 to 1:1 mol.:mol.), poly(styrenesulfonate-block-acrylic acid) (2.4:1 mol.:mol.), and poly(styrenesulfonate-alt-maleic acid) (3:1 mol.:mol.) copolymers were screened for solubility in standard API brine at 90° C. The ratio of AMPS to AA groups was varied to balance the requirement of colloid dispersibility at high salinity (provided by AMPS) against the need for anchoring of the polymers to the iron oxide surface (via the AA). IO NPs coated with PAMPS-PAA (1:1 mol.:mol.) exhibited colloidal stability in standard API brine at room temperature and 90° C., for up to one month. The particles were characterized before and after coating at ambient and elevated temperatures by a variety of techniques including colloidal stability experiments, dynamic light scattering, zeta potential, and thermogravimetric analysis.

The stabilization of dispersions of ~100 nm metal and metal oxide nanoparticles becomes highly challenging at electrolyte concentrations above ~1 M. Even at the salinity of a typical biological medium of 0.15 M, nanoparticle dispersions that are stable in pure water occasionally flocculate. At low salinities small ligands, such as citrate, may be utilized to provide electrostatic repulsion over a relatively wide pH range. However, at 1 M ionic strength where the electric double layer thickness drops to a mere 0.3 nm, the electrostatic repulsion provided by small ligands becomes insufficient to overcome the longer-ranged attractive van der Waals ("vdW") forces, as described by the Derjaguin-Landau-Verwey-Overbeek ("DLVO") potential. At such high salinities, steric stabilization, which may be provided by polymer chains that extend from the surface, is often required to prevent flocculation. When charged polyelectrolytes are present on the particle surfaces, the stability can be further augmented by an electrosteric mechanism (combination of electrostatic and steric repulsion). As a model metal oxide colloid, aspects of the present invention focused on magnetic iron oxide ("IO") nanoparticles ("NPs"), which are of interest in numerous applications including biomedicine, protein separation, water purification, and as contrast enhancement agents for imaging of subsurface oil/gas (hydrocarbon) reservoirs. A wide variety of polymers have been explored to stabilize IO dispersions at various salinities, including poly(ethylene glycol) ("PEG"), polyacrylamide ("PAM"), poly(acrylic acid) ("PAA"), PAA copolymers, and a variety of sulfonated copolymers.

For decades numerous studies have followed the concept presented by Napper that colloids coated with polymeric stabilizers flocculate under conditions (e.g., temperature, salinity, pH) similar to those that cause the pure polymer to phase separate in an aqueous medium. Flocculation and polymer phase separation each take place when the interactions between the polymer segments with the solvent are not strong enough relative to the segment-segment interactions. For polyelectrolytes, the solvation of the segments by the aqueous phase and the electrostatic repulsion between polymer segments are favored by dissociation of counterions. These interactions are less favorable at high salinities as the double layer thickness decreases. Furthermore, although monovalent ions such as $Na^+$ and $K^+$ do not bind strongly to anionic polyacrylate ions, divalent ions such as $Ca^{2+}$ bind specifically and may induce gelation, as shown by solution behavior, NMR studies, and calorimetry. However, the binding constant for $Ca^{2+}$ is weaker when the acrylate groups are positioned further from the polymer backbone and even weaker for strongly acidic sulfonated polymers. For example, while poly(vinylsulfonic acid) ("PVS") with short side chains clouded in aqueous $CaCl_2$ at 100° C., poly(styrenesulfonic acid) ("PSS") and poly(2-acrylamido-2-methylpropanesulfonate) ("PAMPS") remained soluble. Therefore, choice of the proper polymer composition by phase behavior studies at high salinity and temperature is expected to facilitate rapid screening of potential candidates for colloidal stabilization.

Various studies have examined steric stabilization of nanoparticles in salt solutions using relatively low MW non-ionic polymers, especially PEG, for cores smaller than 10 nm, where vdW forces are much more easily overcome. The cloud point temperature of PEG, above which it precipitates, decreases with MW and salinity, and thus it is most effective at very low MWs. CdSe/ZnS quantum dots (8.4 nm) and IO NPs (9.6 nm) synthesized with oleic acid ligands followed by coating with amphiphilic PEG on individual NPs led to stability in 1 M and 2 M NaCl, respectively. Phosphonate-terminated PEG (EO=10) was adsorbed on naked 7 nm ceria and 7.1 nm maghemite NPs for stability in 1 M NaCl. Ligand exchange with catechol-terminated PEG (EO=14-17) led to stable dispersions of Au NPs (10 nm) and CdSe/ZnS QDs (~10 nm) in 2 M NaCl, and IO NPs (11 nm) in 1M NaCl. Other non-ionic polymer stabilizing groups investigated for IO NPs (6-8 nm) include polyacrylamide, which imparted stability in 2 M NaCl and saturated $NH_4NO_3$.

Although non-ionic polymers are capable of stabilizing small NPs, polyelectrolytes are needed to provide electrosteric stabilization to overcome the stronger vdW forces present when the NP core diameters approach 100 nm. Relative to studies at electrolyte concentrations of 0.15 M or below, few studies have considered NP dispersions at higher salinities with either strong or weak polyelectrolyte stabilizers. To explore the mechanism of electrosteric stabilization, latex particles (~50 nm) grafted with polymethacrylic acid ("PMAA") were studied over a wide range of pH, salinity and grafting density using dynamic light scattering, electrophilic mobility, and rheology at salt concentrations up to 3.5 M NaCl. The excess osmotic pressure produced by the overlap of the polyelectrolyte chains was the primary contribution to the electrosteric stabilization. Remarkably, ~100 nm IO nanoclusters were stabilized in up to 5 M NaCl with copolymers composed of acrylic acid, styrene sulfonic acid, and vinyl sulfonic acid. The critical flocculation salinity for the NPs was correlated and described in terms of the particle size and copolymer composition, as well as the role of the stabilizer during synthesis of the IO. Similarly, IO NPs synthesized in the presence of poly(styrene-alt-maleic acid) were stable in 8% NaCl (1.4 M NaCl).

While relatively few ~100 nm particles are dispersible in concentrated NaCl, reports that demonstrate stability with high divalent salt concentrations (>0.1 M), either with or without other salts such as NaCl, are even more rare. Divalent ions, such as $Ca^{2+}$, not only contribute to higher ionic strength than monovalent ions (i.e., the Schulze-Hardy rule), but also cause aggregation by specific binding, especially with anionic polyelectrolytes, for example carboxylates. However, such high $Ca^{2+}$ levels are often encountered in natural subsurface reservoirs of interest in oil recovery, and there is therefore a need for colloids that maintain stability under such conditions. In one example, poly(glycerol monoacrylate) ("PGA") copolymers were synthesized and coated on 8 nm IO particles with a reported stability in 10% (or 0.9 M) $CaCl_2$. Additionally, transport of ~50 nm zero valent Fe NPs stabilized by an adsorbed poly(methacrylic acid-block-methylmethacrylate-block-styrenesulfonate) terpolymer was studied in 0.32 M $CaCl_2$, however neither of these reports provided explicit information on how long the particles were stable, and the former used relatively small NPs.

A further challenge is the colloidal stabilization of NPs at elevated temperatures encountered in subsurface reservoirs up to 100° C. and beyond in addition to high salinity. Examples of such colloids are quite scarce in the literature, especially at high ionic strengths and when concentrated divalent ions are present. Yu et al. reported the stability of 8.4 nm CdSe quantum dots at up to 70° C. for 3 hours in 1 M NaCl and over a range of pH values (pH 4-10). Additionally, Amstad et al. demonstrated IO NP stability at 90° C. for 20 hours in phosphate buffered saline (0.15 M). Thus, it remains a significant challenge to design polymer coatings that can stabilize nanoparticles at high divalent salinity and elevated temperature. Given that sulfonated polymers such as PAMPS and PSS have been shown to be soluble in relatively concentrated solutions of divalent salts at elevated temperature, it was determined that such polymers with their highly acidic nature would be promising candidates to stabilize nanoparticle dispersions under similar conditions.

Since polymers that are good stabilizers in brine, such as PSS and PAMPS, interact weakly with multivalent cations including Fe, they also are expected to adsorb weakly on the surfaces of iron oxide nanoparticles. Therefore, to synthesize IO NPs coated with such polymers, anchor groups that bind strongly to Fe (e.g., acrylic acid) are incorporated into the polymer structure. However, given that the anchor group often interacts strongly with the dissolved divalent ions, leading to flocculation, the correct ratio of anchor groups to stabilizing groups was determined in order to strike a balance between sufficient polymer adsorption on the NPs and nanoparticle dispersiblity. Furthermore, adsorption of a modest amount of low to medium MW polymer on IO NPs does not significantly lower the magnetic weight fraction. Copolymers with sulfonate groups and carboxylate groups may be adsorbed on IO NPs during nucleation and growth of the NPs upon hydrolysis of various Fe precursors. However, the IO NP morphology and magnetic properties change with polymer structure, which influences nucleation, growth, and stabilization of the growing particles. Thus, techniques were created to examine a variety of polymer stabilizers with varying functionality and molecular weights, without perturbing the properties of the iron oxide cores.

Disclosed herein is the development of random and block copolymer coatings on the surface of ~100 nm IO nanoclusters, which provided colloidal stability in standard API brine and at an elevated temperature of 90° C. A combinatorial materials chemistry approach was employed, which enabled the investigation of a large number of polymers on a given type of IO nanocluster. Only copolymers that were first found to be soluble in standard API brine at 90° C. were considered as stabilizers. In this approach the synthesis of the IO nanoparticles was completely separated from the process of adsorption of copolymer on the nanoparticle surface. Well-defined citrate-coated IO nanoparticles with a fixed hydrodynamic diameter ($D_H$) of 50 nm were developed, and a homologous series of poly(2-methyl-2-acrylamidopropanesulfonate-co-acrylic acid) ("PAMPS-PAA") copolymers were adsorbed to provide electrosteric stabilization. The ratio of AMPS to AA groups was varied from 1:8 to 1:1 to determine how to balance the requirement of colloid dispersibility at high salinity (provided by AMPS) against the need for anchoring of the polymers to the iron oxide surface (via the AA). In addition, a sulfonated block copolymer, poly(styrenesulfonate-block-acrylic acid) ("PSS-b-PAA"), and a sulfonated alternating copolymer, poly(styrenesulfonate-alt-maleic acid) ("PSS-alt-PMA"), were also investigated as a stabilizer. The adsorption of the aforementioned polymers on iron oxide was controlled by a judicious balance of pH, type and concentration of electrolyte, and concentration of polymer. In particular, the adsorption was enhanced markedly by bridging of the carboxylate anchor groups to the like-charged citrate ligands on the IO nanoclusters with $Ca^{2+}$. The success in coating of the polymer stabilizers on iron oxide was assessed by (i) colloidal stability in standard API brine at room temperature and 90° C., for up to one month, (ii) measurement of $D_H$ in standard API brine at ambient and elevated temperatures, (iii) zeta potential measurements over a range of salinities, and (iv) quantification of the organic content by thermogravimetric analysis ("TGA"). Furthermore, the critical coagulation concentrations of PAMPS-PAA coated IO in NaCl and $CaCl_2$ were determined by dispersing IO NPs in up to 20% wt. NaCl (3.4 M) and 20% wt. $CaCl_2$ (1.8 M), respectively.

The reagents iron(II) chloride tetrahydrate, iron (III) chloride hexahydrate, citric acid monohydrate, 30% ammonium hydroxide, poly(styrenesulfonate)-70 kDa, poly(acrylamide)-co-(acrylic acid) (1:3)-200 kDa, poly(2-acrylamido-2-methyl propanesulfonic acid)-2 MDa, poly(acrylic acid sodium salt) (2 kDa), and poly(styrenesulfonic acid-alt-maleic acid) sodium salt-20 kDa were commercially obtained from Sigma-Aldrich. Aquatreat 546 (PAMPS-PAA 1:6) was commercially obtained from Akzo Nobel. Flosperse 9037 CS (PAMPS-PAA 1:4) and Flosperse 9024 CS (PAMPS-PAA 1:8) were commercially obtained from SNF. Calcium chloride dihydrate, sodium chloride, hydrochloric acid, and sodium hydroxide were obtained from commercial sources and used as received. The monomers t-butyl acrylate ("tBA") and styrene were purchased from commercial sources and filtered through a short plug of basic alumina to remove the 4-methoxyphenol ("MEHQ") stabilizer, and were degassed by bubbling with dry nitrogen for 15 minutes prior to use. N,N,N',N',N-pentamethyldiethylenetriamine, ethyl 2-bromoisobutyrate, acrylic acid, potassium persulfate, and sodium metabisulfite were obtained from commercial sources and used as received. The monomer 2-amino-2-methylpropanesulfonate ("AMPS") was commercially obtained from Lubrizol Corporation and used as received. Deionized water from a Barnstead Nanopure system was used for experiments.

Synthesis of poly(2-acrylamido-3-methylpropanesulfonate-co-acrylic acid) ("PAMPS-PAA"): Generally, a three-necked round bottom flask equipped with a magnetic stir bar, a nitrogen inlet, and a reflux condenser was charged with AMPS monomer, potassium persulfate, and sodium metabisulfite under an atmosphere of nitrogen. The flask was sealed with rubber septa and deionized water that was previously degassed by bubbling with nitrogen for 30 minutes was added via a nitrogen-purged syringe or a cannula to the reaction flask, such that the concentration of AMPS monomer was 1.0 M. With stirring, acrylic acid was added to the reaction flask via a nitrogen-purged syringe. The flask was placed in an oil bath and stirred at 80° C. for 16 hours. The reaction mixture was then cooled to room temperature and the water was removed under reduced pressure. The resulting white solid was dried under reduced pressure until a constant mass was reached.

Synthesis of poly(t-butyl acrylate)-block-(styrene) ("PtBA-b-PS"): Under an atmosphere of nitrogen, an oven-dried 50 mL Schlenk flask with a magnetic stir bar was charged with 300 mg (2.1 mmol) of copper(I) bromide. The flask was sealed with a rubber septum secured with copper wire and was evacuated and back-filled with nitrogen three times before 5 mL (34.1 mmol) of tert-butyl acrylate was added via a gas-tight syringe that had been purged with nitrogen. After one freeze-pump-thaw cycle, 0.5 mL (2.4 mmol) of N,N,N',N',N-pentamethyldiethylenetriamine was added via a nitrogen-purged gas-tight syringe. After a second freeze-pump-thaw cycle, 0.1 mL (0.68 mmol) of ethyl-2-bromoisobutyrate was added via a gas-tight syringe that had been purged with nitrogen. After two more freeze-pump-thaw cycles, the reaction mixture was allowed to return to ambient temperature, and the reaction flask was backfilled with nitrogen and placed in an oil bath at 50° C. The reaction mixture was allowed to stir for 3 hours at the same temperature, after which an aliquot was removed from the reaction and analyzed by GPC ($M_n$=5,500, $M_w/M_n$=1.15) prior to addition of 7.4 mL (64.5 mmol) of styrene. The reaction mixture was allowed to stir for a further 18 hours at 50° C., then was cooled to room temperature. The mixture was then taken up into THF and passed through a plug of neutral alumina to remove the metal/ligand catalyst system. The resulting polymer solution was concentrated and purified by precipitation into a mixture of methanol and water (1/1, v/v).

Synthesis of poly(sytrenesulfonate-b-acrylic acid) ("PSS170-b-PAA70"): A 1 L round bottom flask was charged with PtBA-PS (prepared as per above) dissolved in 300 mL of chloroform. In a separate flask with a stir bar, a solution of 66 mL of acetic anhydride in 100 mL of chloroform was cooled to 0° C. Concentrated sulfuric acid (37 mL) was added dropwise, and the mixture was stirred at 0° C. for an additional 10 minutes before it was added to the flask containing the polymer solution. The reaction mixture was heated to 60° C. and stirred for 16 hours, then was cooled to room temperature and slowly poured into methanol. The solution was neutralized by slow addition of 3.0 M NaOH, and the organic solvents were removed under reduced pressure. The resulting aqueous solution was loaded into dialysis tubing and dialyzed against DI water for 3 days. After dialysis, the desired polymer was isolated as an orange glassy solid by concentration and drying under reduced pressure (11.0 g, 46% yield over 2 steps).

Synthesis of citrate-coated IO nanoclusters: Citrate-coated iron oxide nanoclusters were prepared by a coprecipitation of Fe(II) and Fe(III) chlorides in an alkaline solution. Briefly, a mixture of 0.86 g $FeCl_2$ and 2.35 g $FeCl_3$ (1:2 molar ratio) and 0.05 g of citric acid were dissolved in 40 mL DI water. The solution was magnetically stirred for 10 minutes under ambient atmosphere. The mixture was heated to 90° C. while stirring, and 10 mL of 30% wt. aqueous $NH_4OH$ solution was injected to nucleate the iron oxide nanoparticles ("NPs"). The NP growth was continued for 2 hours at 90° C. The mixture was then cooled to room temperature, centrifuged, and dispersed in 20 mL of DI water with a Branson probe sonication microtip. These particles were termed as "low Cit-IO." After separating the particles again (6000 g, 10 minutes), additional citrate groups were introduced by probe sonication of the pellet in 20 mL of citric acid solution (20 mg/ml, pH 5) for 15 minutes. Upon removal of large aggregates (7000 g, 10 minutes), the supernatant was centrifuged at 10000 g for 20 minutes to recover a pellet of citrate-stabilized IO nanoclusters that were dispersed in 25 mL of DI water. The final dispersion contained ~2.5-3% wt. IO, as observed by flame atomic absorption spectroscopy ("FAAS") suggesting a IO yield of ~60-70%. These IO nanoclusters with the higher citrate level were the primary platform particles for the coating experiments.

Polymer coating of citrate-IO nanoclusters: Polymer coating on platform IO clusters was performed by preparation of polymer solution at pH 7, followed by addition of 20% wt. $CaCl_2$ solution, dilution with DI water, and then addition of the IO cluster stock solution. With the exception of a few specified cases, the citrate-coated IO nanoclusters with the higher citrate level were used. Most commonly, the final concentrations after mixing were 1% wt. IO, 5% wt. polymer, and 5% wt. $CaCl_2$, although these concentrations were varied, as reported herein. Upon mixing the solutions, flocculated particles formed and were suspended while stirring. After adjusting the pH to 7, the mixture was transferred to a water bath and kept at 90° C. for 1 hour. After cooling to room temperature, the coated NPs were separated by centrifugation, washed twice with DI water to remove excess polymer and $CaCl_2$, and redispersed in DI water by probe sonication to reach a final IO concentration of ~2% wt. The IO yield after coating ranged from 70-90%.

Phase behavior of sulfonated copolymers: Solutions of the various copolymers (2% wt.) in standard API brine at pH 8 were sealed in glass vials with Teflon tape and set in an oven at 90° C. The solutions were observed visually for cloudiness/phase separation after a day.

Colloidal stability of polymer-coated IO nanoclusters: The colloidal stability was tested by mixing stock solutions of NaCl (20% wt.), $CaCl_2$ (20% wt.), DI water, and polymer-coated IO clusters to achieve a 0.2% wt. IO dispersion in standard API brine. The colloidal stability was assessed by visual observation and DLS measurements at room temperature and 90° C. For long term stability tests in standard API brine at 90° C., the solutions were sealed in glass pipettes with a butane torch. Pipettes were digitally photographed and sacrificed periodically to measure the $D_H$.

Polymer phase behavior and hydrodynamic diameter ($D_H$): Building on the high solubility of PAMPS and PSS in $CaCl_2$ at 100° C., various compositions of commercial and synthesized copolymers of PAMPS and PAA ("PAMPS-PAA") and PSS and PAA ("PSS-PAA") were identified as candidates for stabilization of IO clusters in standard API brine at room temperature and 90° C. It was determined that the PAA groups would allow for adsorption on the IO surface, and that the PAMPS and PSS groups would provide stability in high salinity via electrosteric stabilization. A systematic combinatorial materials chemistry scheme was developed to maximize adaptability for successful stabilization of particles in standard API brine.

Initially, a series of polymer phase behavior studies were conducted with a variety of sulfonated copolymers composed of the units shown in FIGS. 1a-1d. Three commercially obtained PAMPS-PAA copolymers ranging in molar monomer ratios from (1:8) through (1:4) were investigated, and the composition was determined by $^1H$ NMR spectroscopy. Additionally, copolymers having larger ratios of the sulfonated monomer to AA were synthesized and used as coatings. Both random copolymers containing AMPS and block and alternating copolymers containing styrenesulfonate, which has greater hydrophobicity, were studied to elucidate the effects of both the polymer backbone structure and the monomer structure. The molecular weight ("MW") of each of the PAMPS-PAA copolymers was approximated by correlating the volume-weighted $D_H$ in 1 M NaCl to the degree of polymerization of anionic polymers of known MW. Table 11 lists sulfonated copolymers, their hydrodynamic diameters, degrees of polymerization ("DOP")/molecular weights ("MW"), and phase behavior in standard API brine after 1 day at room temperature and 90° C.

TABLE 11

| Polymer Composition | $D_H^b$ (nm) | $DOP^c$ | $MW^c$ (kDa) | Source | 2% wt. poly. in standard API brine$^d$ | |
|---|---|---|---|---|---|---|
| | | | | | Room Temp. | 90° C. |
| PAMPS-PAA (1:8)$^a$ | 4.7 | 206 | 22 | SNF | Cloudy | Cloudy |
| PAMPS-PAA (1:6)$^a$ | 6.5 | 406 | 46 | Akzo Nobel | Clear | Clear |
| PAMPS-PAA (1:4)$^a$ | 4.6 | 197 | 24 | SNF | Clear | Clear |
| PAMPS-PAA (1:1)$^a$ | 5.8 | 320 | 52 | Synthesized | Clear | Clear |
| PAMPS-PAA (1:1)$^a$ | 11.4 | 1310 | 212 | Synthesized | Clear | Clear |

TABLE 11-continued

| Polymer Composition | $D_H{}^b$ (nm) | $DOP^c$ | $MW^c$ (kDa) | Source | 2% wt. poly. in standard API brine$^d$ | |
|---|---|---|---|---|---|---|
| | | | | | Room Temp. | 90° C. |
| $PSS_{170}$-b-$PAA_{70}$ (2.4:1)$^a$ | 4.9 | 240$^e$ | 40$^e$ | Synthesized | Clear | Clear |
| PSS-alt-PMA (3:1) | 3.7 | 113$^f$ | 20$^f$ | Sigma | Clear | Clear |

$^a$Composition determined by $^1$H NMR spectroscopy.
$^b$Vol. weighted hydrodynamic diameters collected in 1M NaCl at 25° C.
$^c$Degree of polymerization ("DOP") and molecular weight ("MW") estimated by fitting $D_H$-DOP data to polymer scaling law $D_H = 0.37*(DOP)^{0.48}$.
$^d$Phase behavior based on visual observation.
$^e$MW and DOP determined by GPC.
$^f$MW and DOP obtained from the manufacturer.

The phase behavior of polymers (2% wt.) was studied in standard API brine at 25° C. and 90° C. (see Table 11). The results for the copolymers may be placed in perspective in terms of the interactions of each of the sulfonate and carboxylate groups with $Ca^{2+}$. With the exception of PAMPS-PAA (1:8), all investigated polymers were soluble under these conditions, which was consistent with previous phase behavior studies of related copolymers. The cloudy appearance for the PAMPS-PAA (1:8) may be attributed to the high acrylic acid content, as the carboxylate groups interact strongly with $Ca^{2+}$. As is well known for PAA homopolymer (2% wt., 2 kDa) in divalent salts, in standard API brine, clouding was observed at both room temperature and 90° C. Isothermal calorimetry studies have shown that association of PAA to $Ca^{2+}$ is an endothermic process, despite the fact that the electrostatic contribution is attractive. The favorable binding was found to be driven almost purely by entropic changes due to release of water of hydration from $COO^-$ and $Ca^{2+}$. Additionally, it is likely that the polarity of the polyelectrolyte backbone plays an important role in maintaining the solubility of the polymer in the presence of calcium salts. For example, the strong $Ca^{2+}$ binding of PAA via dehydration of the $Ca^{2+}$ and $COO^-$ groups results in the formation of a hydrophobic PAA-$Ca^{2+}$ due to the carbonic PAA backbone, leading to precipitation of the $Ca^{2+}$ bound polymer. In contrast, polyaspartate ("PAsp") which contains a hydrophilic amide backbone, does not collapse in the presence of $Ca^{2+}$, due to both reduced $Ca^{2+}$ binding and the more hydrophilic nature of the resulting $Ca^{2+}$-PAsp complex. It is likely that the hydrophilic amide bond in the AMPS structure (see FIGS. 1a-1d) plays a similar role to reduce $Ca^{2+}$ binding and chain collapse. McCormick and co-workers have demonstrated through viscosity and $^{23}$Na NMR spectroscopy that AMPS polymers exhibit low binding affinities for $Ca^{2+}$ and as a result remained soluble in $CaCl_2$ up to 100° C. They suggested that the strong acidity of the AMPS group and the greater conformational freedom from the relatively long side chains were instrumental in lowering the calcium affinity of AMPS. Thus, the strong $Ca^{2+}$ binding observed for PAA by $^{23}$Na NMR is manifested thermodynamically by hydration effects, which subsequently are influenced by the polymer backbone. The waters of hydration are less likely to be released with a more hydrophilic backbone as in the case of PAsp and AMPS. In contrast with PAA, the stability of all other PAMPS-PAA copolymers with monomer ratios higher than 1:8 was primarily due to weak $Ca^{2+}$ binding to the hydrophilic AMPS sulfonate group.

Polymer adsorption on iron oxide surface: The copolymers were first adsorbed directly on the citrate-coated IO nanoclusters. The acrylate functionalities are well known to form moderately strong charge transfer complexes with the Fe cations on the iron oxide surface that are not covered with citrate ligands. Since the acid dissociation constant, $pK_a$, of the acrylic acid groups is 4.6, all attempts to adsorb copolymers on IO NPs were conducted at pH 7, at which a significant fraction of acrylic acid groups would be deprotonated. An excess of polymer (five fold greater than IO conc. in % wt.) was used to provide a sufficient driving force for polymer adsorption. Initially, it was determined that the adsorption levels of the copolymers on the iron oxide were quite low (~8% by weight by TGA) as described below. Thus, a process was developed as shown in FIG. 19a in which $CaCl_2$ was added to enhance the adsorption on the NPs, as shown in FIG. 19a.

Figures 19A, 19B, 19C:
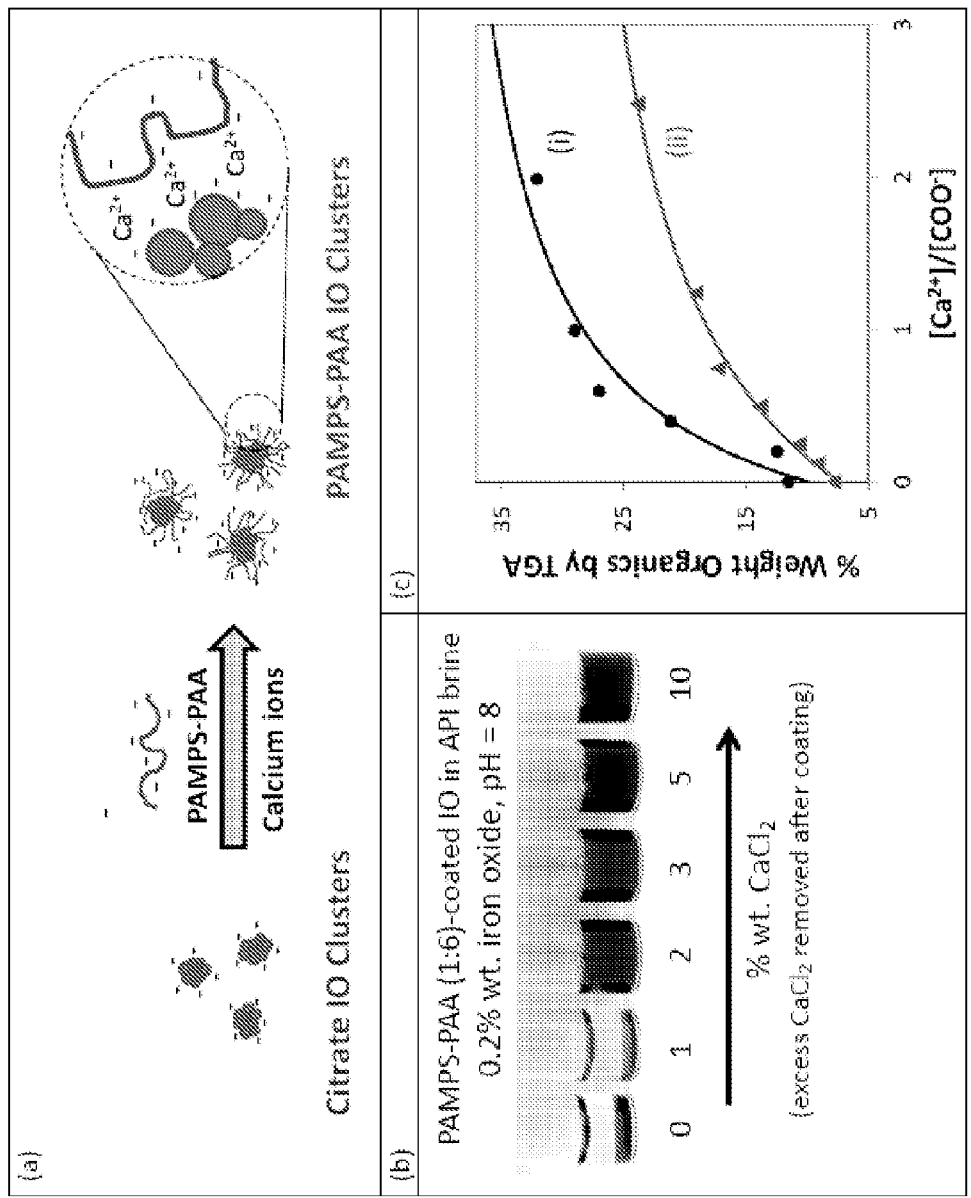
FIG. 19a shows a schematic of a $Ca^{2+}$-mediated coating of anionic PAA-PAMPS polymers on negatively-charged citrate iron oxide ("Cit-IO") nanoclusters.
FIG. 19b is a digital image showing the effect of varying the $CaCl_2$/PAA-PAMPS ratio during coating on the colloidal stability of IO clusters in standard API brine as evidenced by FIG. 19c.
FIG. 19c is a plot of the % wt. organics measured by TGA versus the $[Ca^{2+}]/[COO^-]_{poly}$ molar ratio for two different citrate IO particles.

FIG. 19a shows a schematic of $Ca^{2+}$-mediated coating of anionic PAA-PAMPS polymers on negatively-charged citrate iron oxide ("IO") nanoclusters. The divalent calcium ions bridge the acrylate anions to the like-charged citrate ligands on the IO clusters. To tune the extent of polymer adsorption, the amount of $CaCl_2$ added was varied while keeping the concentration of PAMPS-PAA (1:6) and IO clusters constant at 5% wt. and 1% wt., respectively (see FIG. 19b and Table 12). FIG. 19b shows a digital image showing the effect of varying a $CaCl_2$/PAA-PAMPS ratio during coating on the colloidal stability of IO clusters in standard API brine (digital image taken after 1 day) as evidenced by FIG. 19c, which is a plot of the % wt. organics measured by TGA versus the $[Ca^{2+}]/[COO^-]_{poly}$ molar ratio for two different citrate IO particles: (i) high citrate (8% wt. TGA), and (ii) low citrate IO clusters (5% wt. TGA), fit to Langmuir isotherms. When coated in the absence of $CaCl_2$ and in 1% wt. $CaCl_2$, IO clusters were not stabilized in standard API brine (see FIG. 19b and Table 12), suggesting that an insufficient amount of polymer was adsorbed on the IO nanocluster surface. Thermogravimetric analysis ("TGA") revealed that the organic content of IO clusters increased from 8% for citrate IO to only 13% with 1% $CaCl_2$ (see plot (i) in FIG. 19c and Table 12). To strengthen the binding of the polymer to the surface, the $CaCl_2$ concentration was increased to ≥2% wt. Quantitatively, the organic content reached 21% at 2% wt. $CaCl_2$ and to 32% at 10% wt. $CaCl_2$. These polymer levels were found to be sufficient for stabilization of the IO nanoclusters in standard API brine. Polymer-stabilized metal oxide particles in this size range have not previously been reported at high $Ca^{2+}$ levels or in standard API brine.

A plot of the organic content observed by TGA against the molar ratio of $Ca^{2+}$ to acrylic acid content of polymer (PAMPS-PAA (1:6)) is shown in FIG. 19c for two types of IO nanoclusters with either high or low citrate coverage. Each curve was fit with a Langmuir isotherm. The saturation percentages of organic material for the high and low citrate particles were calculated from the isotherm fits and were found to be 42.3% and 33.5%, respectively. The corresponding equilibrium constants, K, were calculated to be K=1.3 and 0.7, suggesting that a greater degree of polymer adsorption occurred with the high citrate level particles. The amount of polymer adsorbed was observed to increase rapidly up to $[Ca^{2+}]/[COO^-]_{poly}=1$ and eventually reached a plateau at higher concentrations. With greater quantities of $Ca^{2+}$, the amount of organic material adsorbed on the IO increased by up to a factor of 4. Furthermore, as shown in FIG. 19b, the aforementioned increase in added $Ca^{2+}$ was necessary to overcome the repulsion between the polymer and IO and achieve sufficient polymer coating for stabilizing dispersions of the NPs.

Interestingly, for the same $[Ca^{2+}]/[COO^-]_{poly}$ ratio, the amount of adsorbed polymer was higher for the IO with the higher citrate density (see plots (i) and (ii) in FIG. 19c). It is likely that the higher citrate concentration provided a higher anion charge density for $Ca^{2+}$-mediated binding to the carboxylate functionalities on the copolymers. The increase in adsorbed polymer with greater $[Ca^{2+}]/[COO^-]_{poly}$ ratios and in citrate densities on IO nanoclusters both strongly support the $Ca^{2+}$-mediated polymer adsorption mechanism. The number of $Ca^{2+}$ ions bound to the polyacrylic acid is known to strongly correlate to the $[Ca^{2+}]/[COO^-]_{poly}$ ratio and the degree of dissociation. A polymer chain with a higher number of bound calcium ions is more likely to interact with a negatively charged citrate IO surface. Furthermore, when coating was conducted in the absence of $Ca^{2+}$, little change in the organic content was observed (for both low- and high-citrate IOs). Thus, polymer displacement of citrate moieties on the surface was likely limited.

The concept of adsorbing polymers using $Ca^{2+}$ bridging was extended to a wide variety of PAMPS-PAA copolymers (see Table 12) in addition to PAMPS-PAA (1:6). By varying the polymer and $CaCl_2$ concentrations when PAMPS-PAA (1:1)-212 was used as a coating, adsorption of 16%-22% wt. organic material was observed, and led to stability in standard API brine. Eventually, when the organic content was reduced to 14%, the resulting dispersion was no longer stable. Under the same coating conditions (5% wt. polymer, 1% wt. iron oxide, and 5% wt. $CaCl_2$) but with a lower MW PAMPS-PAA (1:1)-52, the organic content reached 25%, and stable dispersions were again formed. When a polymer of intermediate composition was used, PAMPS-PAA (1:4), an organic content of 21% wt. was sufficient to provide colloidal stability in standard API brine after application of the standard coating concentrations. However, when no $Ca^{2+}$ was added, the polymer loading was again low and the particles did not form a stable dispersion, as was observed for the PAMPS-PAA (1:6) coating.

TABLE 12

| Coating | Coating Conditions (% wt.)[a] | | | Stability in API at 25° C. | $D_H$[b] (nm) | % Organics[c] |
|---|---|---|---|---|---|---|
| | Polymer | Iron Oxide | $CaCl_2$ | | | |
| Citrate | Before polymer coating | | | No | 52[d] | 8 |
| PAMPS-PAA (1:6) | 5 | 1 | 0 | No | 90 | 12 |
| | 5 | 1 | 1 | No | 228 | 13 |
| | 5 | 1 | 2 | Yes | 148 | 21 |
| | 5 | 1 | 3 | Yes | 177 | 27 |
| | 5 | 1 | 5 | Yes | 154[d] | 29 |
| | 5 | 1 | 10 | Yes | 137 | 32 |
| | 5 | 1 | 0 | No | 73 | — |
| PAMPS-PAA (1:4) | 5 | 1 | 5 | Yes | 127[e] | 21 |
| | 5 | 1 | 5 | Yes | 146[d] | 22 |
| PAMPS-PAA (1:1)-212 | 5 | 1 | 2 | Yes | — | 19 |
| | 2 | 1 | 0.8 | Yes | — | 16 |
| | 0.5 | 0.1 | 0.5 | No | 86 | 14 |
| PAMPS-PAA (1:1)-52 | 5 | 1 | 5 | Yes | 98[e] | 25 |

[a]Polymer adsorption conducted at pH 7 and 90° C. for 60 minutes.
[b]Hydrodynamic diameters were measured by DLS at 25° C. in DI water.
[c]The percentage of organic content was measured by TGA.
[d]The $D_H$ was obtained from an average of 3 or more experiments.
[e]The $D_H$ was obtained from an average of 2 experiments.

For a given coating condition (5% polymer, 1% IO, 5% $CaCl_2$) the amount of adsorbed polymer was expected to depend on the monomer ratio $[COO^-]/[SO_3^-]$ as well as the chain $D_H$ (or the degree of polymerization) (see Table 11), which together dictate the number of acrylic acid attachment groups per polymer chain. As seen from Table 12, both PAMPS-PAA (1:1) polymers displayed lower adsorption (22% and 25% wt. organics) in comparison to PAMPS-PAA (1:6) (29% wt.). The PAMPS-PAA (1:4) exhibited even lower polymer adsorption (21% wt.) than the PAMPS-PAA (1:1) copolymers despite its greater $[COO^-]/[SO_3^-]$ ratio. However, with its small $D_H$ the number of available $COO^-$ groups per chain of PAMPS-PAA (1:4) was the lowest among all of the polymers investigated and therefore the polymer likely did not have enough attachment sites for favorable polymer adsorption.

In addition to PAMPS-PAA copolymers, the effect of monomer structure as well as backbone architecture was investigated using copolymers containing PSS. Table 13 summarizes the coating studies with a block copolymer PSS-b-PAA that was adsorbed onto low-citrate IO clusters.

TABLE 13

| Coating | Coating Conditions (% wt.)[a] | | Stability in API | % Organics[b] |
|---|---|---|---|---|
| | Polymer | $CaCl_2$ | | |
| $PSS_{170}$-b-$PAA_{70}$ (2.4:1)[c] | 2 | 0 | No | 9 |
| | 2 | 5 | Yes | 15 |
| | 0.2 | 5 | No | 10 |
| | 0.2 | 10 | No | 11 |
| | 0.5 | 5 | Yes | 15 |
| PSS-alt-PMA (3:1) | 5 | 5 | No | 24 |
| | 5 | 2 | No | — |

[a]Polymer adsorption conducted at pH 9 and 90° C. for 60 minutes.
[b]The percentage of organic content was measured by thermogravimetric analysis.
[c]The experiments with PSS-PAA were performed using low citrate platform IO particles.

Adsorption in the absence of $CaCl_2$ did not increase the surface organic content and unsurprisingly did not result in stabilized cluster dispersions. Similarly, when an insufficient amount of polymer (0.2% wt.) was added during the coating process, the resulting particles were unstable in standard API brine. However, conducting the coating with higher PSS-b-PAA concentrations (0.5% and 2%) and the addition of 5% wt. $CaCl_2$ led to colloidal stability in standard API brine with 15% organic content adsorbed on the surface. When a commercial alternating copolymer poly(styrenesulfonate-alt-maleic acid) ("PSS-alt-PMA") was used as the coating, the dispersions were always unstable in standard API brine, despite a reasonable organic content (24%). The observed instability with the PSS-alt-PMA coating was likely due to the phase behavior of maleic acid, which is more sensitive than acrylic acid to the presence of mono- and divalent-cations as it is capable of chelation and thus displays a higher cation binding affinity.

Figure 20:
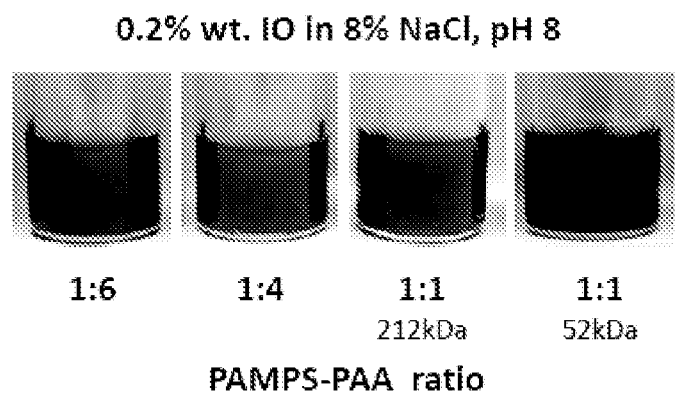
FIG. 20 shows digital images of various PAMPS-PAA-coated IO dispersions at 0.2% wt. IO in 8% NaCl.
Figure 21:
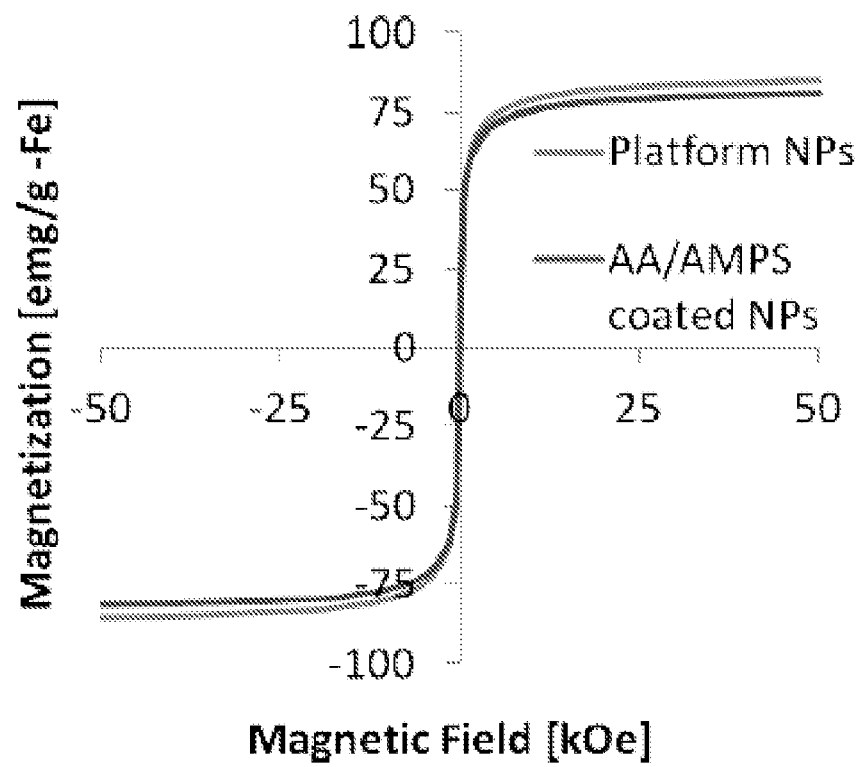
FIG. 21 is a graph of the magnetization of Cit-IO nanoclusters before and after $Ca^{2+}$-mediated coating of PAMPS-PAA.

The strength of the $Ca^{2+}$-mediated adsorption was tested by dispersing IO clusters in concentrated NaCl brine, without any free $Ca^{2+}$ ions in the solution, to determine if the polymer remained adsorbed on the nanocluster surface. It was hypothesized that the high concentration of $Na^+$ ions may weaken the $Ca^{2+}$ bridging with carboxylates that holds the polymer onto the particle surface. Remarkably, as shown in FIG. 20, all of the IO dispersions were found to be stable in NaCl (8% wt.) and displayed $D_H$ that were close to those measured in standard API brine. These results suggested that a $Ca^{2+}$ bridge between the polymer and the citrate IO clusters does not undergo ion-exchange with $Na^+$. It is likely that the same entropic force that drives association of $Ca^{2+}$ ions to PAA helps stabilize the $Ca^{2+}$ bridge on the NP surface. As a further test to assess strength of polymer adsorption, a 2% wt. dispersion of PAMPS-PAA (1:6)-coated IO was diluted to 0.01% wt. IO in 8% NaCl and equilibrated for a day in an attempt to drive polymer desorption. After separating IO clusters by ultracentrifugation and discarding the supernatant, IO nanoclusters were again subjected to the same equilibration (in 8% wt. NaCl) and separation (ultracentrifugation) procedure amounting to a 40,000 fold dilution. The resulting IO clusters were not only found to be stable in standard API brine, but retained most of the adsorbed polymer (80% of original organic content as determined by TGA). In comparison, 57% of the polyacrylic acid attached directly to iron oxide nanoparticles was lost after a similar desorption test, which illustrated the benefit of the $Ca^{2+}$-mediated polymer adsorption method. Furthermore, as shown in FIG. 21, upon $Ca^{2+}$-mediated adsorption, the magnetic properties of the IO clusters were preserved as evidenced by similar magnetization values (82-85 emu/g-Fe) before and after polymer coating. FIG. 21 is a graph of the magnetization of Cit-IO nanoclusters before and after AA-AMPS coating.

Properties of dispersions at high salinity: To gain further insight into the structural properties and colloidal stability of the synthesized IO NPs, their $D_H$'s and zeta potentials were measured after coating under the standard condition (5% polymer, 1% IO, and 5% $CaCl_2$), and are presented in Table 14.

TABLE 14

| Coating | Hydrodynamic Diameter "$D_H$" (nm) | | Zeta Potential in 10 mM KCl at pH 8 (mV)[a] |
|---|---|---|---|
| | DI water | standard API brine | |
| Citrate | 52 ± 12% | Unstable | −31 ± 13% |
| PAMPS-PAA (1:6) | 154 ± 16% | 139 ± 5% | −37 ± 9% |
| PAMPS-PAA (1:4) | 127 ± 46% | 169 ± 35% | −36 ± 7% |
| PAMPS-PAA (1:1)-212 kDa | 146 ± 17% | 126 ± 19% | −42 ± 5% |
| PAMPS-PAA (1:1)-52 kDa | 98 ± 17% | 110 ± 18% | −25 ± 7% |

[a]Zeta potential is reported at pH 8 and 10 mM KCl, where Smoluchowski's model is applicable (Debye length ~3 nm; Ka >> 1).

Table 14 is a summary of the colloidal properties of citrate IO clusters coated with PAMPS-PAA in aqueous media at room temperature. All listed PAMPS-PAA were adsorbed on IO under standard conditions: 5% wt. $CaCl_2$, 5% wt. polymer and 1% wt. IO at pH 7, 90° C. for 60 minutes.

In DI water, the $D_H$ of the clusters always increased significantly after polymer adsorption (see Table 12 and Table 14). The observed increase in $D_H$ was greater than the polymer $D_H$ (see Table 11) and indicated that aggregation of the IO clusters occurred during the coating process. Given that only van der Waals forces hold the clusters together, the clusters are dynamic and the sizes may vary when these forces are perturbed by interactions with the polymer. For example, polymer stabilizers have been shown to have a large influence on the size of Au nanoclusters. The change in size may also reflect Ostwald ripening, rearrangement of primary particles or even modest aggregation of individual clusters.

Despite the significant increase in $D_H$ after polymer coating, the change in $D_H$ observed when the particles were dispersed in brine instead of DI water was relatively small, essentially within experimental error.

Figures 22A, 22B, 22C, 22D, 22E, 22F:
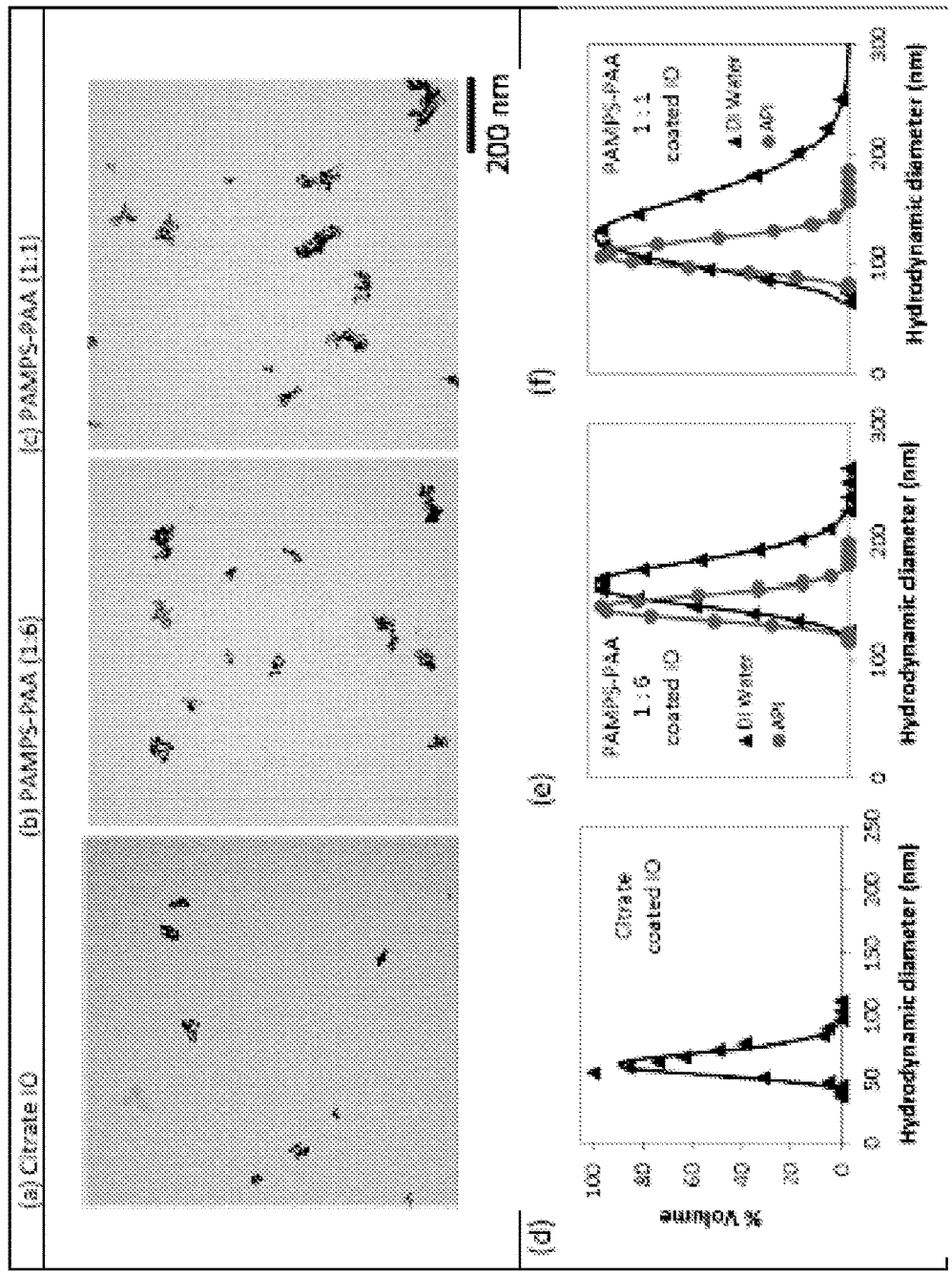
FIGS. 22a-22c are TEM images of hydrodynamic diameter ("$D_H$") distributions in DI water and standard API brine of citrate-coated, PAMPS-PAA (1:6) coated, and PAMPS-PAA (1:1)-212 coated IO nanoclusters, respectively.
FIGS. 22d-22f are plots of hydrodynamic diameter ("$D_H$") distributions in DI water and standard API brine of citrate-coated, PAMPS-PAA (1:6) coated, and PAMPS-PAA (1:1)-212 coated IO nanoclusters, respectively.

Thus, the adsorbed polymers provided excellent stabilization against aggregation with an increase in salinity. As expected due to differences in polymer size, the measured $D_H$ was significantly smaller for the PAMPS-PAA (1:1) 52 kDa than for the corresponding 212 kDa polymer. According to the TEM images in FIGS. 22a-22c, the volume-weighted core diameters of initial citrate IOs increased after coating with PAMPS-PAA (1:6) and PAMPS-PAA (1:1)-212 coatings. FIGS. 22a-22c are TEM images and FIGS. 22d-22f are plots of hydrodynamic diameter ($D_H$) distribution in DI water and standard API brine of citrate IO, PAMPS-PAA (1:6) coated, and PAMPS-PAA (1:1)-212 coated IO. Average TEM size was determined by Image J software analysis for ~50 clusters by calculating circular diameters with equivalent surface area as the clusters. The volume-weighted TEM diameters were found to be 53±10 nm, 75±21 nm, and 93±22 nm, for citrate IO, PAMPS-PAA (1:6), and PAMPS-PAA (1:1)-212, respectively. This increase in core diameters confirms that moderate aggregation of the citrate IO cores occurred when the polymer coating procedure was conducted. The measured mean $D_H$'s therefore were subject to contributions both from changes in the core and from the thickness of the adsorbed polymer.

Figure 23:
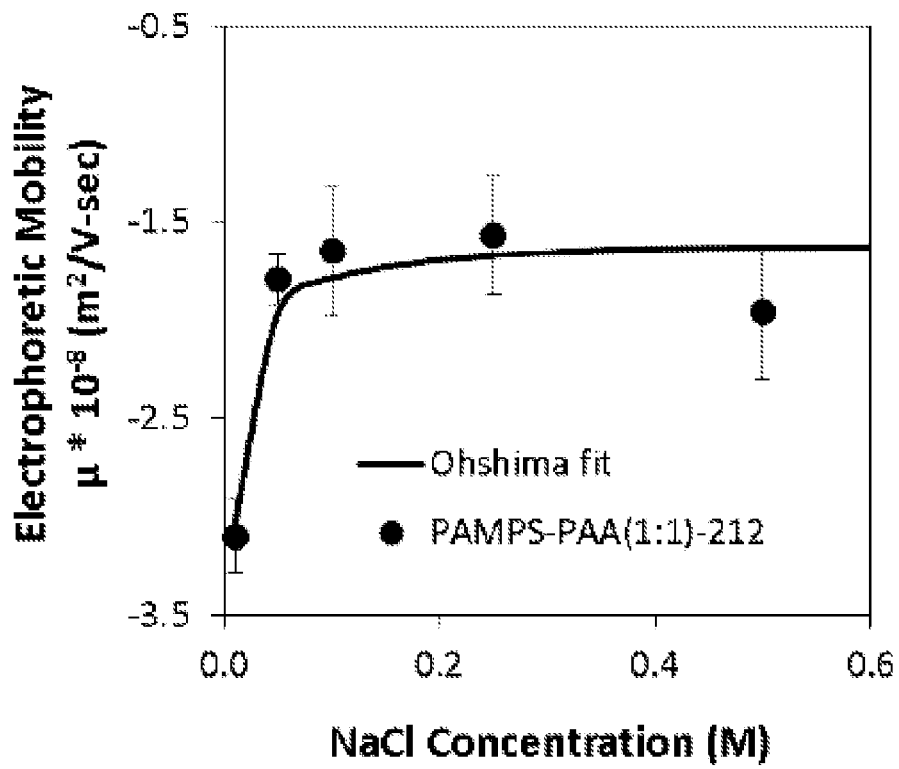
FIG. 23 is a graph of the electrophoretic mobility of PAMPS-PAA (1:1)-212 kDa coated IO clusters at various NaCl concentrations up to 0.5 M.

The zeta potentials (measured in dilute KCl at pH 8) of all the polymer-coated IO clusters were measured to be between $\zeta$=−36 and −42 mV, and were consistent with previously reported values for similar IO clusters, with the exception of PAMPS-PAA (1:1)-52, which was slightly less negative ($\zeta$=−25 mV). Referring to FIG. 23, the electrophoretic mobilities, μ, of PAMPS-PAA (1:1)-212-coated IO clusters were also measured at various concentrations of NaCl, up to 0.5 M. FIG. 23 is a graph of the electrophoretic mobility of PAMPS-PAA (1:1)-212 kDa coated IO clusters at various NaCl concentrations up to 0.5 M. The mobility plateaus at a non-zero value at high salinity and was fit to the Ohshima model with a charge density $\rho_{fix}$ of 30 mol/$m^3$, a Brinkman screening length of ($\lambda^{-1}$) of 2.2 nm, and a polymer thickness of 20 nm based on TEM and $D_H$ measurements. Interestingly, the NPs retained a significant electrophoretic mobility of μ=−1.6×$10^{-8}$ $m^2$N-sec up to 0.5 M NaCl, despite the relatively thin double layer (0.43 nm), as has been observed for related systems. The electrophoretic mobility data summarized in FIG. 23 were fit to Ohshima's analytical approximation, as shown in Equation 3, where, μ is the electrophoretic mobility, $\rho_{fix}$ is the charge density of polyelectrolyte groups, η is the viscosity of the solution, $\lambda^{-1}$ is the Brinkman screening length and is a measure of the softness of the polyelectrolyte layer, $\varepsilon_r$ and $\varepsilon_0$ are the relative and vacuum permittivity, $\Psi_0$ is the surface potential, $\kappa_m$ is the modified inverse Debye length for the polyelectrolyte layer, $\Psi_{DON}$ is the Donnan potential due to charges in the polyelectrolyte layer, d is the polyelectrolyte thickness, and a is the radius of the particle. The data in FIG. 23 were fit to a charge density ($\rho_{fix}$) of 30 mol/$m^3$ of elementary charge and a Brinkman screening length ($\lambda^{-1}$) of 2.2 nm.

$$\mu = \frac{\rho_{fix}}{\eta \lambda^2} + \frac{2\varepsilon_r \varepsilon_0}{3\eta}\left(\frac{\psi_0/\kappa_m + \psi_{DON}/\lambda}{1/\kappa_m + 1/\lambda}\right)\left(1 + \frac{1}{2(1+d/a)^3}\right) \quad \text{(Equation 3)}$$

Referring to FIG. 22c, the core radius a of the reported PAMPS-PAA (1:1)-212 coated IOs was found to be ~47 nm with polymer thickness d of 20 nm, as calculated based on the difference between the core diameters measured by TEM and the $D_H$ in standard API brine. These a and d values are comparable to literature values reported for PMAA grafted latex and various other inorganic polymer particles.

Mechanism of stabilization in high salinity: Given the extremely thin Debye length of 0.23 nm in standard API brine, the screened charge on the surface of the iron oxide cores was not expected to provide sufficient electrostatic repulsion to counter the van der Waals attraction between cores. Therefore, the stable colloid dispersions were a result of the electrosteric repulsion of the polyelectrolytes on the particle surfaces. An expression for the electrostatic component ($V_{ES}$) of the repulsion between two polyelectrolyte-coated spheres has been reported by Ohshima using Derjaguin's approximation as shown in Equation 4:

$$V_{ES}(H) = \frac{2\pi a \rho_{fix}^2 \sinh^2(\kappa d)}{\varepsilon_r \varepsilon_0 \kappa^4} \ln\left(\frac{1}{1-e^{-\kappa(H+2d)}}\right) \quad \text{(Equation 4)}$$

where H is the interparticle distance, which can fall below zero when the soft polyelectrolyte layers of two adjacent particles penetrate each other. The steric component ($V_{Osm}$) (see Equation 5) of the repulsion from the increase in osmotic pressure due to overlapping polymer segments has been modeled with the following expressions:

$$V_{Osm}(H) = 0 \qquad 2d \leq H \quad \text{(Equation 5)}$$

$$V_{Osm}(H) = \frac{4\pi a}{v}\varphi_P^2\left(\frac{1}{2}-\chi\right)\left(d-\frac{H}{2}\right)^2 \qquad d \leq H < 2d$$

$$V_{Osm}(H) = \frac{4\pi a}{v}\varphi_P^2\left(\frac{1}{2}-\chi\right)d^2\left(\frac{H}{2d}-\frac{1}{4}-\ln\left(\frac{H}{d}\right)\right) \quad H < d$$

where $\chi$ is the Flory-Huggins solvency parameter, $\varphi_p$ is the polymer volume fraction within the polyelectrolyte layer, and $v$ is the volume of one solvent molecule. When the polyelectrolyte is in its extended conformation ($\chi < \frac{1}{2}$) in a good solvent, the electrosteric stabilization provided by the polymer has been shown to prevent aggregation, as shown by a study using latex particles grafted with PMAA in 3.5 M NaCl. However, divalent ions bind strongly to PAA and can cause intrapolymer collapse, aggregation, and loss of electrosteric repulsion.

The stability of the PAMPS-PAA coated IOs even in the presence of $Ca^{2+}$ (standard API brine) is likely due to the high solubility of the hydrophilic PAMPS component in high $CaCl_2$ solutions. The classic concept of Napper is that stability of polymer-coated colloids, namely the critical flocculation temperature or salinity may be correlated with the phase behavior of the polymer. Therefore, the PAMPS-PAA copolymers that were found to be soluble in standard API brine also provided colloidal stability of IO nanoclusters when adsorbed at sufficient surface coverages. The low $Ca^{2+}$ binding affinity of AMPS prevents intrapolymer collapse, and translates to an extended conformation of PAMPS copolymers on particles ($\chi < \frac{1}{2}$), which allows for electrosteric stabilization of the IOs in standard API brine. As discussed earlier, the strong acidity of the AMPS group, the greater conformational freedom from the relatively longer side chain and the hydrophillicity of AMPS (due to amide group) contribute to its high tolerance to precipitation in the presence of calcium ions.

Figure 24:
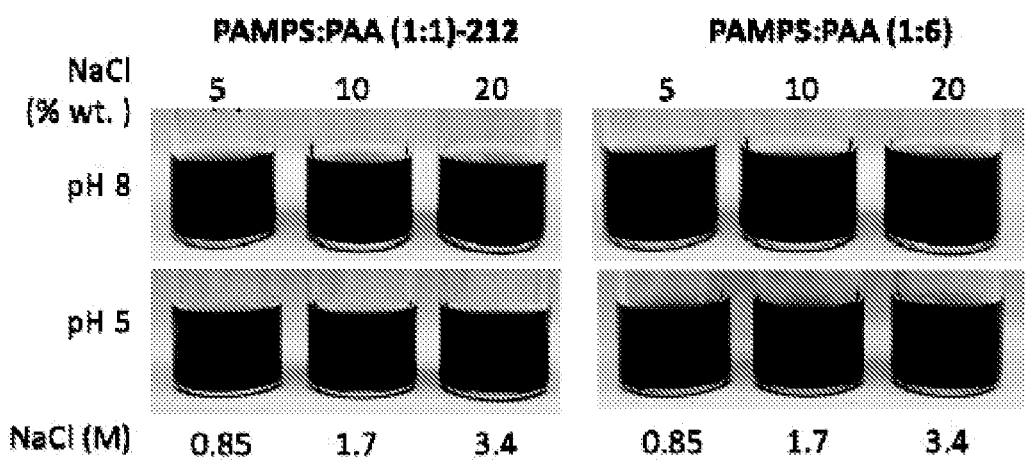
FIG. 24 shows digital images of glass containers showing the stability of IO coated with PAMPS-PAA (1:1)-212 and PAMPS-PAA (1:6) after 3 months in NaCl solutions up to 20% wt. NaCl (3.4 M) at the indicated pH values and 0.2% wt. IO concentrations.

Having demonstrated the stability of the IO NPs in standard API brine, efforts were directed towards testing the persistence of the same dispersions in extremely high NaCl and $CaCl_2$ concentrations (up to 20% wt.). Referring to FIG. 24, both PAMPS-PAA (1:6) and PAMPS-PAA (1:1)-212 IOs were investigated at two pH values (pH 5 and 8). These pH values were chosen to study the effect of protonated (pH 5) and deprotonated (pH 8) acrylic acid groups. Remarkably, as shown in FIG. 24, both samples were stable in 20% wt. NaCl (3.4 M) at both pH 5 and 8 for at least 3 months. FIG. 24 shows digital images showing the stability of IO coated with PAMPS-PAA (1:1)-212 and PAMPS-PAA (1:6) after 3 months in NaCl solutions up to 20% wt. NaCl (3.4 M) at the indicated pH values and 0.2% wt. IO conc. All dispersions were found to be stable. Even the relatively small fraction of PAMPS in PAMPS-PAA (1:6) enabled such long term stability in 20% wt. NaCl.

Figure 25:
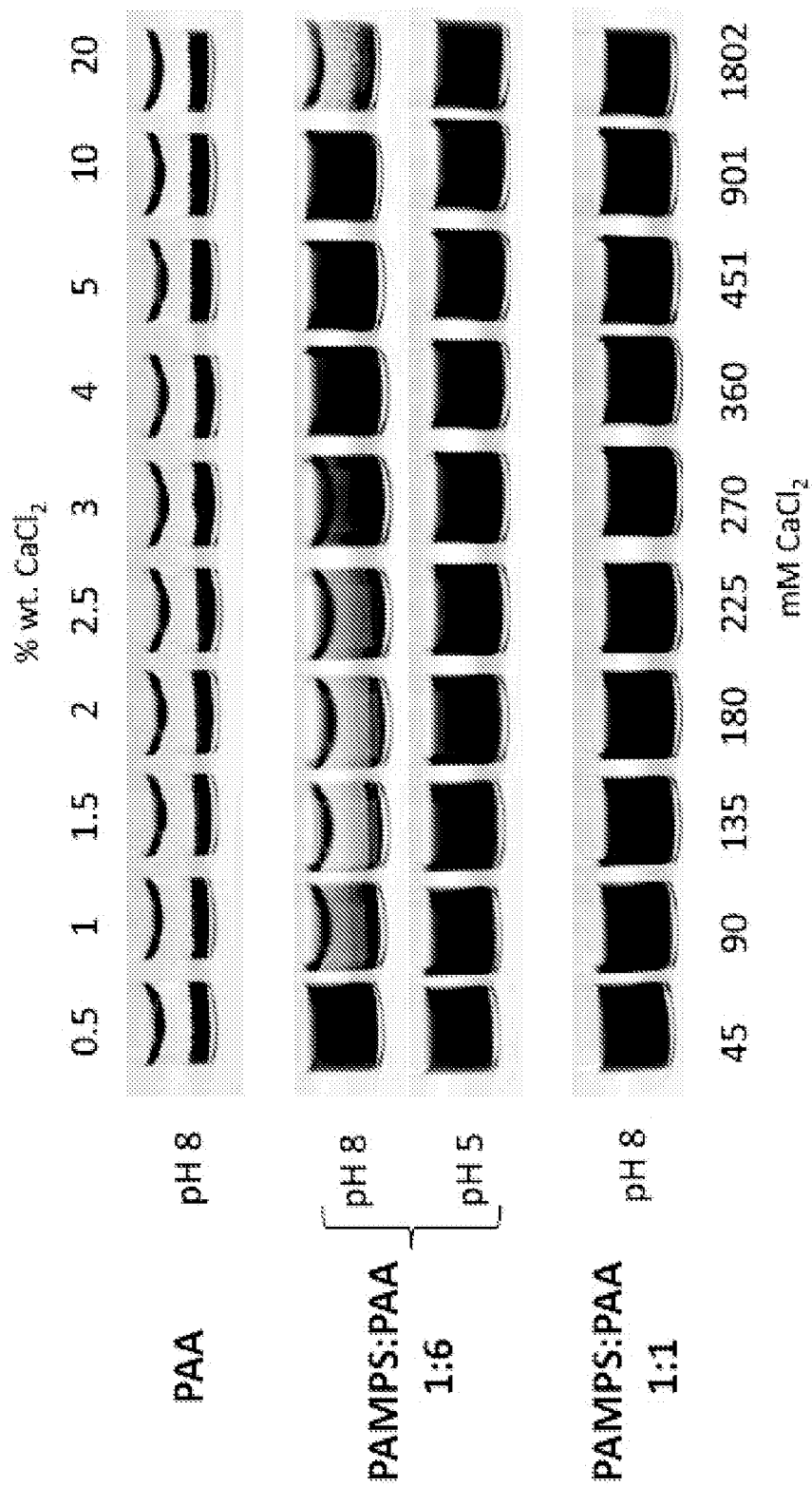
FIG. 25 shows digital images of glass containers showing the stability of IO coated with PAA, PAMPS-PAA (1:6) and PAMPS-PAA (1:1)-212 after 1 day in $CaCl_2$ solutions of various concentrations (as indicated) at the given pH values.

When analogous studies (see FIG. 25) were conducted with $CaCl_2$, PAA homopolymer was also included as a coating to assess the need for the PAMPS component. FIG. 25 shows digital images showing the stability of IO coated with PAA, PAMPS-PAA (1:6), and PAMPS-PAA (1:1)-212 after 1 day in $CaCl_2$ solutions of various concentrations (as indicated) at the given pH values. Both PAA and PAMPS-PAA (1:1)-coated IO clusters at pH 5 (not shown) were similar to the above dispersions at pH 8.

Figure 26:
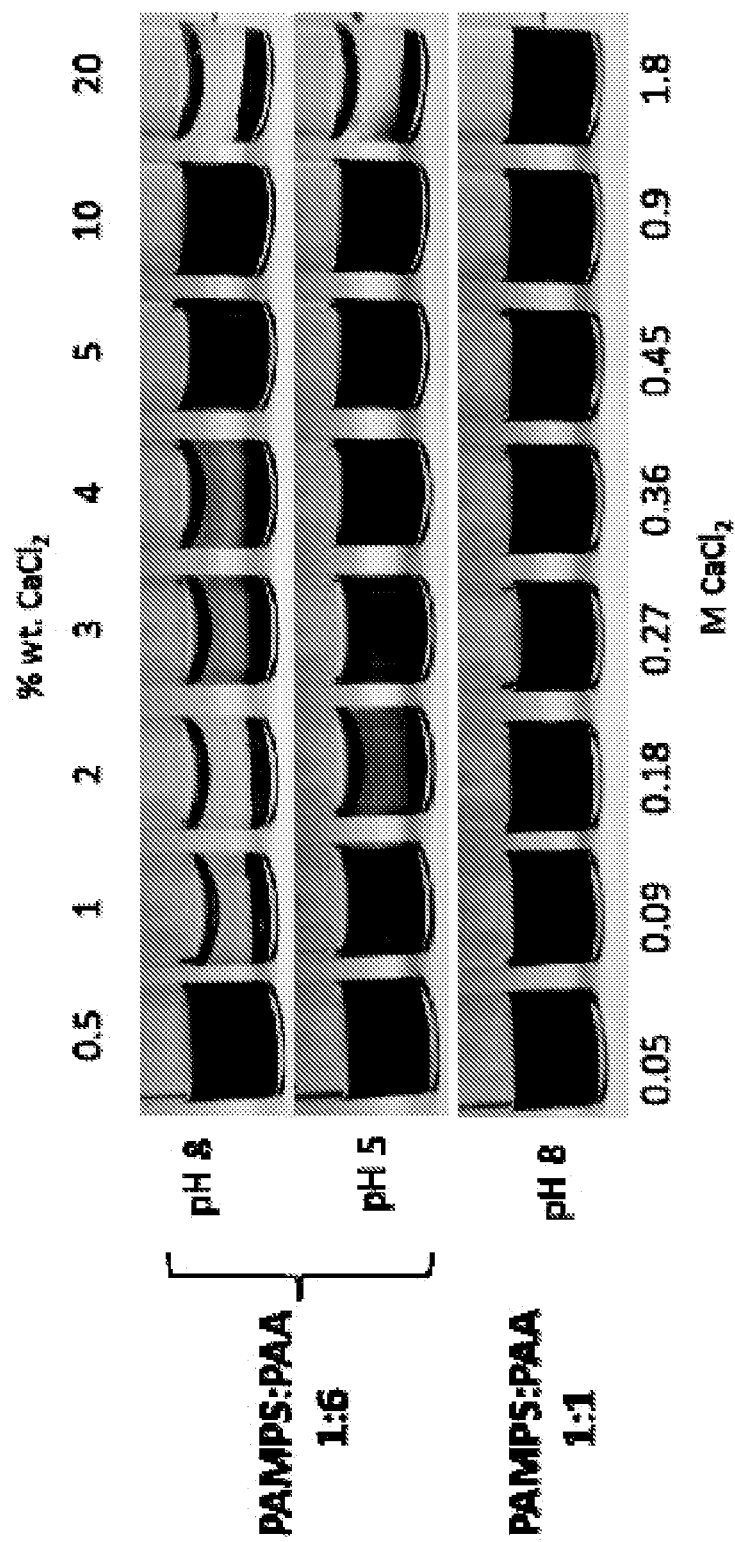
FIG. 26 shows digital images of glass containers showing stability of IO coated with PAMPS-PAA (1:6) and PAMPS-PAA (1:1)-212 after 3 months in $CaCl_2$ solutions of various concentrations (as indicated) at the given pH values.

The IO particles coated with PAA precipitated at both pH values and at all tested $CaCl_2$ concentrations, as expected, given the high binding affinity of PAA for $Ca^{2+}$. However, referring to FIG. 26, when PAMPS-PAA (1:1) was used as the coating, the IO clusters were stable in 20% wt. $CaCl_2$ at both pH 5 and 8 for at least 3 months due to the high proportion of $Ca^{2+}$-tolerant AMPs. FIG. 26 shows digital images showing the stability of IO coated with PAMPS-PAA (1:6) and PAMPS-PAA (1:1)-212 after 3 months in $CaCl_2$ solutions of various concentrations (as indicated) at the given pH values. PAMPS-PAA (1:1) coated IO clusters at pH 5 (not shown) were similar to the above dispersions at pH 8. PAMPS-PAA (1:1) IOs remained stable even after 3 months.

Referring to FIG. 25, the intermediate composition PAMPS-PAA (1:6) coated IO NPs displayed varying colloidal stability in $CaCl_2$ depending on the degree of dissociation of the acrylic acid group. It was expected that at pH 8, most of the acrylic acid groups would be deprotonated and have an extremely high binding affinity for $Ca^{2+}$. As a result, the PAMPS-PAA (1:6) coated IO clusters were only stable in up to 0.5% wt. $CaCl_2$, however as described above, they were stable in standard API brine which contains a higher $CaCl_2$ concentration (2% wt.) in addition to 8% wt. NaCl. It appears that the excess $Na^+$ in standard API brine competed with $Ca^{2+}$ for binding with the acrylic acid groups. Interestingly, at 4% wt. $CaCl_2$, the resistance to precipitation was restored, which was consistent with the reversal of surface charge on the nanoparticles produced by divalent ions such as $Ca^{2+}$. The observed overcharging-induced stabilization was eventually screened at 20% wt. $CaCl_2$, and the clusters were again destabilized. At pH 5, PAMPS-PAA (1:6) coated IO clusters formed stable dispersions up to 20% wt. $CaCl_2$, despite the presence of a low level of AMPS (14% moles). However, referring to FIG. 26, varying degrees of precipitation were observed after 3 months.

Figures 27A, 27B, 27C, 27D:
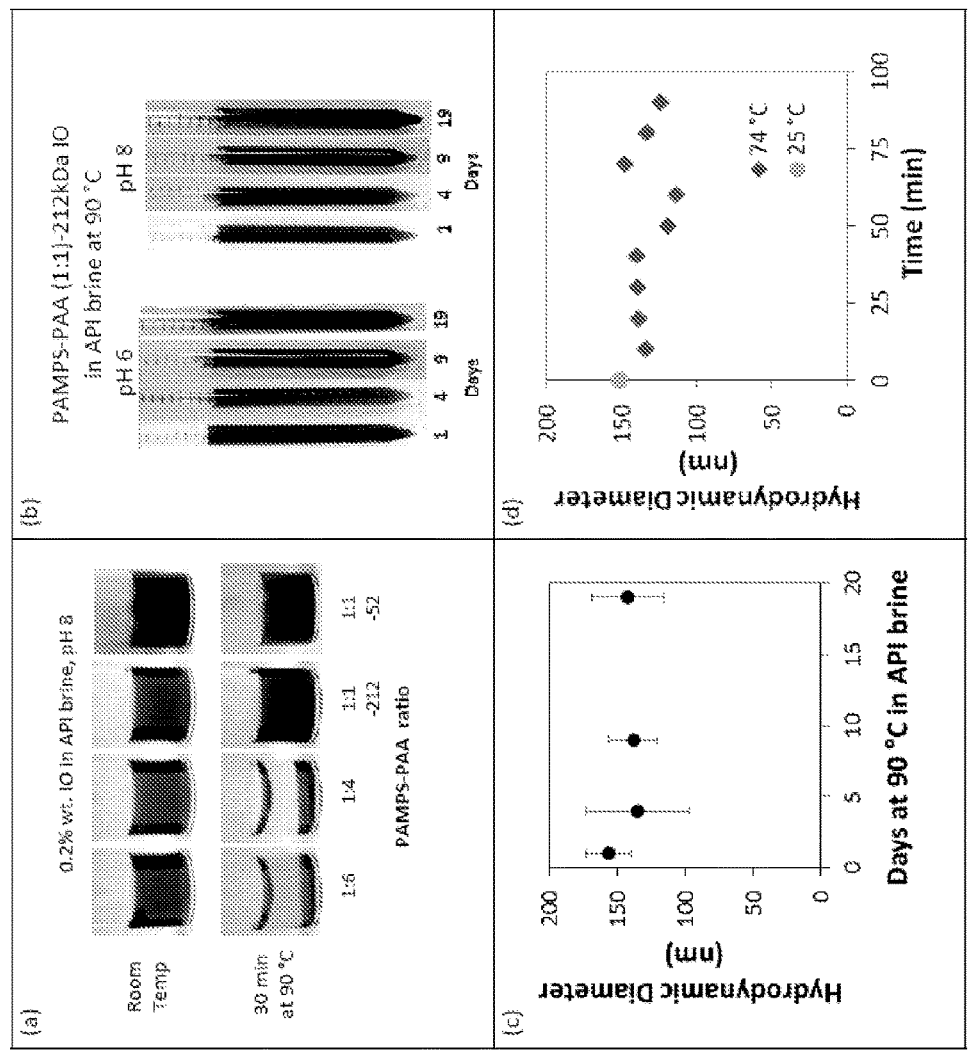
FIG. 27a shows digital images of the colloidal dispersions of IO clusters in standard API brine.
FIG. 27b shows digital images of the long term colloidal stability of PAMPS-PAA (1:1)-212 coated IO in standard API brine at pH values of pH 6 and pH 8.
FIG. 27c is a plot of the hydrodynamic diameters of the samples shown in FIG. 27b.
FIG. 27d is a plot of the hydrodynamic diameters of PAMPS-PAA (1:1)-212 coated IOs.

High temperature stability in standard API brine: Given that the sulfonated copolymers could be adsorbed onto IO NPs to provide room temperature stability in standard API brine and higher $CaCl_2$ and NaCl brines, efforts shifted towards testing the dispersion stability in standard API brine at elevated temperatures. As shown in FIG. 27a, all of the PAMPS-PAA coated IO cluster dispersions were stable at room temperature in standard API brine, however only the PAMPS-PAA (1:1) coated IOs retained stability at 90° C. Both PAMPS-PAA (1:6)- and PAMPS-PAA (1:4) coated IOs precipitated in less than 30 minutes at 90° C. Referring to FIG. 27b, the long term colloidal stability of PAMPS-PAA (1:1)-212 coated IO was tested in standard API brine at pH 6 and 8. Dispersions kept at pH 8 remained stable for up to 18 days, while those at pH 6 were, remarkably, stable for up to one month. This is the longest demonstrated period of stability of any nanoparticle dispersion in such concentrated brine at elevated temperature. Referring to FIG. 27c, the $D_H$ remained essentially unchanged at 140-150 nm over the measured period of 19 days. Similar stability studies at 90° C. with lower MW PAMPS-PAA (1:1)-52 coated IOs (not shown here) resulted in stability for 10 days at pH 6, and 8 days at pH 8, after which the dispersions flocculated. Again, during the period of stability, the $D_H$ were maintained at ~100 nm. As an additional indicator of this long term stability, the $D_H$ of PAMPS-PAA(1:1)-212- and PAMPS-PAA(1:1)-52 coated IOs were measured in standard API brine at 74° C. (max. limit of Zeta PALS instrument). Referring to FIG. 27d, no significant change in the diameter was observed over the entire monitored duration of 1.5 hours, further confirming the excellent stability provided by PAMPS-PAA (1:1). It was observed that the color of IO changed from brown-black to lighter brown during the long term stability studies at 90° C., due to the oxidation of magnetite to maghemite, however this did not affect the colloidal stability or the magnetic properties.

Figures 28A, 28B:
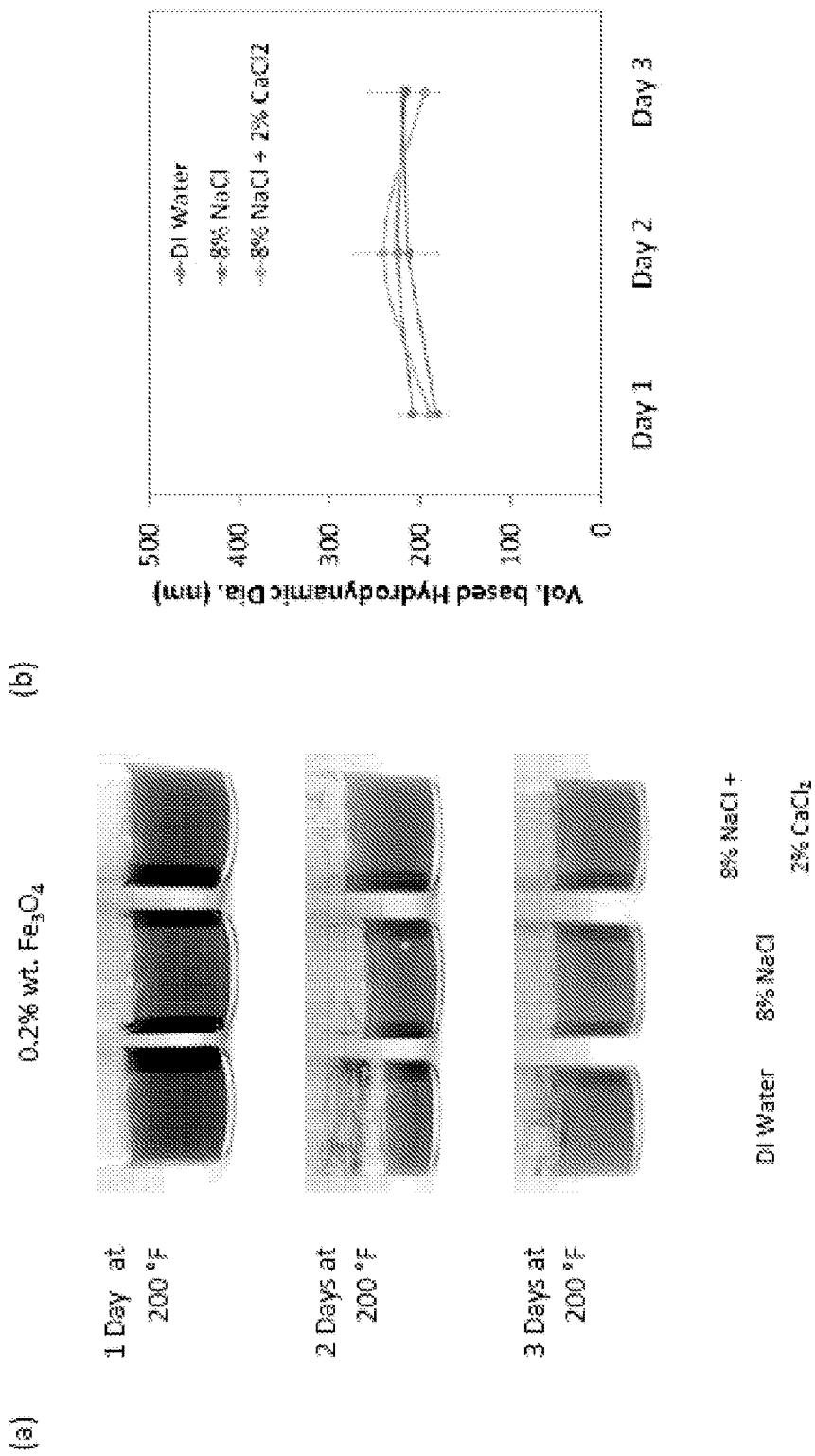

As previously discussed, the association of polyacrylic acid to $Ca^{2+}$ is an entropically driven process due to release of water of hydration. Therefore, it is not surprising that with an increase in temperature, the entropy driven association of acrylic acid to $Ca^{2+}$ also increases, causing precipitation of particles coated with PAA-containing polymers. As such, the coatings with higher AA content such as PAMPS-PAA (1:6) and PAMPS-PAA (1:4) were more prone to causing particle precipitation at higher temperatures due to intraparticle polymer collapse and interparticle $Ca^{2+}$ bridging. The increased stability of the PAMPS-PAA (1:1) IOs relative to the PAMPS-PAA (1:6) IOs is largely due to the higher AMPS content. The high temperature solubility of AMPS in $CaCl_2$ ensured extended polymer conformation for stabilization. Furthermore, referring to FIGS. 28a-28b, electrosteric stabilization in standard API brine at 90° C. was also observed with the PSS-b-PAA coated IO nanoclusters, where PSS is another sulfonate group that has been reported to have enhanced polymer solubility in $Ca^{2+}$ solutions at high temperatures. FIG. 28a shows digital images showing the colloidal stability of PSS-b-PAA-coated IO clusters in dispersions with various saline conditions. FIG. 28b is a graph of the hydrodynamic diameters measured by DLS of the samples shown in FIG. 28a.

In summary, the foregoing shows the colloidal stability of ~100 nm iron oxide clusters in standard API brine at 90° C. for 1 month was achieved with a sufficient level of poly(2-methyl-2-acrylamidopropanesulfonate-co-acrylic acid) (PAMPS-PAA 1:1) copolymer adsorbed on the surface to provide electrosteric stabilization. The stabilization was favored by the high ratio of AMPS, which has a low binding affinity for $Ca^{2+}$ at high temperatures, as shown by reported NMR studies due to its strong acidity and hydrophilic nature. Steric and electrosteric stabilization were also present for dispersions at room temperature in even higher salinities (up to 20% wt. $CaCl_2$ and 20% wt. NaCl), even with very thin double layers. When coated with polymers having lower AMPS ratios (PAMPS:PAA=1:6 and 1:4), the IO clusters remained stable in standard API brine at room temperature, but aggregated at 90° C. Here, the interchain interactions mediated by $Ca^{2+}$ between AA groups caused aggregation, given an insufficient content of $Ca^{2+}$ resistant sulfonate groups, and the entropy favored AA-$Ca^{2+}$ association. For the wide variety of systems studied, established are guidelines on the amount of adsorbed polymer required to provide stabilization against the attractive van der Waal's forces between large (~50-90 nm) iron oxide cores as a function of copolymer structure and MW.

Additionally, demonstrated is a methodology to provide a temporary driving force for achieving a high level of adsorption of anionic copolymers on anionic metal oxide surfaces by addition of $Ca^{2+}$, which promotes attraction between carboxylate functionalities. This methodology enabled an efficient combinatorial materials chemistry approach to facilitate the investigation of a large number of copolymers on a given type of IO nanoclusters, by separating the nanoparticle synthesis process from the coating process. This combinatorial approach offered a solution to the multifaceted challenge of identifying optimized copolymer stabilizers for electrosteric stabilization on a pre-designed nanoparticle core with desired function (for example, magnetic properties). This approach may be extended to a wide variety of nanoparticles and polymer stabilizers relevant to a wide variety of practical applications, including the design of magnetic nanoparticles for subsurface imaging.

Aspects of the present invention also have the ability to alter the wettability of the porous (i.e., rock, silica, reservoir, etc.) surface by adsorbing the magnetic nanoparticle (i.e., one or more magnetic metal or metal oxide nanoparticles with a polymer grafted to the surface) to enhance or modify the recovery of oil. The magnetic nanoparticle may be modified to tune the adsorption in the high salinity brine. Tuned adsorption of PAMPS-PAA adsorbed iron oxide nanoparticles on silica by modification with a range of amines with varying molecular weights and hydrophobicity, which facilitate rock wettability for imaging and enhanced oil recovery.

The polymer comprises a random copolymer, wherein the polymer comprises a first monomer comprising an anchoring group and a second monomer comprising a stabilizing group. The anchoring group may be acrylic acid, methacrylic acid, 4-vinylbenzoic acid, 3-acrylamido-3-methylbutanoate, or N-acryloylalanine, or a combination thereof. The stabilizing group may be 2-acrylamido-2-methyl propane sulfonate, vinylsulfonate, 3-sulfopropylmethacrylate, 3-[2-(N-methylacrylamido)-ethyldimethylammonio]propanesulfonate, 3-[N-(2-methacroyloyethyl)-N,N-dimethylammonio]propanesulfonate, or 3-(N,N-dimethylvinylbenzylammonio) propanesulfonate, or a combination thereof. The polymer may also include a betaine monomer.

Aspects of the present invention provide series of poly (2-acrylamido-2-methyl-1-propanesulfonic acid-co-acrylic acid) ("poly(AMPS-co-AA)") random copolymers grafted onto iron oxide ("IO") nanoparticles ("NPs") to provide colloidal stability in standard API brine. In addition to their remarkable stability in standard API brine, low adsorption/retention in static batch adsorption on silica microspheres in standard API brine and dynamic flow experiments was also observed. A combinatorial approach, which employed grafting poly(AMPS-co-AA) with wide ranges of compositions onto platform amine-functionalized IO NPs via a 1-ethyl-3-(3-dimethylaminopropyl)carbondiimidecarbondiimide ("EDC") catalyzed amidation, was used to screen a large number of polymeric coatings. The ratio of AMPS:AA was varied from 1:1 to 20:1 to balance the requirement of colloidal stabilization, low adsorption/retention (provided by 2-acrylamido-2-methyl-1-propanesulfonic acid ("AMPS")), and permanent attachment of stabilizer (provided by acrylic acid ("AA")). Further, batch adsorption was used as a quick screening test for 1D column flow experiments. Correlations of batch adsorption and flow experiments were observed. The role of divalent $Ca^{2+}$ mediated bridging of NPs with adsorbent and hydrophobic interactions in contributing to adsorption/retention in standard API brine in both the static batch adsorption and dynamic flow tests was confirmed. This rapid, high throughput combinatorial approach of grafting and screening (via batch adsorption) allowed for the development of NPs for transport in various porous media.

Aspects of the present invention provide magnetic iron oxide ("IO") nanoparticles ("NPs") that are stable in standard API brine for subsurface oil field applications. Although a large amount of NPs stabilizers have been developed for moderate conditions, the harsh environment of oil reservoirs (high salinities (>1 M), presence of divalent salts ($Ca^{2+}$ and $Mg^{2+}$), and high temperature (~150° C.)) may be expected to lead to NP aggregation and adsorption on mineral surfaces, which would ultimately hinder the transport of the NPs through hydrocarbon-bearing formations.

Aspects of the present invention provide stabilizing IO NPs by grafting random copolymers of poly-2-acrylamido-2-methylpropane sulfonic acid ("PAMPS") and poly(acrylic acid) ("PAA"), which serve as stabilizer and anchoring groups, respectively. The grafting of the AMPS AA copolymer (poly(AMPS-co-AA)), was achieved by coating the IO NPs with amino propyltriethoxy silane ("APTES"), followed by grafting of poly(AMPS-co-AA), via a 1-ethyl-3-(-3-dimethylaminopropyl) carbodiimide hydrochloride ("EDC") catalyzed amidation reaction with amine-coated IO NPs and the AA anchoring groups on the copolymer.

Aspects of the present invention provide screening that results in higher electrostatic attraction between the poly(AMPS-co-AA)-coated IO NPs and test adsorption material. In addition to electrostatic attraction, the EDC-catalyzed amidation reaction results in an isourea byproduct, which also hydrogen bond to the poly(AMPS-co-AA)-coated IO NPs. An option is to drive the amidation reactions using an acid catalyzed reaction at 90° C. to eliminate the possible effects that residual EDC plays on adsorption to silica microspheres. Aspects of the present invention provide a simplified amidation reaction and include a lower adsorption of the nanoparticles on silica microspheres by an order of magnitude and to show this enhanced transport of the nanoparticle through porous media (e.g., Ottawa sand).

Aspects of the present invention utilized a "grafting through" technique to covalently tether PAMPS to the surfaces of IO NPs. Vinyl groups were covalently attached to the amine-functionalized IO NPs, and was followed by performing free radical polymerization of AMPS monomers in the presence of the vinyl-coated IO NPs. The mechanism of the "grafting through" technique allows for propagating polymers (PAMPS) to graft to the vinyl groups on the surface of the particle. This was done so that the amount of polymer could effectively be controlled in order to study the adsorption versus polymer content. It was found that ultra-low adsorption using the previously disclosed batch adsorption test could be achieved.

Aspects of the present invention also provide polymer grafted iron oxide materials for the stabilization of emulsions, which is a novel application of particle stabilized emulsions. Aspects of the present invention provide the stabilization of oil-in-water emulsions with poly(oligo(ethyleneoxide)monomethyl ether methacrylate)-grafted iron oxide particle clusters ("IO-POEOMA") at ultra-low concentrations. The utilization of different aqueous phases with varying salinities shows the salt-tolerance of the POEOMA polymer.

Iron(II) chloride tetrahydrate, iron(III) chloride hexahydrate, citric acid monohydrate, 30% ammonium hydroxide, APTES, glacial acetic acid, calcium chloride dehydrate, sodium chloride, hydrochloric acid, sodium hydroxide, EDC, AA, potassium persulfate, and sodium metabisulfite were obtained from commercial sources and used as received. The AMPS monomer was commercially obtained from the Lubrizol Corporation and used as received. Uniform 8 μm silica microspheres with the trade name AngstromSphere Monodispersed Silica Powder (Catalog #SIO2P800-01-1KG) were commercially obtained from Fiber Optic Inc., New Bedford, Mass., USA, washed at least five times at pH 8 with DI water and dried at 80° C. in a convection oven before use. These particles are naked silica particles and have a large quantity of silanol groups as reported by the manufacturer. Dodecane was obtained from commercial sources and purified with alumina columns until the surface tension with DI water was 52.8±0.01 mN.

Synthesis of poly(2-acrylamido-3-methylpropanesulfonate-coacrylicacid) ("poly(AMPS-co-AA)") 1:1, 3:1, 5:1, 10:1, and 20:1): A three-necked round-bottom flask equipped with a magnetic stir bar, a nitrogen inlet, and a reflux condenser was charged with 18.5 g (0.09 mol), 30.9 g (0.135 mol), 30.9 g (0.149 mol), 33.7 g (0.16 mol), and 35.3 g (0.17 mol) of AMPS monomer for the 1:1, 3:1, 5:1, 10:1, and 20:1 systems, respectively, 4.86 g (0.018 mol) of potassium persulfate, and 3.42 g (0.018 mol) of sodium metabisulfite under an atmosphere of nitrogen. The flask was sealed with a rubber septum and 180 mL of deionized water that was previously degassed by bubbling with nitrogen for 30 minutes was added via a cannula to the reaction flask. With stirring, 6.14 ml (0.09 mol), 3.0 mL (0.044 mol), 2.05 ml (0.03 mol), 1.11 ml (0.16 mol), and 0.58 ml (0.01 mol) of acrylic acid was added to the reaction flask via a nitrogen-purged syringe for the 1:1, 3:1, 5:1, 10:1, or 20:1 systems, respectively. The total monomer concentration at the start of the reaction was 1.0 M. The flask was placed in an oil bath thermostatted at 80° C. and stirred at that temperature under nitrogen for 16 hours.

Synthesis of iron oxide nanoparticles (IO NPs): IO NPs were prepared by the Massart approach of aqueous co-precipitation of iron chlorides in presence of alkaline. A 1 L three-neck flask was charged with 8.6 g ferrous(II) chloride tetrahydrate and 23.48 g ferric(III) chloride hexahydrate to give the stoichiometric ratio of Fe(II):Fe(III)=1:2. The mixture of iron precursors was dissolved in 400 mL DI water together with 0.5 g citric acid monohydrate. The solution was degassed with $N_2$ and heated to 90° C. with magnetic stirring followed by quick injection of 100 mL 30% wt. aqueous $NH_4OH$ solution to facilitate hydrolysis and condensation of iron precursors. Black precipitate was formed immediately, and annealing of IO particles was continued at 90° C. for 2 hours under a $N_2$ atmosphere. The reaction mixture was then cooled to room temperature and washed with 500 mL DI water twice with magnetic decantation. A 0.5 T magnet (Eclipse Magnetics, catalog # N426) was used to collect the as-synthesized IO NPs, and the clear supernatant was carefully discarded. The as-synthesized 10 g of IO NPs was dispersed in 500 mL DI water and stored for later amine functionalization.

Amine-functionalization of IO NPs: Aqueous APTES coating was employed to introduce amine groups on the surface of as-synthesized IO NPs by modifying the previously described procedures. 59.2 mL APTES was mixed with 560 mL DI water and 26.72 mL glacial acetic acid solution by magnetic stirring. After 1 hour of acid catalysis, the pH of the activated APTES solution (pH-4) was raised to 8 by adding 2.5 N NaOH solution, followed by addition of DI water and 500 mL of as-synthesized IO NPs solution (10 g IO) to reach a total volume of 2 L. After 24 hour heating at 65° C. in a water bath, the reaction mixture was cooled to room temperature and continued to be stirred magnetically for another 24 hours. The amine-functionalized IO NPs were then separated with a 0.5 T magnet and washed twice with DI water. Since the magnetophoretic mobility of magnetic nanoparticles decays rapidly as the distance from magnet surface increases, the 0.5 T permanent magnet was sealed in a plastic bag and placed in the middle of the reactor to facilitate magnetic separation. Then, the IO NPs were dispersed in 200 mL DI water, and the pH of the solution was adjusted to 4.5 by adding 1 N HCl, followed by probe sonication for 20 minutes per 35 mL of the solution with a Branson tapered microtip. The dispersed IO NPs were then centrifuged at 4000 rpm for 10 minutes to remove large clusters. The amine-functionalized IO NPs in the supernatant were collected and ready for later grafting with poly(AMPS-co-AA) polymer. The yield of amine-functionalized IO NPs was 70-80%.

Grafting of poly(AMPS-co-AA) to amine-functionalized IO NPs: Poly(AMPS-co-AA) was first dissolved in DI water and 2.5 N NaOH to reach a pH of 4.7 with polymer concentration of 70 mg/mL, followed by activation of carboxylate groups with EDC (equimolar to PAA) at room temperature. After 10 minutes of EDC activation, an equal volume of 14 mg/mL amine-functionalized IO NPs were added to the activated polymer solution drop-wise under vigorous magnetic stirring. After 5 minutes of reaction, a 30% NaCl stock solution was added to the reaction mixture drop-wise to reach a final salinity of 3% to attempt to screen charges on the surface to raise incorporation of polyelectrolyte. The pH was adjusted to 4.7, and the reaction was continued for overnight at room temperature under constant stirring. The polymer-coated IO NPs were separated by centrifugation at 12,000 g and washed with DI water twice to remove excess reactants. The washed IO NPs were dispersed in DI water with probe sonication at ~2% w/v IO, followed by centrifugation at 4000 rpm for 10 minutes to remove large clusters. Briefly, (i) the concentration of reactants is lower (70% of previously reported procedures), (ii) poly(AMPS-co-AA) was firstly activated with EDC at pH 4.7 and then followed by drop-wise addition of amine-functionalized IO NPs instead of adding EDC after mixing poly(AMPS-co-AA) and amine-functionalized IO NPs at pH 6, and (iii) NaCl solution was added after mixing poly(AMPS-co-AA) and amine-functionalized IO NPs instead of adding to poly(AMPS-co-AA) solution first.

Polymer desorption tests were performed on selected poly(AMPS-co-AA)-grafted IO NPs, following the earlier described procedures. Organic content before and after desorption test was measured with TGA to evaluate the amount of polymer permanently grafted on IO NPs.

Emulsion tests of poly(AMPS-co-AA)-grafted IO NPs: Aqueous dispersions of 0.1% wt. IO NPs were prepared by dilution of concentrated IO NPs stock solution and concentrated brines with DI water to the desired concentration. Emulsions of equal volumes of purified dodecane and IO NP dispersion were prepared in glass vials and emulsified using an Ultra Turrax T25 homogenizer with a N8G 8 mm dispersing head operating at 13,500 rpm for 2 minutes. Emulsion type was identified by a "drop" test. Briefly, a drop of emulsion was added separately to a small volume of dodecane and water/brine, respectively. An emulsion that dispersed in aqueous phase but not in organic phase was assessed as o/w emulsion and vice versa. Droplet size distribution of selected emulsions was collected by light diffraction of diluted emulsions with its continuous phase using a Malvern Mastersizer S laser diffraction system (commercially available from Malvern Instruments).

Adsorption tests of poly(AMPS-co-AA)-grafted IO NPs on silica microsphere, washed 8 μm silica microsphere as mentioned earlier were used as adsorbent. The drying process may be conducted at low temperature (~below 200° C.) to avoid dehydroxylation of the silica surface. 2 mL of aqueous dispersions of poly(AMPS-co-AA)-grafted IO NPs in standard API brine was added to 1 g of 8 μm silica microsphere in a glass vial. The initial concentrations of feed IO NPs ranged from 0.03 mg/mL to 2 mg/mL. The glass vials were then sealed and shaken horizontally for several hours at room temperature on a LW Scientific Model 2100A Lab Rotator at 220 rpm. The mixture was then left undisturbed to have the 8 μm silica adsorbent sediment under gravitational field. The concentration of the IO NPs in the supernatant was measured by UV-vis spectrometer at 300 nm. Dilution of the samples with standard API brine was conducted whenever necessary so that the absorbance was below 2. The specific adsorption and monolayer coverage of IO NPs on silica adsorbent was calculated based on the concentration difference of the IO NP dispersions before and after adsorption.

Dynamic light scattering ("DLS") studies were performed to measure the volume-averaged hydrodynamic size of IO NPs in DI water and standard API brine with a Brookhaven ZetaPlus system (Brookhaven Instruments Co.) at a measurement angle of 90°. The autocorrelation functions were fitted with the CONTIN algorithm to extract the diffusion coefficient, and further converted to hydrodynamic size using a Stokes-Einstein equation. All measurements were collected over a 2 minute period at a count rate ~500 kcps with at least three measurements collected for each sample.

All electrophoretic mobility and zeta potential measurements were performed with IO NP concentration of 0.02 mg/mL-0.1 mg/mL using a Brookhaven ZetaPlus zeta potential analyzer (Brookhaven Instruments Co.). Zeta potential measurements were conducted in 10 mM KCl solution at pH 6 for amine-functionalized IO NPs and pH 8 for poly(AMPS-co-AA)-grafted IO NPs. A Smoluchowski model was used to convert measured electrophoretic mobility to zeta potential. The reported zeta potential values are an average of at least 6 measurements with each of the measurement collected for 30 electrode cycles. The Smoluchowski model is applicable when the size of the particle is much larger than the Debye length of the solution (~3 nm for 10 mM KCl), which is always satisfied for the measurements in this study. Electrophoretic mobility measurements were conducted in NaCl solution and combined NaCl and $CaCl_2$ solution at pH 8 following the same procedures when the ionic strength of the solution is below or equal to 20 mM. Measurements at higher ionic strength were conducted at 3 V and 20 Hz frequency to minimize the polarization effects. Change of new sample after each run and cleaning of electrode was performed whenever necessary.

Thermogravimetric Analysis ("TGA") was used to measure the organic content of the IO NPs after APTES functionalization and poly(AMPS-co-AA) grafting. Measurements were conducted using a Mettler-Toledo TGA/SDTA851e instrument under air at a heating rate of 20°

C./min from 25 to 800° C. The percentage loss of weight was reported as the mass fraction of organic coating on the iron oxide.

Gel Permeation Column Chromatography ("GPC") was used to measure the molecular weight and polydispersity index of the 1:1, 3:1, 5:1, 10:1, and 20:1 poly(AMPS-co-AA). Measurements were conducted using Viscotek GPC water columns, attached to a Water's 1515 isocratic HPLC pump, and a Water's 2414 refractive index detector and run against a PSS standard. The poly(AMPS-co-AA) polymers were dissolved in a 3:1 water:acetonitrile solution at a polymer concentration of 4 mg/ml; the GPC columns was also purged with the 3:1 water: acetonitrile solution prior to injection, and run at a rate of 1.0 ml/min.

Figure 29A:
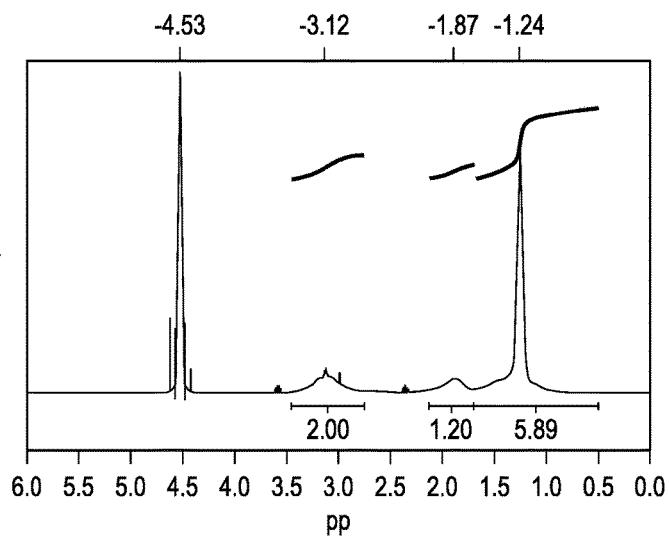
FIGS. 29a-29c are images of the nuclear magnetic resonance ("NMR") data of poly(AMPS-co-AA).
Figure 29B:
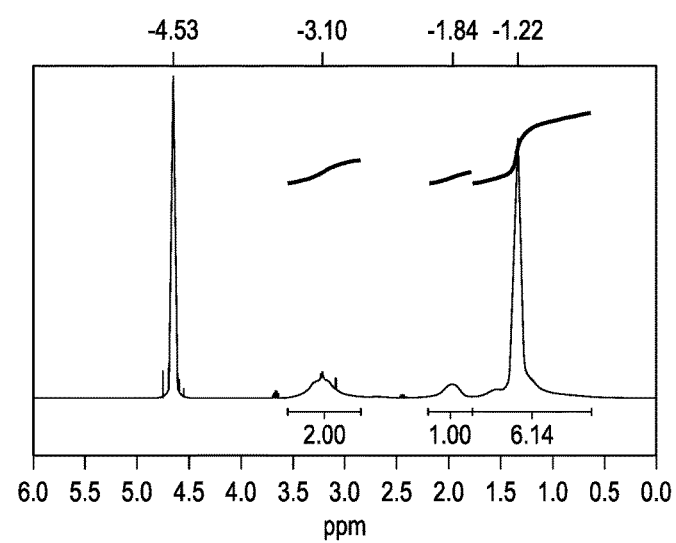
Figure 29C:
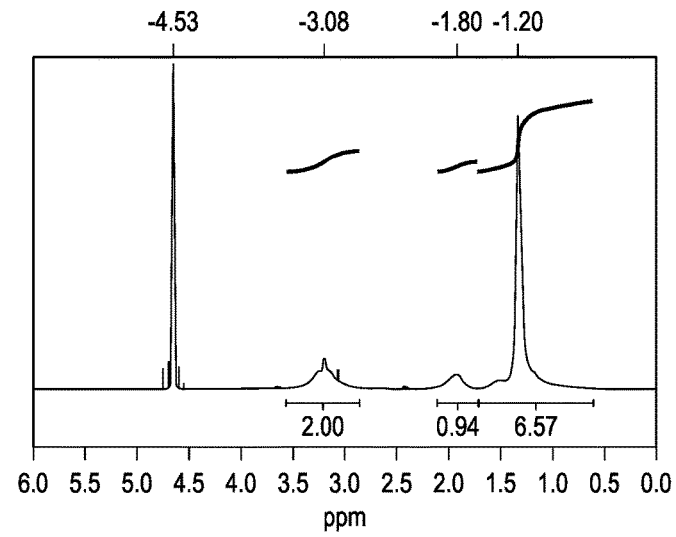

Characterization and design principle of poly(AMPS-co-AA): A series of random copolymers of AMPS and AA with monomer feed ratios ranging from 1:1 to 20:1 were synthesized by aqueous free radical polymerization and characterized using NMR (see FIGS. 29a-29c), GPC, and DLS. FIGS. 29a-29c are images of the NMR data of poly(AMPS-co-AA). FIG. 29a shows a ratio of 5:1. FIG. 29b shows a ratio of 10:1. FIG. 29c shows a ratio of 20:1.

Figures 30A, 30B:
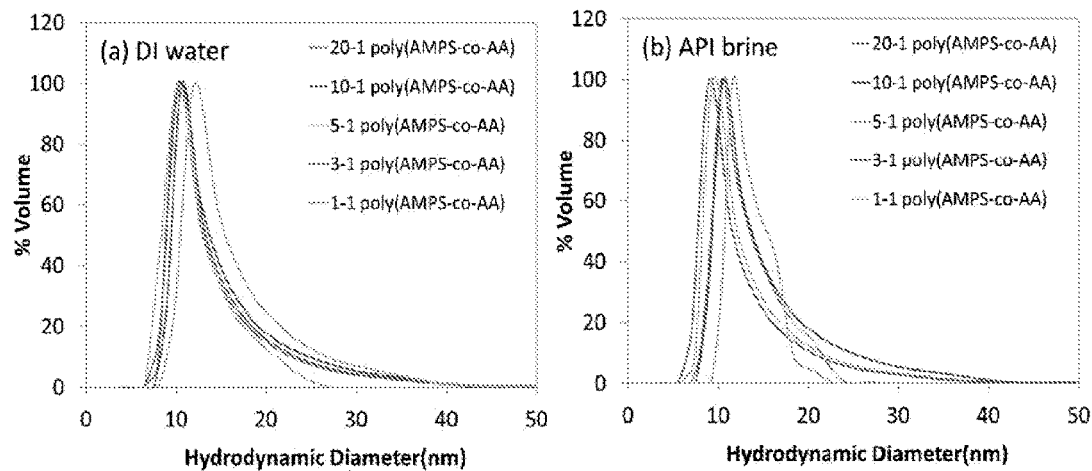
FIG. 30a is an image of a plot of volume-weighted hydrodynamic diameter distribution of poly(AMPS-co-AA) with feed ratio from (1:1) to (20:1) in DI water.
FIG. 30b is an image of a plot of volume-weighted hydrodynamic diameter distribution of poly(AMPS-co-AA) with feed ratio from (1:1) to (20:1) in standard API brine.

As seen in Table 15, the molecular weights ("MWs") and polydispersity indexes ("PDI") of the various poly(AMPS-co-AA) copolymers were determined using GPC traces, and showed similar values regardless of the initial monomer feed ratio. Table 15 shows NMR and GPC data of poly(AMPS-co-AA) with monomer feed ratios of AMPS to AA ranging from 1:1 to 20:1. This similarity is unexpected considering the wide distribution of MWs from free radical polymerization. Referring to FIGS. 30a-30b and Table 15, polymer conformation was also investigated using DLS by measuring the hydrodynamic size of polymer coils in both deionized ("DI") water and standard API brine. FIGS. 30a and 30b are images of plots of the volume-weighted hydrodynamic diameter distribution of poly(AMPS-co-AA) with feed ratios from 1:1 to 20:1 in DI water (FIG. 30a) and standard API brine (FIG. 30b). Interestingly, despite the wide composition variation in these series of copolymers, similar hydrodynamic sizes of ~10 nm in DI water were obtained. Furthermore, a similar hydrodynamic size of ~10 nm is also observed in standard API brine, indicating limited aggregation or collapse of the poly(AMPS-co-AA) chains.

the NPs, (2) for exogenous catalysts, (3) for expensive starting materials, and (4) to provide an inert atmosphere make the "grafting from" approach more difficult for industrial large-scale production. Due to these difficulties, the synthesized poly(AMPS-co-AA) random copolymers were covalently attached to the IO NPs using a "grafting to" approach, which allowed for the direct attachment of pre-synthesized poly(AMPS-co-AA) polymers under ambient conditions. In addition to the simplistic experimental setup, the polymers' MWs and PDIs could be obtained prior to the grafting process.

In a process similar to the schematically shown in FIG. 13a, carboxylate anchoring groups on the copolymers were first activated using EDC. The amine-functionalized IO NPs were then added so that the carboxylate groups on the polymer could react with the amine groups on the IO NP surface and form amide bonds. Then this was followed by addition of NaCl solution. This process simplicity allowed for high throughput and rapid screening of the different polymeric coatings.

The use of adding NaCl after adding the amine-functionalized IO NPs is a slight change from previously utilized processes. This step was performed because the "grafting to" technique is, in essence, a self-limiting process in that the free polymer chains to be grafted must overcome the electrostatic or steric repulsion forces exerted by the existing polymer layer on the surface of the NP. Covalent tethering of polymer from solution or melt was theoretically predicted to have different kinetic regimes. Briefly, at the beginning, the free polymers are able to quickly graft to solid surfaces because they are only limited by diffusion through the solvent. As more polymers are tethered, the accumulated polymers hinder further grafting by exerting steric repulsion. As shown in Table 16, in the case of grafting polyelectrolytes to oppositely charged surfaces, the accumulated polyelectrolyte will lead to charge inversion, as demonstrated by the inversion of zeta potential from +30 mV to −35--45 mV, and the electrostatic repulsion between like-charged polymer chains will further impede covalent tethering. The covalent grafting procedure was therefore conducted in the presence of NaCl after charge inversion to facilitate further

TABLE 15

| Polymer | Structure | MW (kDa) | PDI | Hydrodynamic diameter in DI water (nm) | Hydrodynamic diameter in standard API brine (nm) |
|---|---|---|---|---|---|
| Poly(AMPS-co-AA) (1:1) | | 95 | 3.00 | 11.9 ± 2 | 11.6 ± 2 |
| Poly(AMPS-co-AA) (3:1) | | 124 | 2.95 | 10.3 ± 2 | 9.0 ± 2 |
| Poly(AMPS-co-AA) (5:1) | | 182 | 2.08 | 10.2 ± 2 | 9.4 ± 2 |
| Poly(AMPS-co-AA) (10:1) | | 151 | 2.76 | 10.6 ± 2 | 10.5 ± 2 |
| Poly(AMPS-co-AA) (20:1) | | 133 | 2.23 | 10.1 ± 2 | 10.3 ± 2 |

Grafting of poly(AMPS-co-AA) copolymers onto IO NPs: The grafting of polymeric stabilizers to colloids may be performed either using a "grafting to" or "grafting from" technique. Although the "grafting from" approach typically provides higher grafting densities than the "grafting to" approach, the need (1) to tether initiators to the surfaces of grafting by screening like charges. This technique of using electrolytes to increase the amount of polyelectrolytes attached on oppositely charged surfaces is well known in the art. Table 16 provides a summary of colloidal properties of amine-functionalized IO NPs and poly(AMPS-co-AA) grafted IO NPs.

TABLE 16

| Type of IO NPs | Hydrodynamic size (nm)[a] | Zeta potential (mV)[b] | Organic content by TGA (%)[c] |
|---|---|---|---|
| Amine-functionalized IO NPs | 53 ± 11% | +30 | 8 ± 2 |
| Poly(AMPS-co-AA) (1:1) grafted IO | 216 ± 12% | −45 | 13.7 ± 2 |
| Poly(AMPS-co-AA) (3:1) grafted IO | 150 ± 6% | −37 | 15.1 ± 2 |
| Poly(AMPS-co-AA) (5:1) grafted IO | 140 ± 9% | −32 | 14.8 ± 2 |
| Poly(AMPS-co-AA) (10:1) grafted IO | 121 ± 7% | −38 | 13.9 ± 2 |
| Poly(AMPS-co-AA) (20:1) grafted IO | 103 ± 10% | −35 | 15.2 ± 2 |
| Poly(AMPS-co-AA) (20:1) grafted IO after desorption test | 107 ± 8% | −34 | 13.7 ± 2 |

[a]DLS auto-correlation function of amine-functionalized IO NPs and poly(AMPS-co-AA)-grafted IO NPs was collected in DI water and standard API brine, respectively.
[b]Zeta potentials were collected in 10 mM KCl at pH 6.
[c]TGA data were collected in nitrogen atmosphere to avoid possible oxidation of magnetite to maghemite/hematite at elevated temperature and organic content values are taken at 500° C.

Figure 31:
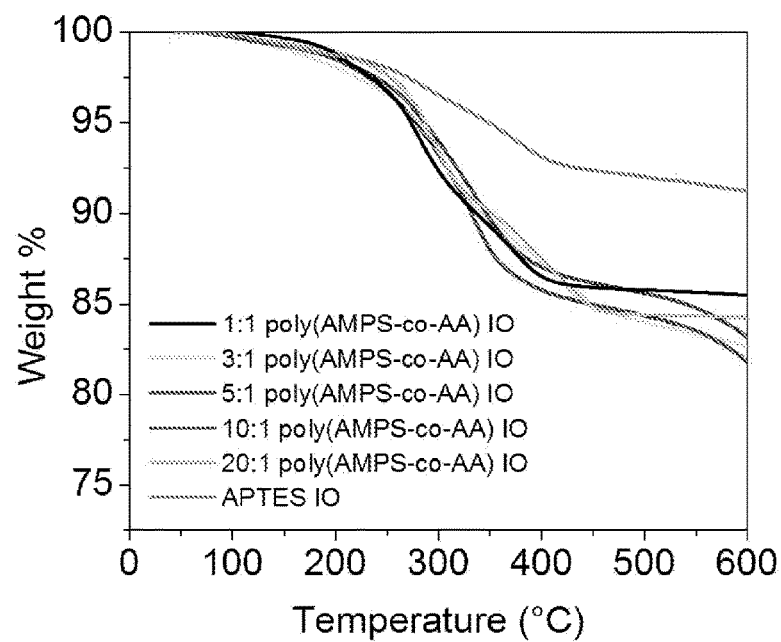
FIG. 31 is a plot of TGA curves of APTES IO NPs and (AMPS-co-AA) grafted IO NPs with different AMPS:AA ratios from 1:1 to 20:1.

Electrosteric stabilization of poly(AMPS-co-AA) grafted IO NPs: As indicated in Table 16, the successful grafting of the poly(AMPS-co-AA) was demonstrated using both zeta potential and TGA. As indicated in FIG. 31 and Table 16, both an inversion of zeta potential from positive (surface amine groups) to negative (negatively charged polyelectrolyte) and an increase of organic content from 8% to ~15% is evident in all the poly(AMPS-co-AA) cases. However, it is possible that during this "grafting to" process, that the negatively charged polymer chains may also adsorb to positively charged amine-functionalized IO NPs via electrostatic attraction. This would prove problematic because the polymeric stabilizer would be subject to desorption under harsh conditions such as high salinity, infinite dilution, and the large surface area of rocks, which are typically encountered in subsurface hydrocarbon reservoirs. To confirm the successful grafting of poly(AMPS-co-AA) to the IO NP surface, the 20:1 monomer feed ratio of poly(AMPS-co-AA) was subjected to a 40,000 fold dilution test (final concentration=0.01% w/v JO) in 1 M NaCl followed by TGA analysis.

Figure 32:
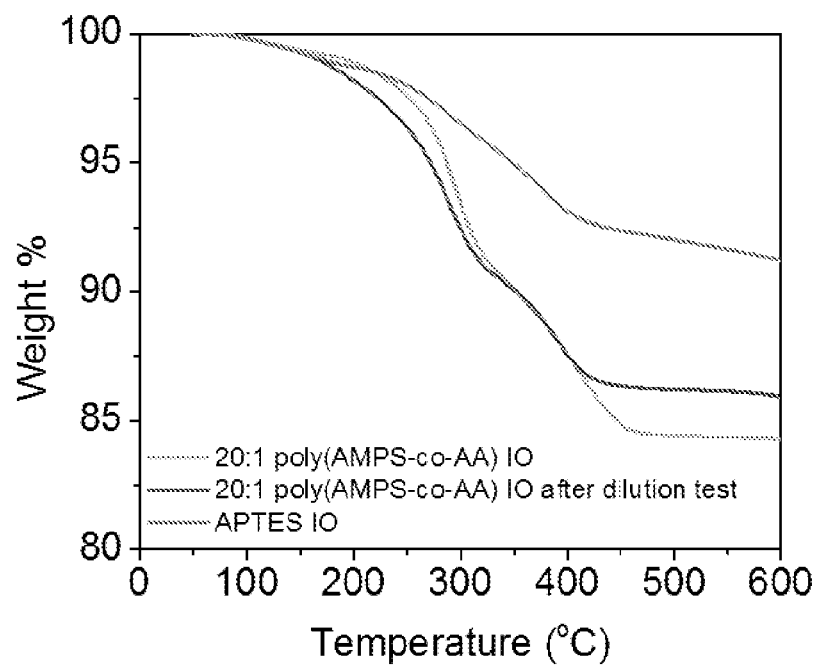
FIG. 32 is a plot of TGA curves for APTES IO NPs and poly(AMPS-co-AA) (20:1) grafted IO NPs before and after desorption test (40,000 dilution test in 1 M NaCl solution).

As seen in FIG. 32 and Table 16, the total organic content for both the before and after the desorption test cases remained similar, indicating negligible loss of the poly(AMPS-co-AA). The 1 M NaCl was used intentionally to screen electrostatic forces and drive desorption of physisorbed polymer chains. Therefore, negligible losses in polymeric content could also be expected in hydrocarbon-bearing reservoirs. In addition to TGA analyses, as indicated in Table 16, the hydrodynamic size of the poly(AMPS-co-AA) 20:1 grafted IO NPs in standard API brine and zeta potential are also well maintained, further indicating robust permanent attachment of polymer chains. Combined with similar studies from previously disclosed poly(AMPS-co-AA) 3:1 grafted IO NPs, it is reasonable to deduce that poly(AMPS-co-AA) with AMPS:AA ratios from 1:1 to 20:1 were successfully grafted to platform amine-functionalized IO NPs using the similar "grafting to" technique.

Figure 33:
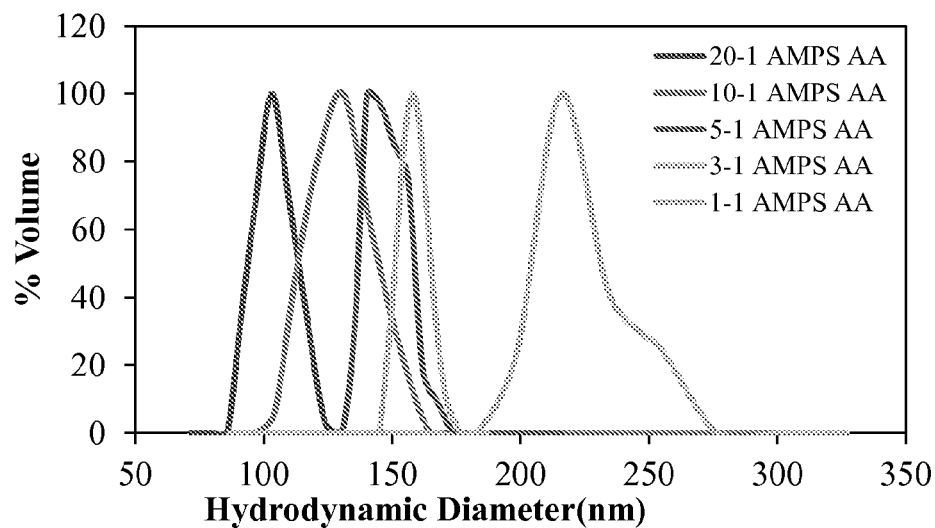
FIG. 33 is a plot of the volume-weighted hydrodynamic size distributions of poly(AMPS-co-AA) 1:1, 3:1, 5:1, 10:1, and 20:1 grafted IO NPs in standard API brine at pH 8.

Referring to Table 16 and FIG. 33, after grafting of the poly(AMPS-co-AA) to the surfaces of the IO NPs, the hydrodynamic diameters of the IO NPs increased from ~50 nm to >100 nm. FIG. 33 is a plot of the volume-weighted hydrodynamic size distribution of poly(AMPS-co-AA) 1:1, 3:1, 5:1, 10:1, and 20:1 grafted IO NPs in standard API brine at pH 8. This increase is much larger than the added hydrodynamic size of the polymer coil, ruling out the possibility that the increase in hydrodynamic diameter is solely based on the polymer coating. Furthermore, as indicated in Table 16 and FIG. 33, as the ratio of AA anchoring groups decreases from 1:1 to 20:1 in the poly(AMPS-co-AA) copolymers, the hydrodynamic sizes of the IO nanoclusters decreased from 216 nm to 103 nm. Considering the multiple carboxylate anchoring groups in each polymer chain and the relatively high MWs of the polymers (~100 to 200 kDa), it is likely that the increase in hydrodynamic size after grafting is due to the bridging of multiple amine-functionalized IO NPs with the carboxylates on the poly(AMPS-co-AA). Presumably, as further indicated in Table 16 and FIG. 33, as the number of carboxylate groups decreases, the ability of polymer chains to bridge IO NPs and form larger clusters also decreases accordingly, thus a decrease in cluster size.

The stability of the IO NPs with all of the various grafted copolymers, suggests that the polymer chains remain well-solvated, consistent with the solubility data for the pure polymer, and provide electrosteric stabilization. As discussed previously, the total potential is given by the sum of van der Waals attraction, electrical double layer ("EDL") interactions, and electrosteric stabilization produced by the grafted polymer. At low salinities where the extended electric double layer exerts a long-range repulsion force, small ligands such as citrate or surfactant bilayers are widely used to provide electrostatic stabilization over a certain pH range. However, at high salinities (≥1 M ionic strength), the Debye length drops to 0.3 nm, and the electrostatic repulsion becomes insufficient to overcome the attraction forces. For this reason, the polymeric stabilizers were required to provide electrosteric stabilization via a local osmotic pressure and entropic elastic repulsion force. The strength of steric stabilization depends on the size of the particles, volume fraction of polymer, the thickness of the polymer layer, and the Flory-Huggins parameter of the polymer-solvent system, which is a measure of the relative strength of segment-segment, segment-solvent interaction, and determines the conformation of the polymer chain in the solvent.

Figure 34:
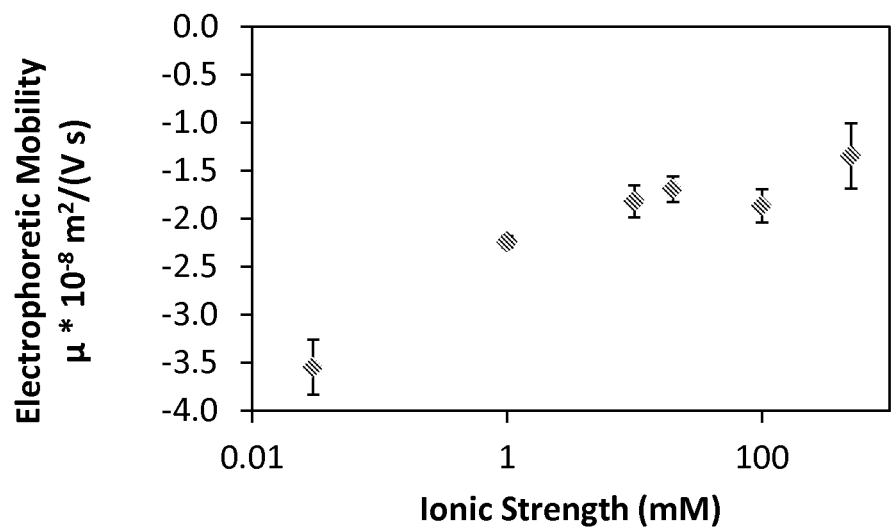
FIG. 34 is a plot of the electrophoretic mobility of poly(AMPS-co-AA) (5:1) grafted IO NPs in combined $Na^+$ and $Ca^{2+}$ solutions (molar ratio of $Na^+/Ca^{2+}$=7.6, same as in standard API brine) at pH 8.

Electrophoretic mobility of poly(AMPS-co-AA)-grafted IO NPs: The conformation of charged polyelectrolytes on the surface plays an important role in colloidal stability. Referring to FIG. 34, due to its importance, polymer conformation and charge were investigated via electrophoretic mobility studies using the poly(AMPS-co-AA) 5:1 grafted IO NPs in a series of NaCl and $CaCl_2$ solutions (fixed molar ratio=7.6, same as in standard API brine) of varying ionic strengths. FIG. 34 is a plot of the electrophoretic mobility of poly(AMPS-co-AA) (5:1) grafted IO NPs in combined $Na^+$ and $Ca^{2+}$ solutions (molar ratio of $Na^+/Ca^{2+}$=7.6, same as in standard API brine) at pH 8. A highly negative mobility of $-3.55 \times 10^{-8}$ $m^2/(V\ s)$ was observed in DI water (0.03 mM), indicating a large number of negative charges on the polyelectrolyte. As the ionic strength increases to 10 mM, the mobility decreased to $-1.82 \times 10^{-8}$ $m^2/(V\ s)$. Further increase of ionic strength up to 500 mM gives relatively constant mobility of $-1.34 \times 10^{-8}$ $m^2/(V\ s)$, within experimental error. Electrophoretic mobility at higher ionic strength (ionic strength of standard API brine=2.04 M) cannot be measured due to large uncertainty of the measurement at extreme salinities. The reduction of electrophoretic mobility with an increase in ionic strength indicates screening but the mobility reaches a plateau. Even up to 0.5 M ionic strength, the poly(AMPS-co-AA)-grafted IO NPs still retain a substantial amount of negative charges, which is beneficial for providing electrosteric stabilization.

Referring to FIG. 34 and Table 17, to differentiate between the effects of $Ca^{2+}$ versus $Na^+$ ions on polyelectrolyte conformation, electrophoretic mobility studies of poly(AMPS-co-AA) 3:1 and 5:1 grafted IO NPs were performed using either a 1 mM or 10 mM solution of only NaCl or a combined NaCl and $CaCl_2$ solution at the same ratio of 7.6. As indicated in Table 17, it was observed that the presence of divalent $Ca^{2+}$ ions decreases the electrophoretic mobility significantly at both 1 mM and 10 mM total ionic strength. The observed effect of divalent cations is consistent with previous studies on the binding of $Na^+$ and $Ca^{2+}$ on PAA and PAMPS homopolymers, respectively. The thermodynamics of strong binding of $Ca^{2+}$ onto sodium polyacrylate ("Na-PA") is primarily due to entropic effects originating from the liberation of hydrated water molecules instead of direct electrostatic attraction, as previously investigated with isothermal titration calorimetry studies. The resulting product, Ca-PA, is hydrophobic and will eventually precipitate from water. Previous studies using AFM, light scattering, and small angle neutron scattering ("SANS") indicate that the addition of stoichiometric amounts of $Ca^{2+}$ to dilute solutions of Na-PA in 10 mM NaCl induces a coil collapse of the extended polyelectrolyte chains. In contrast, PAMPS was reported to resist $Ca^{2+}$ complex formation based on Na NMR measurements. Furthermore, because of the amide spacer between the sulfonate anion and polymer backbone, the sulfonate group gains more mobility and conformational freedom, reducing charge density along the chain and providing higher stability in divalent salts solutions. Considering the multiple PAA anchoring groups on each polymer chain, it is not unreasonable to conclude that the unreacted carboxylate groups on the IO NP surface complexes strongly with $Ca^{2+}$, thus the observed reduction of electrophoretic mobility in combined NaCl and $CaCl_2$ salts.

TABLE 17

| Polymer coating | Medium | 1 mM | 10 mM |
|---|---|---|---|
| Poly(AMPS-co-AA) (3:1) | NaCl | −3.38 ± 0.05 | −3.14 ± 0.07 |
|  | NaCl + $CaCl_2$ | −2.26 ± 0.04 | −1.98 ± 0.07 |
| Poly(AMPS-co-AA) (5:1) | NaCl | −3.09 ± 0.07 | −2.62 ± 0.27 |
|  | NaCl + $CaCl_2$ | −2.24 ± 0.05 | −1.82 ± 0.14 |

Since unreacted carboxylate groups on the IO NP surface complexes strongly with $Ca^{2+}$, poly(AMPS-co-AA) coatings designed in accordance with aspects of the present invention have a lower AA fraction than commercially available poly(AMPS-co-AA). However, the ionic strength still has a large effect on the mobility of the copolymer coatings. Generally, at low salinities, the conformation of polymeric brush is determined by the osmotic pressure, excluded volume interaction, and long-range electrostatic interaction, which in many ways is analogous to pure polyelectrolytes. The mobile counterions in the highly charged polyelectrolyte layer will swell the brush by their osmotic pressure. When the salinities in solution exceed the concentration of counterions in the polymer brush, the "salted brush regime" is observed. The scaling laws of brush thickness in this regime are similar to those of uncharged polymeric brushes. The contraction of brush thickness upon adding electrolytes was observed with DLS in various systems, including polymethacrylic acid grafted polystyrene-poly(butyl acrylate) NPs, and PAA grafted polystyrene particle. As seen from FIG. 34, the electrophoretic mobility for poly(AMPS-co-AA) 3:1 and 5:1 grafted IO NPs is still negative even at high ionic strength of 0.5 M in combined $Na^+$ and $Ca^{2+}$ electrolytes, comparable to the mobilities of PMAA grafted latex NPs in 0.5 M $Na^+$ only brine. Despite the presence of divalent ions, the high fraction of AMPS, which binds to $Ca^{2+}$ weakly, helps to maintain a significant amount of negative charge and thus negative mobility even at extremely high salinity.

Figure 35:
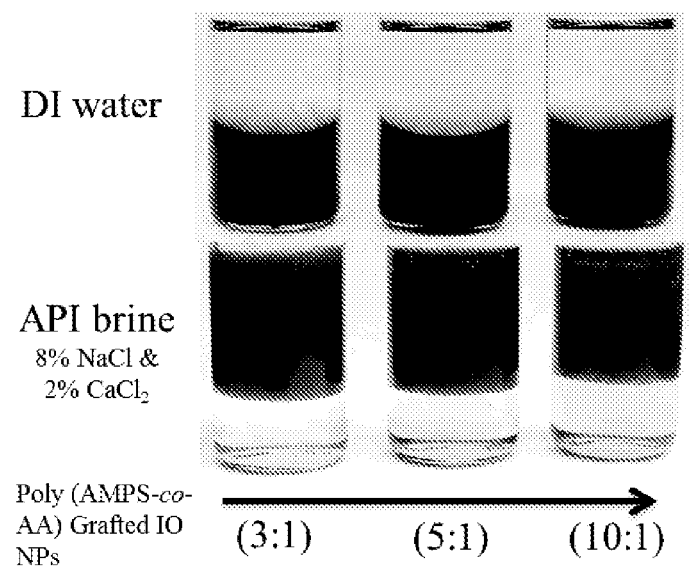
FIG. 35 shows digital images of the emulsions of poly(AMPS-co-AA) grafted IO NPs in DI water and dodecane (top row), and standard API brine and dodecane (bottom row) with 1:1 volume ratio and after 24 hours at room temperature.
Figure 36:
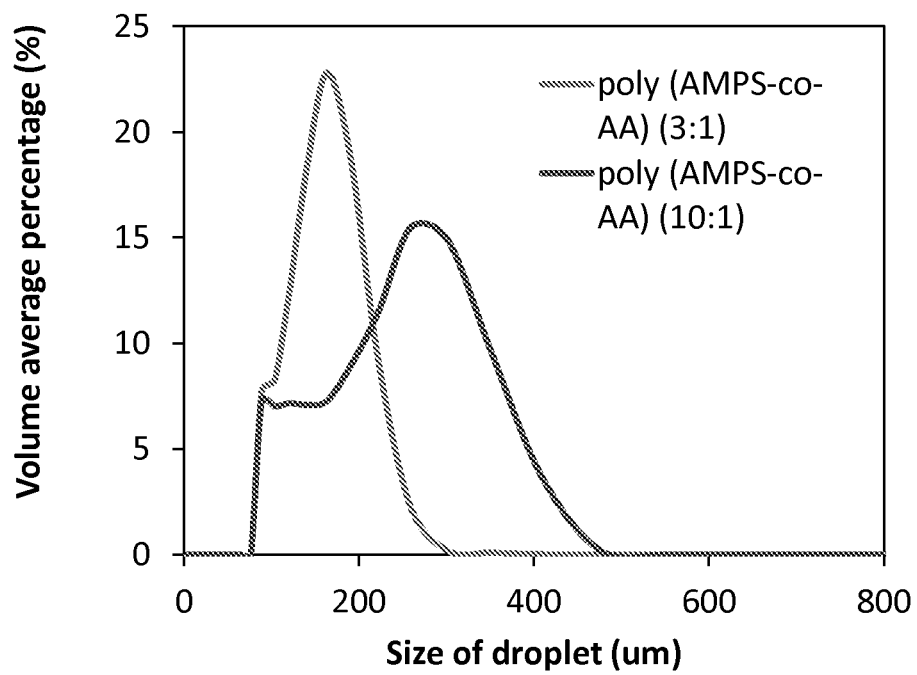
FIG. 36 is a plot of the droplet size distribution of poly(AMPS-co-AA) stabilized emulsions of 1:1 standard API brine and dodecane after 24 hours.

Interfacial activity of poly(AMPS-co-AA) grafted IO NPs. In addition to polymer conformation, the phase behavior and the activity of the poly(AMPS-co-AA) grafted IO NPs at the oil/water interface can provide valuable information about the colloidal interactions between the NPs and various surfaces/interfaces. In order to study this behavior, emulsions of aqueous dispersions of poly(AMPS-co-AA) grafted IO in DI water and dodecane were prepared using a 1:1 volume ratio. As seen in FIG. 35, after homogenization, the droplets break up within several minutes due to rapid creaming and coalescence. FIG. 35 shows digital images of the emulsions of poly(AMPS-co-AA) grafted IO NPs in DI water and dodecane (top row), and standard API brine and dodecane (bottom row) with 1:1 volume ratio and after 24 hours at room temperature. Similarly, after 24 hours, the poly(AMPS-co-AA)-coated IO NPs remained in the aqueous phase, demonstrating the highly hydrophilic nature of poly(AMPS-co-AA)-grafted IO NPs. However, when aqueous brine (e.g., standard API brine) dispersions of these IO NPs were homogenized with dodecane under the same conditions, stable oil in water (o/w) emulsions were formed with droplet sizes of ~200 μm after 24 hours at room temperature (see FIG. 36).

Nanoparticles can be irreversibly adsorbed at liquid interfaces and stabilizes emulsions of oil and water, or foams of air and water. The formation and stabilization of the so-called "Pickering emulsions" depend crucially on the hydrophobicity of the particles at interfaces. Silica nanoparticles with tuned hydrophobicity by controlling the coverage of surface silanol groups were shown to stabilize air/water foams, $CO_2$/water foams and oil/water emulsions. For relatively hydrophilic silica nanoparticles, only aqueous dispersions were formed. Considering the highly charged polymer coating in DI water as demonstrated by the $-3.55 \times 10^{-8}$ $m^2/(V\,s)$ electrophoretic mobility (see FIG. 34 and Table 17) and highly hydrophilic nature of AMPS, it may be expected that the IO NPs favor water with limited interfacial activity. As these IO NPs become less charged and less hydrophilic in standard API brine (see FIG. 34), they become more interfacial active upon increasing salinity, as seen in other systems.

Adsorption of poly(AMPS-co-AA)-grafted IO NPs on silica: The batch adsorption technique allowed for rapid, high throughput measurement of equilibrium NP adsorption. As indicated in Table 18, the batch adsorption of IO NPs on 8 μm clean silica microspheres (specific surface area of 0.5825 $m^2$/g as measured by BET via $N_2$ adsorption) in standard API brine was visually observed and quantified based on the concentration difference of IO NP dispersions before and after adsorption equilibrium using UV-vis spectroscopy.

TABLE 18[a]

| Polymer coating | Initial IO conc. (mg/ml) | % IO adsorbed[a] | Final eq. IO conc. (mg/ml) | Specific adsorption (mg-IO/$m^2$)[b] | % mono-layer |
|---|---|---|---|---|---|
| Poly(AMPS-co-AA) (1:1) | 0.5 | 72.64 | 0.136 | 1.25 ± 0.06 | 0.223 |
|  | 1 | 55.63 | 0.444 | 1.91 ± 0.13 | 0.342 |
|  | 2 | 41.11 | 1.178 | 2.82 ± 0.17 | 0.505 |
| Poly(AMPS-co-AA) (3:1) | 0.03 | 50.61 | 0.015 | 0.05 ± 0.001 | 0.013 |
|  | 0.1 | 27.62 | 0.07 | 0.09 ± 0.002 | 0.024 |
|  | 1 | 7.10 | 0.93 | 0.24 ± 0.013 | 0.063 |

TABLE 18$^a$-continued

| Polymer coating | Initial IO conc. (mg/ml) | % IO adsorbed$^a$ | Final eq. IO conc. (mg/ml) | Specific adsorption (mg-IO/m$^2$)$^b$ | % mono-layer |
|---|---|---|---|---|---|
| Poly(AMPS-co-AA) (10:1) | 0.03 | 45.87 | 0.016 | 0.05 ± 0.001 | 0.015 |
|  | 0.1 | 16.19 | 0.08 | 0.06 ± 0.002 | 0.018 |
|  | 1 | 5.77 | 0.94 | 0.20 ± 0.013 | 0.063 |
| Poly(AMPS-co-AA) (20:1) | 0.1 | 20.08 | 0.08 | 0.07 ± 0.04 | 0.026 |
|  | 0.5 | 10.06 | 0.45 | 0.17 ± 0.11 | 0.065 |

$^a$Specific surface area of silica adsorbent was determined to be 0.5825 m$^2$/g by BET.
$^b$Uncertainty of the specific adsorption is based on error propagation analysis.

Adsorption of these IO NPs follows Langmuir adsorption isotherm behavior. As the composition ratio of poly(AMPS-co-AA) copolymer coating increases from 1:1 to 3:1, both the specific adsorption and percent monolayer coverage decreased dramatically by one order of magnitude, reflecting the increase in the AMPS stabilizer group (see Table 18). A further enhancement of the AMPS:AA ratio up to 20:1 did not further lower adsorption relative to the 3:1 ratio. There are few reports of such low adsorption values of IO NPs in dispersions consisting of both high ionic strengths (2.04 M) and divalent ion concentration (180 mM Ca$^{2+}$). The low adsorption of poly(AMPS-co-AA)-grafted IO NPs is likely due to the negatively charged, extended, and well-solvated polymer chains on the NP surfaces that provide sufficient electrosteric repulsion to overcome the attractive forces between IO NPs and silica microspheres.

It remains unknown why the copolymers with the highest AMPS fractions did not reduce the adsorption relative to the 3:1 sample. Mechanistically, the adsorption of poly(AMPS-co-AA)-grafted IO NPs in standard API brine is due to: (i) screening of surface charge thus reducing electrostatic repulsion, (ii) promoting hydrophobicity of poly(AMPS-co-AA)-grafted IO NPs and silica adsorbent, as suggested by the aforementioned increased interfacial activity of IO NPs in standard API brine (see FIG. 35), and previously reported contact angle measurements and emulsion studies on silica particles, and (iii) the presence of Ca$^{2+}$ ions may bridge the negatively charged polymer coatings of IO NPs and silica anions by electrostatic attraction or complex formation. The additional non-DLVO forces such as hydrophobic interaction and the Ca$^{2+}$ bridging may likely play important roles in contributing to the adsorption of the poly(AMPS-co-AA)-grafted IO NPs to the silica microspheres in standard API brine. Similarly, the effect of calcium on increased adsorption of partially hydrolysed polyacrylamide ("HPAM") on siliceous mineral surfaces has been documented and was attributed to (i) screening of electrostatic repulsion, (ii) specific binding to polymer in solution decreasing the polymer charge and its affinity to solvent, and (iii) fixation of Ca$^{2+}$ on the mineral surface serving as a bridge between the dissociated silanols and polymer.

In summary, a series of poly(AMPS-co-AA) polymers with varying AMPS:AA ratios ranging from 1:1 to 20:1 were successfully "grafted to" amine-functionalized IO NPs. Permanent grafting was confirmed by a polymer desorption test that indicated a similar organic content before and after the polymer desorption test. Interestingly, all of the poly(AMPS-co-AA)-grafted IO NPs in this series form stable dispersions in standard API brine, which was a result of a sufficient number of anchor and stabilizer groups. It can be concluded that a high fraction of stabilizer AMPS (3:1 or greater) ensures good colloidal stability in high salinity brine, while even a relatively small number of AA anchoring groups (ratio up to 20:1) is sufficient for permanent grafting of polymer chains to the IO NP surfaces. The colloidal stability in standard API brine makes such particles suitable to withstand harsh hydrocarbon reservoir conditions. Similarly, the DLS data indicated bridging of multiple IO NP cores was minimized by decreasing the fraction of AA anchoring group on the poly(AMPS-co-AA). Based on DLS and electrophoretic mobility tests, it was determined that the poly(AMPS-co-AA)-grafted IO NPs remained negatively charged and extended in standard API brine, leading to colloidal stability and low adsorption on silica, which facilitated transport through standard API brine saturated columns. Although a large decrease in retention and lower specific adsorption was seen varying the AMPS to AA ratio from 1:1 to 3:1, a further increase of AMPS fraction did not reduce specific adsorption. This plateau in adsorption may be due to the high concentration of Ca$^{2+}$ ions in standard API brine that bridge anions on the IO NPs to the anionic silica surface and the increased hydrophobicity of poly(AMPS-co-AA)-grafted IO NPs in standard API brine.

Aspects of the present invention as hereinafter disclosed provide for low adsorption of iron oxide nanoparticles using an acid catalyzed heat driven amidation technique, improving mobility in porous media (e.g., subsurface geological environments).

Grafting of poly(AMPS-co-AA) copolymers onto IO NPs via EDC catalyzed amidation reaction and adsorption test: As previously disclosed, in an EDC catalyzed grafting of poly(AMPS-co-AA) to amine-functionalized IO NPs, the carboxylate anchoring groups on the copolymers were activated using EDC. The amine-functionalized IO NPs were then added so that the carboxylate groups on the polymer could react with the amine groups on the IO NP surfaces and form amide bonds. To increase polymer uptake, sodium chloride ("NaCl") was added to the solution to screen the electrostatic repulsion. The simplicity of the grafting reaction on pre-synthesized amine functionalized IO NPs allowed for high throughput and rapid screening of the different polymeric coatings procedures. However, as previously disclosed, despite varying reaction conditions, i.e., NaCl, poly(AMPS-co-AA), and amine-functionalized IO NPs concentrations, only negligible changes in batch adsorption tests using silica microspheres was evident.

Referring to Table 19, in addition to varying the NaCl, poly(AMPS-co-AA), and APTES IO NPs concentrations, the amount of EDC (5× or ⅕×) was also varied in order to tune the amount of grafted polymer stabilizer.

TABLE 19

|  | 1× EDC | 5× EDC | ⅕× EDC |
|---|---|---|---|
| % Organic Content | 15 | 17 | 11 |

Figure 37:
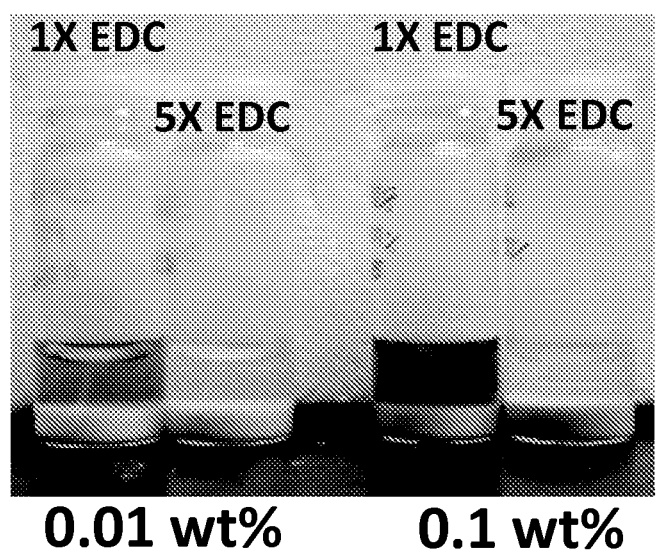
FIG. 37 shows digital images of the batch adsorption of poly(AMPS-co-AA) grafted IO NPs at 0.01 and 0.1% wt. initial concentrations on silica in standard API brine at room temperature with 1 and 5 equivalents 1-ethyl-3-(3-dimethylaminopropyl)carbodiimide ("EDC").

For example, thermogravimetric analysis ("TGA") data showed by increasing the amount of EDC (by 5×) the organic content slightly increased from 15% to 17% and remained stable in API at 90° C., while for the ⅕×EDC, the organic content decreased to 11%, and precipitated in standard API brine at room temperature. Referring to FIG. 37, Based on these results, batch adsorption tests were performed on the 5×EDC sample. FIG. 37 shows a digital image showing the batch adsorption of poly(AMPS-co-AA) grafted IO NPs at 0.01% and 0.1% wt. initial concentrations on silica in standard API brine at room temperature with 1× and 5× equivalents EDC. After the adsorption test it was visually evident that the 5× EDC sample had nearly complete adsorption, while the 1×EDC remained unchanged. Therefore, even though the 5×EDC sample had slightly more polymeric stabilizer, it performed more poorly, indicating that EDC molecules left on the particles markedly increased adsorption. This increase may be attributed to positively charged protonated EDC as explained above.

Figure 38:
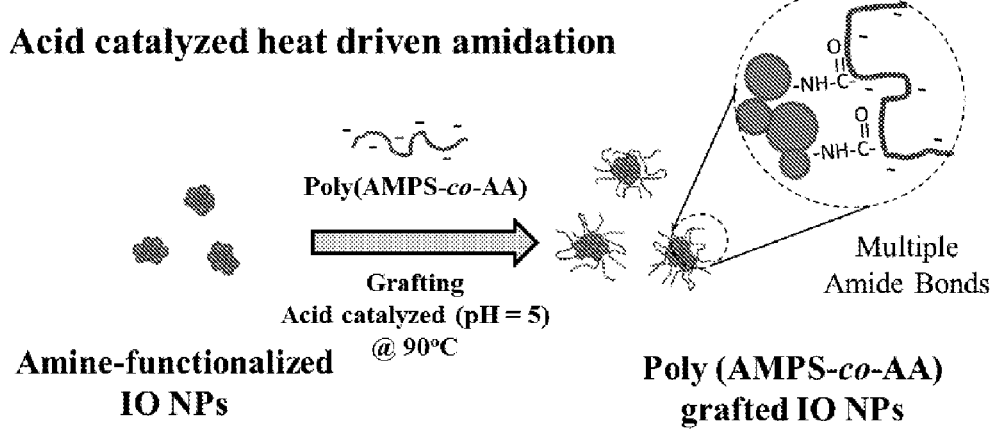
FIG. 38 shows a schematic of grafting poly(AMPS-co-AA) onto amine-functionalized IO NPs via heat-driven amidation.
Figure 39:
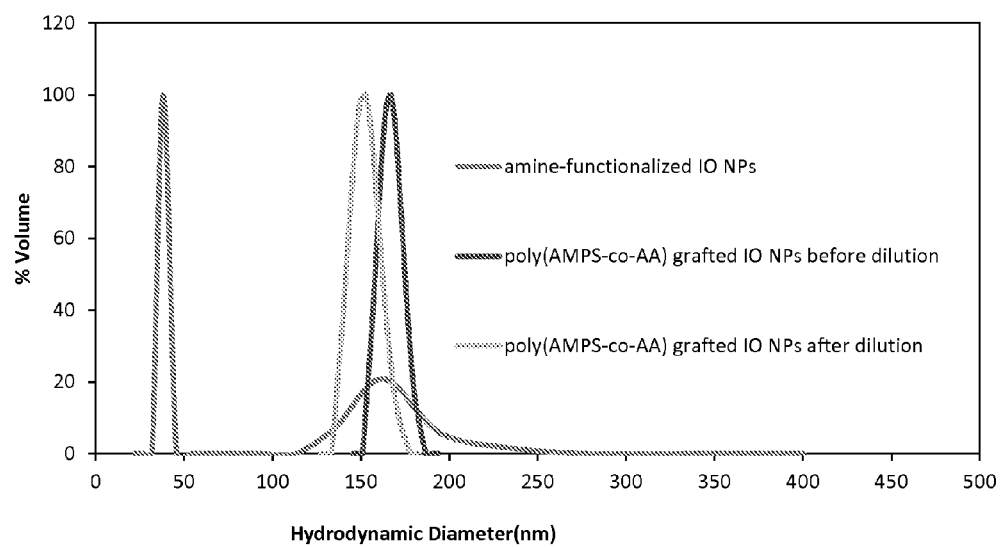
FIG. 39 is a plot of the volume-averaged hydrodynamic diameter distribution of amine-functionalized IO NPs, and poly(AMPS-co-AA)-grafted IO NPs before and after a polymer desorption test.

Acid catalyzed heat driven grafting of poly(AMPS-co-AA) copolymers onto IO NPs: Based on these results, amidation reactions were performed using only heat to drive the reaction, as shown with the schematic in FIG. 38. Poly(AMPS-co-AA) (70 mg/mL), amine-functionalized IO NPs (14 mg/mL), and NaCl (final salinity of 3%) were dissolved in DI water and 2.5 N NaOH to reach a pH of 4-5. The solution was then degassed for 45 minutes followed by heating at 90° C. for 72 hours. Afterwards, the polymer-coated IO NPs were separated by centrifugation at 12,000 g and washed with DI water twice to remove excess reactants. The washed IO NPs were then dispersed in DI water with probe sonication at ~2% w/v IO, followed by centrifugation at 4000 rpm for 10 minutes to remove large clusters. Referring to FIG. 39 and Table 20, the successful grafting of the poly(AMPS-co-AA) was demonstrated using TGA, which shows an increase of organic content from 8% to 14% is evident. FIG. 39 is a plot of the volume-averaged hydrodynamic diameter distribution of amine-functionalized IO NPs, and poly(AMPS-co-AA) grafted IO NPs before and after a polymer desorption test. Similarly, an inversion of zeta potential from positive (surface amine groups) to negative (negatively charged polyelectrolyte) was also evident, as indicated in Table 20.

TABLE 20

|  | Hydrodynamic diameter (nm) | Zeta Potential (mV) | % organics by TGA |
|---|---|---|---|
| Amine-functionalized IO NPs | 38 ± 8 | +34 | 5 |
| poly(AMPS-co-AA)-grafted IO NPs before desorption test | 167 ± 7 | −42 | 14 |
| poly(AMPS-co-AA)-grafted IO NPs after desorption test | 156 ± 4 | −39 | 11 |

However, it is possible that during this "grafting to" process that the negatively charged polymer chains may also adsorb to positively charged amine-functionalized IO NPs via electrostatic attraction. To confirm the successful grafting of poly(AMPS-co-AA) to the IO NP surface, the poly (AMPS-co-AA) was subjected to a dilution test (final concentration=0.01% w/v IO) in 1 M NaCl followed by TGA analysis, dynamic light scattering ("DLS"), and an standard API brine stability test. As seen in Table 20, the total organic content for both the before and after the desorption test cases remained similar, indicating negligible loss of the poly (AMPS-co-AA). In addition to TGA analyses, the hydrodynamic sizes (as indicated in Table 20 and FIG. 39) of the poly(AMPS-co-AA)-grafted IO NPs in standard API brine was also well maintained, indicating a sufficient amount of polymeric stabilizer.

Figure 40:
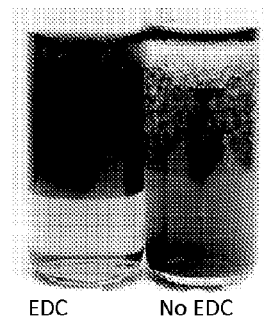
FIG. 40 shows a digital image of 1:1 $H_2O$:dodecane using poly(AMPS-co-AA) coated IO NPs grafted using EDC at room temperature ("RT") or by acid catalyzed heat with heat.

Interfacial activity of poly (AMPS-co-AA) grafted IO NPs: The phase behavior and the activity of the poly(AMPS-co-AA) grafted IO NPs at an oil/water interface can also provide valuable information about colloidal interactions between the NPs and various surfaces/interfaces. Therefore, an emulsion test was performed using synthetic seawater to see what effect residual EDC plays on hydrophobicity. Emulsions of aqueous dispersions of poly(AMPS-co-AA)-grafted IO in synthetic seawater and dodecane were prepared using a 1:1 volume ratio. As seen in FIG. 40, in the cases were EDC was used, a stable emulsion was made that only released a relatively small amount of IO NPs to the bottom water layer.

FIG. 40 shows a digital image of 1:1 H$_2$O:dodecane using poly(AMPS-co-AA) coated IO NPs grafted using EDC at room temperature or by acid catalyzed heat with heat. In the heat driven reaction however, a relatively poor emulsion was made were a majority of the coated IO NPs remained in the aqueous layer. This data suggest that the heat driven poly (AMPS-co-AA)-coated IO NPs demonstrate a more hydrophilic nature than compared to the EDC driven amidation reactions. One possible explanation is that positive charges associated with EDC lower the magnitude of the negative charge on the NPs, which would make them less hydrophilic in brine, as observed. The zeta potential for the EDC catalyzed poly(AMPS-co-AA) grafted IO is −37 mV, while it is −42 mV for heat driven poly(AMPS-co-AA) grafted IO NPs, as shown in Table 20.

Adsorption of poly(AMPS-co-AA)-grafted IO NPs on silica: Referring to FIGS. 41a-41d and Table 21, the batch adsorption of IO NPs was performed at room temperature ("RT") on 8 μm clean silica microspheres in standard API brine, and was visually observed and quantified based on the concentration difference of IO NP dispersions before and after overnight equilibration at pH 8 using UV-vis spectroscopy.

TABLE 21[a]

| Sample ID | Initial IO conc. (% w/v) | % IO adsorbed[a] | Final eq. IO conc. (% w/v) | Specific adsorption (mg-IO/m$^2$)[b] | % monolayer |
|---|---|---|---|---|---|
| Poly(AMPS-co-AA) heat grafted IO NPs at RT (Trial 1) | 0.003 | 2.98 | 0.00291 | 0.003 ± 0.002 | 0.001 |
|  | 0.01 | 3.53 | 0.00964 | 0.012 ± 0.016 | 0.003 |
|  | 0.1 | 0.62 | 0.0994 | 0.021 ± 0.028 | 0.005 |
|  | 0.5 | 0.50 | 0.497 | 0.086 ± 0.139 | 0.020 |
|  | 1.0 | 0.27 | 0.997 | 0.092 ± 0.279 | 0.021 |
| Poly(AMPS-co-AA) heat grafted IO NPs at RT (Trial 2) | 0.003 | 14.43 | 0.00257 | 0.015 ± 0.002 | 0.003 |
|  | 0.01 | 5.12 | 0.00948 | 0.018 ± 0.024 | 0.004 |
|  | 0.1 | 1.05 | 0.0989 | 0.036 ± 0.040 | 0.008 |
|  | 0.5 | 0.67 | 0.497 | 0.115 ± 0.191 | 0.027 |
|  | 1.0 | 0.39 | 0.996 | 0.133 ± 0.381 | 0.031 |
| Poly(AMPS-co-AA) heat grafted IO NPs and EDC at RT | 0.003 | 100 | 0 | >0.10 ± 0.02 | >0.024 |
|  | 0.01 | 100 | 0 | >0.34 ± 0.03 | >0.080 |
|  | 0.1 | 100 | 0 | >3.43 ± 0.20 | >0.795 |
| Poly(AMPS-co-AA) EDC grafted IO NPs | 0.003 | 50.61 | 0.015 | 0.05 ± 0.001 | 0.013 |
|  | 0.01 | 27.62 | 0.07 | 0.09 ± 0.002 | 0.024 |
|  | 0.1 | 7.10 | 0.93 | 0.24 ± 0.013 | 0.063 |

[a]Specific surface area of silica adsorbent was determined to be 0.5825 m$^2$/g by BET via N$_2$ adsorption.
[b]Uncertainty of the specific adsorption is based on error propagation analysis.

Figures 41A, 41B, 41C, 41D, 41E:
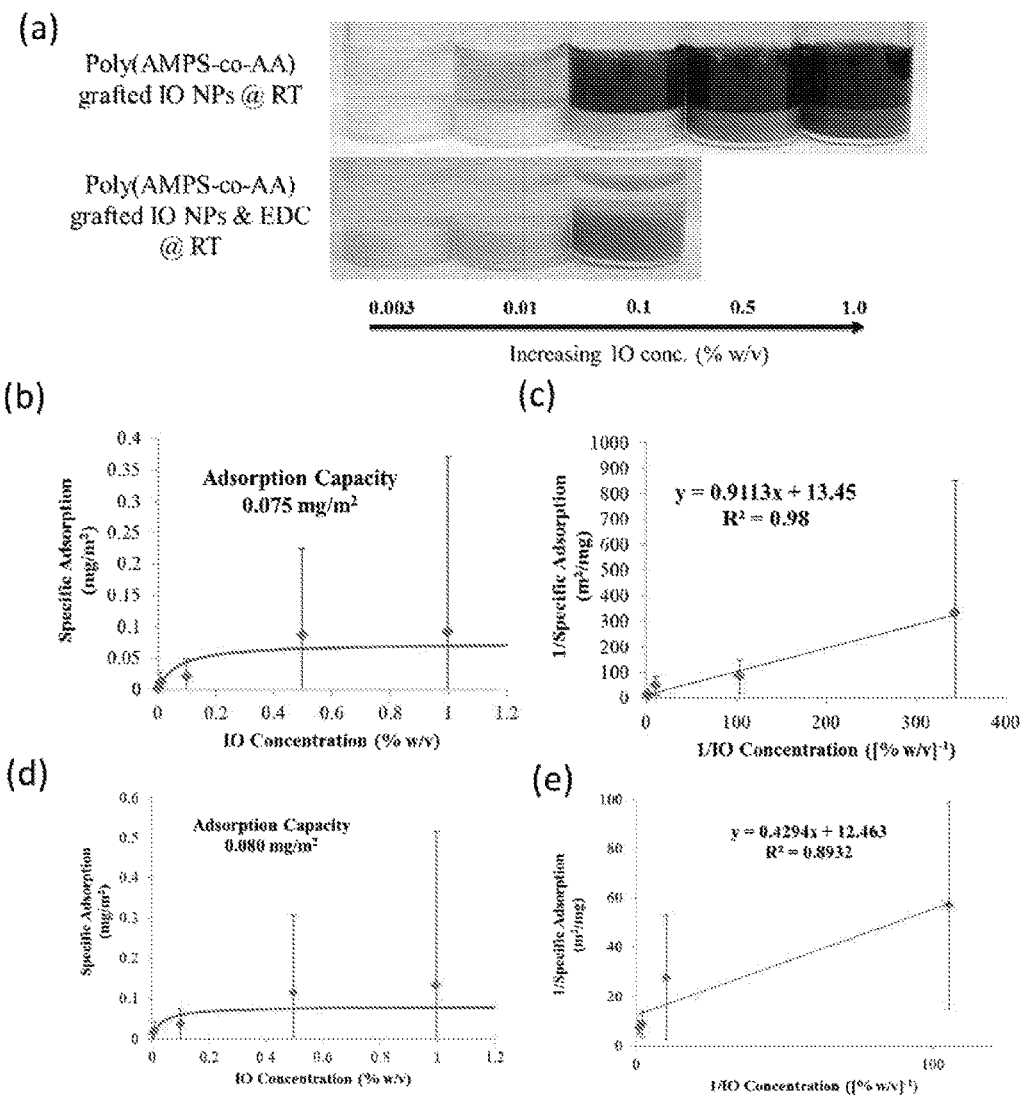
FIG. 41a shows digital images of batch adsorption of poly(AMPS-co-AA) grafted IO NPs on silica in standard API brine at room temperature (top row) and poly(AMPS-co-AA) grafted IO NPs with post addition of EDC on silica (bottom row).
FIGS. 41b and 41d are plots of a Langmuir fit of adsorption of poly(AMPS-co-AA) grafted IO NPs on silica in standard API brine at room temperature.
FIGS. 41c and 41e are plots of linearized Langmuir isotherm regression of IO adsorption in inverse IO concentration and specific adsorption units relative to FIGS. 41b and 41d, respectively.

FIG. 41a shows digital images of batch adsorption of poly(AMPS-co-AA) grafted IO NPs on silica in standard API brine at room temperature (top row) and poly(AMPS-co-AA) grafted IO NPs with post addition of EDC on silica (bottom row). As seen from the top row in FIG. 41a, the settled silica microspheres remained relatively white in the case of the acid catalyzed (no EDC) based grafting reaction (poly(AMPS-co-AA) grafted IO NPs at RT). Similarly, the resulting aqueous solution remains yellow and brown in the ≤0.01 and ≥0.1% w/v respectively, demonstrating low adsorption of the IO NPs to the silica microspheres. In addition to the poly(AMPS-co-AA) grafted IO NPs at RT adsorption test, a similar test was performed using the acid catalyzed amidation reaction at 90° C., but trace amounts of EDC (poly(AMPS-co-AA) grafted IO NPs and EDC at RT) were added prior to performing the silica microsphere adsorption test. Referring to the bottom row in FIG. 41a, in this case, a drastic loss in coloration of the resulting aqueous solution is evident, which can be attributed to relativity high adsorption of the IO NPs in this case, especially when compared to a system not subject to any EDC.

Referring to Table 21, in addition to visual observations, quantitative data was obtained using two separate acid catalyzed heat driven amidation grafting reactions (identified as Trials 1 and 2 in Table 21) to display reproducibility.

As seen in Table 21, at the highest IO concentration (1% w/v), the specific adsorption of the poly(AMPS-co-AA) grafted IO NPs at RT (no EDC) was found to be 0.092 (Trial 1) and 0.133 (Trial 2) mg-IO/m$^2$, which corresponds to very low NP monolayer coverages of 0.021% and 0.031%, respectively. In addition to this low adsorption, the similar values for both Trials 1 and 2 demonstrate the reproducibility. In contrast, when residual EDC was added at a level of mass ratio EDC:IO=1, the IO NP sample resulted in 100% adsorption in standard API brine at all concentrations up to 0.1%. Additionally, the specific adsorption of EDC catalyzed poly(AMPS-co-AA) grafted IO NPs were also listed for comparison. Clearly, the specific adsorption of heat driven poly(AMPS-co-AA) grafted IO NPs shows ~1 order of magnitude decrease when compared to the EDC catalyzed amidation reaction.

FIGS. 41b and 41d are plots of a Langmuir fit of adsorption of poly(AMPS-co-AA) grafted IO NPs on silica in standard API brine at room temperature for Trials 1 and 2, respectively. The adsorption isotherms displayed in FIGS. 41b and 41d exhibited Langmuir isotherm behavior. The specific adsorption increases with equilibrium concentration and then plateaus at higher concentrations. A linearized Langmuir isotherm regression of IO adsorption in inverse IO concentration and specific adsorption units (see FIGS. 41c and 41e, corresponding to FIGS. 41b and 41d, respectively) resulted in reasonable correlation coefficients ($R^2$=0.98 and 0.89) where the slopes (0.9113 and 0.4294×10$^7$ m$^{-1}$) and intercepts (13.45 and 12.463 m$^2$/mg-IO) are expressed as shown in Equations 6 and 7.

$$m = \left(\frac{k_{des}}{k_{ads}}\right)\left(\frac{\rho_a}{A_c}\right)M_p \quad \text{(Equation 6)}$$

$$b = \frac{\rho_a}{A_c} \quad \text{(Equation 7)}$$

In the above equations, $k_{des}/k_{ads}$ is the ratio of the rate of desorption to the rate of adsorption (m$^{-3}$), $M_p$ is the mass of one NP (g), $A_c$ is the adsorption capacity on the collector surface (g IO/g silica), and $\rho_a$ is the specific surface area of silica (m$^2$/(g silica)). Using the specific surface area of the silica, $A_c$ can be converted to (mg IO)/(m$^2$ silica). The specific adsorption capacity $A_c$ can then be calculated (see FIGS. 41c and 41e). Interestingly, for both Trials 1 and 2, similar values for the slope, intercepts, and subsequent specific adsorptions were obtained, displaying reproducibility of the system. The adsorption capacity of heat driven poly(AMPS-co-AA) grafted IO NPs is calculated to be ~0.08 mg/m$^2$-silica based on this method, while it was reported to be 0.9 mg/m$^2$-silica for the EDC catalyzed poly(AMPS-co-AA) grafted IO NPs. Clearly, ~1 order of magnitude decrease of adsorption capacity in batch reactor test is obtained by eliminating the use of EDC (see Table 21).

In summary, the poly(AMPS-co-AA) grafted IO NPs formed by acid-catalyzed heat driven amidation as previously disclosed show decreased retention capacity. Poly (AMPS-co-AA) 3:1 polymer was successfully grafted to an amine-functionalized IO NPs via acid catalyzed heat driven amidation, without the use of an EDC catalyzed reaction. Grafting was confirmed using a polymer desorption test that indicated similar organic contents, hydrodynamic sizes, and colloidal stabilities in standard API brine both before and after the polymer desorption test. The colloidal stability in standard API brine indicates that such particles will withstand harsh hydrocarbon reservoir conditions. In addition to similar stability to that of poly(AMPS-co-AA) IO NPs fabricated using EDC, the use of heat to coat the IO NPs displayed remarkably lower (one order of magnitude) specific adsorption and monolayer formation on silica microspheres, as well as a lower degree of hydrophobicity as demonstrated by emulsion tests.

Ultra-low adsorption on silica microspheres of iron oxide nanoparticles stabilized by poly(2-acrylamido-2-methyl-1-propanesulfonic acid) grafted via a "grafting through" technique: Utilized was a "grafting through" technique to covalently tether PAMPS to the surfaces of IO NPs. Vinyl groups were covalently attached to the amine-functionalized IO NPs, followed by performing free radical polymerization of AMPS monomers in the presence of the vinyl-coated IO NPs. The mechanism of the "grafting through" technique allows for propagating polymers (e.g., PAMPS) to graft to the vinyl groups on the surfaces of the particles. This was done so that the amount of polymer could effectively be controlled in order to study the adsorption versus polymer content. It was found that ultra-low adsorption using a previously disclosed batch adsorption test could be achieved.

Figures 42A, 42B:
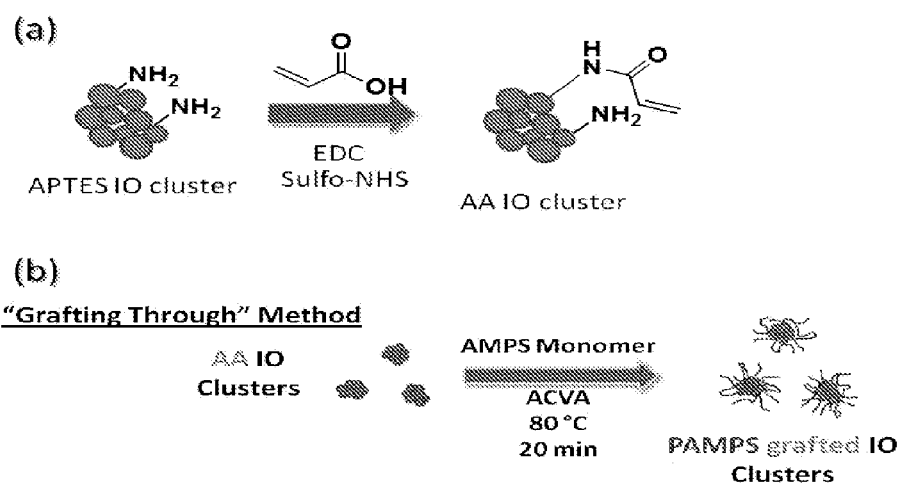
FIG. 42a shows a schematic of the grafting of acrylic acid to an amine-functionalized ("APTES IO") cluster.
FIG. 42b shows a schematic of the grafting of PAMPS via a "grafting through" method using free radical polymerization.

Grafting of acrylic acid to amine-functionalized IO NP ("AA IO NP"): FIG. 42a shows a schematic of the grafting of acrylic acid to amine-functionalized APTES IO cluster. 100 mg (1.39 mmol) acrylic acid was added to 10 ml DI water, and the solution was adjusted to pH≈5.5. While maintaining the pH at 5.5, 1.2 equivalent of EDC (1.67 mmol) and sulfo-NHS (1.67 mmol) were added, and the mixture was allowed to react for 20 minutes. Afterwards, a solution of IO NPs containing 250 mg was added drop wise to the activated acrylic acid. Once all the IO NPs were added, the pH was adjusted to 7.5 to 8 and was allowed to stir at room temperature for 16 hours. Once the reaction was done, the IO was purified via a centrifuge. The final AA IO NP was diluted with DI water and probe sonicated for 1 min/ml.

"Grafting through" of PAMPS onto AA IO NP: FIG. 42b shows a schematic of the grafting of PAMPS via the "grafting through" method using free radical polymerization. Either 2.5, 5, 8, or 10 g of AMPS monomer was added to a 15 ml of 2.5 N NaOH solutions and the pH of the solution was adjusted to 9 to 10 (the amount of additional base added varied depending on initial AMPS monomer amount). Afterwards, the solution was sealed in a round bottom flask and was degassed with $N_2$ for 30 minutes. In a separate flask, 125 mg of AA IO NP was added and depending on the concentration, varying amounts of water was added so that the total volume of the final combined reaction solution (AMPS+IO solutions) was 25 ml. This solution was then sealed and purged with $N_2$ for 30 minutes. In a third flask was added 13 mg of 4,4'-Azobis(4-cyanovaleric acid) along with a stir bar and was also purged with $N_2$ for 30 minutes. Once all the flasks were properly purged, both the AMPS and AA IO NP solutions were added to the 4,4'-Azobis(4-cyanovaleric acid) containing flask via cannula and the mixture was stirred at 80° C. for 20 minutes. After polymerization was finished, the composite was removed and divided into 6 separate 50 ml centrifuge tubes and filled with 35 ml of DI water. The mixtures were then homogenized using an IKA Ultra-Turrax T-25 Basic with an 8 mm head operating at 13,500 rpm for 2 minutes. This homogenized solution was then centrifuged at 11,000 rpm for 10 minutes. Afterwards the supernatant (containing free polymer) was either kept for characterization or disposed of. The grafted PAMPS to the AA IO NPs ("AMPS IO NP") was then suspended in 35 ml of DI water and the above procedure was repeated (4 times).

Grafting of acrylic acid to amine-functionalized IO NP (AA IO NP) and "grafting through": The grafting of AA followed by the grafting of PAMPS can be seen in FIGS. 42a and 42b. FIG. 42a is a diagram of the grafting of acrylic acid to amine-functionalized (APTES IO cluster). FIG. 42b is a diagram of the grafting of PAMPS via the "grafting through" method using free radical polymerization.

Figures 43A, 43B, 43C:
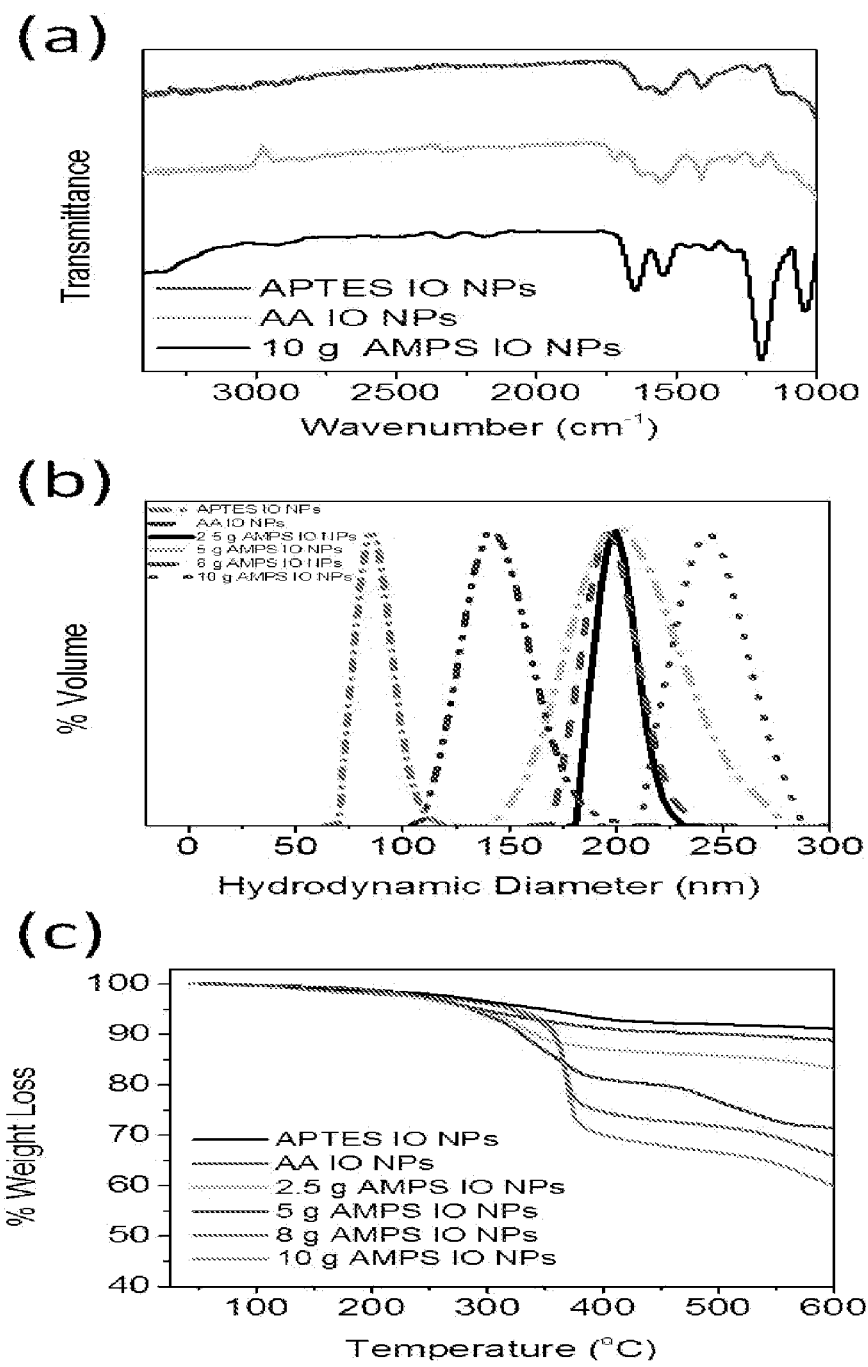
FIG. 43a is an image of an attenuated total reflectance-infrared ("ATR-IR") spectra of the various stages of IO NP development and using different monomer feed ratios during polymerization.
FIG. 43b is an image of DLS curves of the various stages of IO NP development and using different monomer feed ratios during polymerization.
FIG. 43c is an image of TGA curves of the various stages of IO NP development and using different monomer feed ratios during polymerization.

Referring to FIGS. 43a-43c, the AA and AMPS coated IO NP were characterized using ATR-IR (see FIG. 43a), DLS (see FIG. 43b), and TGA (see FIG. 43c). FIG. 43a shows the ATR-IR spectra, FIG. 43b shows the DLS curves, and FIG. 43c shows the TGA curves of the various stages of IO NP development and using different monomer feed ratios during polymerization. As shown in the ATR-IR spectra of FIG. 43a, all functional groups expected to be seen are evident. The DLS curves in FIG. 43b show that despite the monomer feed ratio (2.5 to 8 g), the same size AMPS IO NP is achieved. In the case of the 10 g, the larger size could be attributed to crosslinking of separate IO NP clusters. The TGA data in FIG. 43c shows by tuning the monomer feed ratio (2.5 to 10 g), there is control over the polymer content. Therefore, this technique allows for materials to be tested that have varying polymer content.

Batch adsorption of IO NPs: Referring to Table 22, a series of batch adsorption tests of IO NPs with different AMPS loading on silica was conducted at different feed IO concentrations of 0.03, 0.1, and 1 mg/mL in standard API brine. Table 22 shows the results of these tests of adsorption of poly("AMPS") grafted IO NPs on 8 μm silica microspheres in standard API brine at pH 8 at different IO concentrations. The specific adsorption of IO NPs on silica was calculated based on the concentration difference of the supernatant phase before and after adsorption equilibration. Clearly, the specific adsorption increased as the equilibrium concentration increased, as predicted by various theoretical adsorption isotherm models. Furthermore, as the AMPS loading on the IO NPs increased (from 2.5 g-8 g AMPS IO NPs), the specific adsorption decreased drastically by one order of magnitude. Further increase of AMPS loading did not decrease the specific adsorption and reached an adsorption plateau.

TABLE 22

| Polymer Coating | Initial IO conc. (mg/mL) | Final eq. IO conc. (mg/mL) | Specific adsorption (mg-IO/m$^2$) |
|---|---|---|---|
| 2.5 g AMPS IO NPs | 0.03 | 0.001 | 0.10 ± 0.02 |
| | 0.1 | 0.032 | 0.23 ± 0.02 |
| | 1 | 0.754 | 0.84 ± 0.06 |
| 5 g AMPS IO NPs | 0.03 | 0.021 | 0.03 ± 0.002 |
| | 0.1 | 0.044 | 0.04 ± 0.003 |
| | 1 | 0.479 | 0.14 ± 0.02 |
| 8 g AMPS IO NPs | 0.03 | 0.027 | 0.01 ± 0.01 |
| | 0.1 | 0.098 | 0.03 ± 0.01 |
| | 1 | 0.991 | 0.04 ± 0.04 |
| 10 g AMPS IO NPs | 0.03 | 0.027 | 0.01 ± 0.01 |
| | 0.1 | 0.094 | 0.02 ± 0.01 |
| | 1 | 0.993 | 0.02 ± 0.02 |

Referring to Table 23, to further study the effect of the presence of clays which have positively charged edges, crushed Berea sandstone was further employed as the adsorbent in batch adsorption tests. Table 23 shows the results of these tests of adsorption of poly("AMPS") grafted IO NPs on crushed Berea in standard API brine at pH 8 at different IO concentrations. Similar to the test results in Table 22, increasing concentration led to higher specific adsorption. Further, it was demonstrated that increasing AMPS ratio was also effective in decreasing adsorption by 75% even when ~12% clays are present. In general, the interaction between NPs and adsorbent was governed by van der Waals attraction and electrosteric repulsion. High AMPS loading was expected to give higher electrosteric repulsion forces, thus decreasing the adsorption.

TABLE 23

| Polymer Coating | Initial IO conc. (mg/mL) | Final eq. IO conc. (mg/mL) | Specific adsorption (mg-IO/g$^2$) |
|---|---|---|---|
| 2.5 g AMPS IO NPs | 0.1 | 0.005 | 4.77 ± 1.01 |
| | 1 | 0.891 | 5.42 ± 1.18 |
| 5 g AMPS IO NPs | 0.03 | 0.0002 | 1.49 ± 0.41 |
| | 0.1 | 0.063 | 1.85 ± 0.44 |
| | 1 | 0.932 | 3.39 ± 0.69 |
| 8 g AMPS IO NPs | 0.03 | 0.006 | 1.20 ± 0.33 |
| | 0.1 | 0.073 | 1.35 ± 0.32 |
| | 1 | 0.943 | 2.83 ± 0.58 |
| 10 g AMPS IO NPs | 0.03 | 0.006 | 1.19 ± 0.34 |
| | 0.1 | 0.074 | 1.29 ± 0.34 |

Ultra-low adsorption on silica microspheres and crushed Berea sandstone of iron oxide nanoparticles stabilized by poly(3-(Methacryloylamino)propyl]dimethyl(3-sulfopropyl)ammonium hydroxide inner salt) grafted via a "grafting through" technique: Embodiments use a "grafting through" technique to covalently tether a [3-(methacryloylamino)propyl]dimethyl(3-sulfopropyl)ammonium hydroxide ("MAPDAH") inner salt to the surfaces of IO NPs. Vinyl groups were first covalently attached to the amine-functionalized IO NPs, followed by performing free radical polymerization of [3-(methacryloylamino)propyl]dimethyl(3-sulfopropyl)ammonium hydroxide inner salt monomers in the presence of the methacrylate-coated IO NPs. The mechanism of the "grafting through" technique allows for propagating polymers (poly([3-(methacryloylamino)propyl]dimethyl(3-sulfopropyl)ammonium hydroxide inner salt) to graft to the vinyl groups on the surfaces of the particles. This was done so that the amount of polymer could effectively be controlled in order to study the adsorption versus polymer content. It was found that ultra-low adsorption using the previously disclosed batch adsorption test could be achieved.

The 3-(methacryloylamino)propyl]dimethyl(3-sulfopropyl)ammonium hydroxide inner salt is commercially available from Aldrich.

Grafting of methacrylic acid to amine-functionalized IO NPs ("MA IO NPs"). 100 mg (1.16 mmol) methacrylic acid was added to 10 ml DI H$_2$O, and the solution was adjusted to a pH 5.5. While maintaining the pH at ≈5.5, 1.2 equivalent of EDC (1.39 mmol) and sulfo-NHS (1.39 mmol) were added, and the mixture was allowed to react for ~20 minutes. Afterwards, a solution of IO NPs containing 250 mg was added drop wise to the activated acrylic acid. Once all the IO NPs were added, the pH was adjusted to 7.5 to 8 and was allowed to stir at room temperature for ~16 hours. Once the reaction was done, the IO was purified via a centrifuge (e.g., 2 times). The final MA IO NP was diluted with DI water and probe sonicated for 1 min/ml.

"Grafting through" of poly([3-(methacryloylamino)propyl]dimethyl(3-sulfopropyl)ammonium hydroxide inner salt) onto MA IO NPs: In a reaction, either 2.5, 5, 8, or 10 g of 3-(methacryloylamino)propyl]dimethyl(3-sulfopropyl) ammonium hydroxide inner salt monomer was added to a 15 ml of 2.5 N NaOH solutions, and the pH of the solution was adjusted to 7. Afterwards, the solution was sealed in a round bottom flask and was degassed with N$_2$ for 30 minutes. In a separate flask, 125 mg of MA IO NPs was added, and depending on the concentration, varying amounts of water was added so that the total volume of the final combined reaction solution (3-(methacryloylamino)propyl]dimethyl (3-sulfopropyl)ammonium hydroxide inner salt+IO solutions) was 25 ml. This solution was then sealed and purged with N$_2$ for 30 minutes. In a third flask was added 13 mg of 4,4'-azobis(4-cyanovaleric acid) along with a stir bar, and was also purged with N$_2$ for 30 minutes. Once all the flasks were properly purged, both the 3-(methacryloylamino)propyl]dimethyl(3-sulfopropyl)ammonium hydroxide inner salt and MA IO NPs solutions were added to the 4,4'-azobis(4-cyanovaleric acid) containing flask via cannula, and the mixture was stirred at 80° C. for 20 minutes. After polymerization was finished, the composite was removed and divided into 6 separate 50 ml centrifuge tubes and filled with 35 ml of DI water. The mixtures were then homogenized using an IKA Ultra-Turrax T-25 Basic with an 8 mm head operating at 13,500 rpm for 2 minutes. This homogenized solution was then centrifuged at 11,000 rpm for 10 minutes. Afterwards the supernatant (containing free polymer) was either kept for characterization or disposed of. The grafted poly(3-(methacryloylamino)propyl]dimethyl(3-sulfopropyl) ammonium hydroxide inner salt) to the MA IO NPs (3-(methacryloylamino)propyl]dimethyl(3-sulfopropyl)ammonium hydroxide inner salt IO NPs) was then suspended in 35 ml of DI $H_2O$, and the above procedure was repeated (e.g., 4 times).

Figure 46:
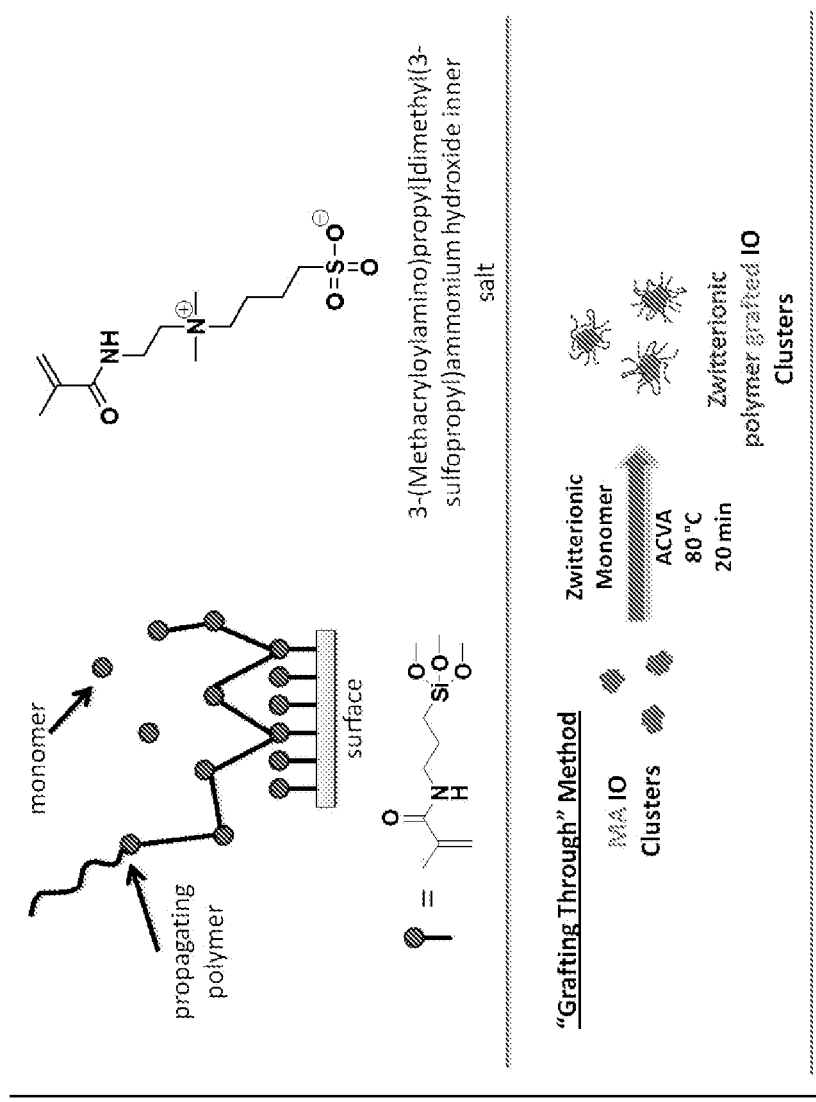
FIG. 46 shows grafting through approach to attach 3-(Methacryloylamino)propyl]dimethyl(3-sulfopropyl)ammonium hydroxide inner salt polymers to iron oxide nanoclusters.

Grafting of methacrylic acid to amine-functionalized IO NPs ("AA IO NPs") and "grafting through": FIG. 46 shows a grafting through approach to attach 3-(methacryloylamino)propyl]dimethyl(3-sulfopropyl)ammonium hydroxide inner salt polymers to iron oxide nanoclusters. Aqueous free radical polymerization was performed with a zwitterionic (MAPDAH) monomer with a grafting through approach in the presence of IO nanoparticles that were coated with polymerizable groups. While the zwitterionic monomer is polymerizing (propagating), it can covalently bind (polymerize) with the vinyl groups contained on the surfaces of the IO NPs. By increasing the initial monomer concentration, more polymer, i.e., higher molecular weight polymers, were grafted to the surfaces of the IO NPs.

After purification, it was observed that the zwitterionic coated IO NPs were stable in standard API brine at 90° C. for several weeks. The coated nanoparticles, which were adsorbed on colloidal silica and crushed Berea sandstone, are shown in Tables 24 and 25, with adsorption at 0.1 mg/ml concentration.

Table 24 shows the adsorption of poly(3-(methacryloylamino)propyl]dimethyl(3-sulfopropyl)ammonium hydroxide inner salt) IO nanoclusters on 8 μm colloidal silica microspheres in standard API brine at pH 8 at varying IO concentrations.

TABLE 24

| Sample ID | Initial IO conc. (% w/v) | % IO adsorbed | Final eq. IO conc. (% w/v) | Specific adsorption (mg-IO/m$^2$)[b] | % monolayer [c] |
|---|---|---|---|---|---|
| 10 g poly(3-(methacryloylamino)propyl]dimethyl(3-sulfopropyl)ammonium hydroxide inner salt) IO NPs | 0.003 | 0.67 | 0.0298 | 0.001 ± 0.01 | 0.0001 |
| | 0.01 | 4.75 | 0.0952 | 0.012 ± 0.003 | 0.003 |
| | 0.1 | 2.97 | 0.485 | 0.021 ± 0.003 | 0.010 |

[a]The specific surface area of colloidal silica was measured to be 0.58 m$^2$/g.
[b]Average of four independent experiments; uncertainty in specific adsorption based on error propagation analysis.
[c] Control sample data at 0.2% w/v initial IO conc. is also shown as an example of IOs with high adsorption where insufficient polymer grafting leads to poor stabilization. Adsorption was conducted with 0.2 g of silica and 2 ml of IO NP dispersion.

Table 25 shows the adsorption of poly(3-(methacryloylamino)propyl]dimethyl(3-sulfopropyl)ammonium hydroxide inner salt) IO nanoclusters on crushed Berea sandstone in standard API brine at pH 8 at varying IO concentrations.

TABLE 25

| Sample ID | Initial IO conc. (% w/v) | % IO adsorbed | Final eq. IO conc. (% w/v) | Specific adsorption (mg-IO/m$^2$)[b] | % monolayer [c] |
|---|---|---|---|---|---|
| 10 g poly (3-(methacryloylamino)propyl]dimethyl(3-sulfopropyl)ammonium hydroxide inner salt) IO NPs | 0.003 | 13.39 | 0.0260 | 0.20 ± 0.04 | 0.076 |
| | 0.01 | 9.55 | 0.0905 | 0.47 ± 0.23 | 0.180 |
| | 0.1 | 6.82 | 0.466 | 1.70 ± 0.42 | 0.643 |

[a]The specific surface area of colloidal silica was measured to be ~0.58 m$^2$/g.
[b]Average of four independent experiments; uncertainty in specific adsorption based on error propagation analysis.
[c] Control sample data at 0.2% w/v initial IO conc. is also shown as an example of IOs with high adsorption where insufficient polymer grafting leads to poor stabilization. Adsorption was conducted with 0.2 g of silica and 2 ml of IO NP dispersion.

Oil/water emulsions stabilized with polymer-grafted iron oxide particles: The following discloses the stabilization of oil-in-water emulsions with poly(oligo(ethyleneoxide)monomethyl ether methacrylate) grafted iron oxide particle clusters ("IO-POEOMA") at ultra-low concentrations. The utilization of different aqueous phases with varying salinities shows the salt tolerance of the POEOMA polymer.

Synthetic seawater ("SSW") (Cat. No. 8363-5, Lot 1306873, ASTM D1141) was purchased from Ricca Chemical Company. Dodecane (99%, Acros Organics) was purified with basic alumina prior to use. Deionized ("DI") water (Nanopure II, Barnstead, Dubuque, Iowa) was used for all experiments. Four different IO-POEOMA materials were tested and are labeled according to the grafting density followed by the molecular weight of the polymer (e.g., "LH" represents Low grafting density and High molecular weight).

Dodecane-aqueous phase (SSW or DI water) interfacial tension was determined using axisymmetric drop shape analysis of a pendant droplet containing a known concentration of polymer-grafted nanoparticles ("IO-POEOMA"). The droplet was held for 10 to 20 minutes to equilibrate with an excess dodecane phase. The pendant drop was illuminated with a monochromatic light source and the digital images were recorded. The droplet shape profile was fitted according to the Young/Laplace equation with a software package (CAM200, KSV Ltd., Finland). The mean interfacial tension was taken of 10 measurements that were acquired 10 seconds apart, and the standard deviation of the measurements was typically less than 1% of the mean.

Emulsions were prepared by combining DI water, SSW, standard API brine, or 200% standard API brine, IO-POEOMA, and dodecane to a total volume of 10 mL in a 20 mL glass vial and immediately homogenized with an IKA Ultra-Turrax T-25 Basic with an 8 mm head operating at 13,500 rpm for 2 minutes at room temperature. The sample was immediately poured into a capped 16 mm×125 mm glass test tube. The IO-POEOMA originate in the aqueous phase and their volume is treated as part of the aqueous phase volume. The IO-POEOMA concentrations are given as mass percent per total sample volume (% w/v). Water fraction ("φw"), 0.5 for all emulsions is given as the proportion of aqueous phase to the total sample volume Immediately after homogenization, the emulsion conductivity was determined using a Cole-Parmer EC conductivity meter with a Pt/Pt black electrode. The emulsion type was also confirmed using the "drop" test.

Emulsion stability to creaming was determined by monitoring the creaming front position as a function of time with a Nikon D5100 with Phottix TR-90 remote controller after transferring the emulsion to a capped 16 mm×125 mm glass test tube. The digital photos were analyzed with ImageJ software (US National Institutes of Health). The D[4,3] and uniformity ("U") were calculated from the droplet size distributions with a Malvern Mastersizer S light diffraction instrument equipped with a 15 mL stirred optical cell initially, at 1 hour, and 24 hours after homogenization. Optical microscopy was performed with a Nikon Eclipse ME600 light microscope equipped with a Photometrics CoolSnap digital camera. On a glass microscope slide, 10 µL of emulsion were diluted with 20 µL of SSW, to dilute droplets for clarity while minimizing the disruption of the emulsion structure.

Figure 44A:
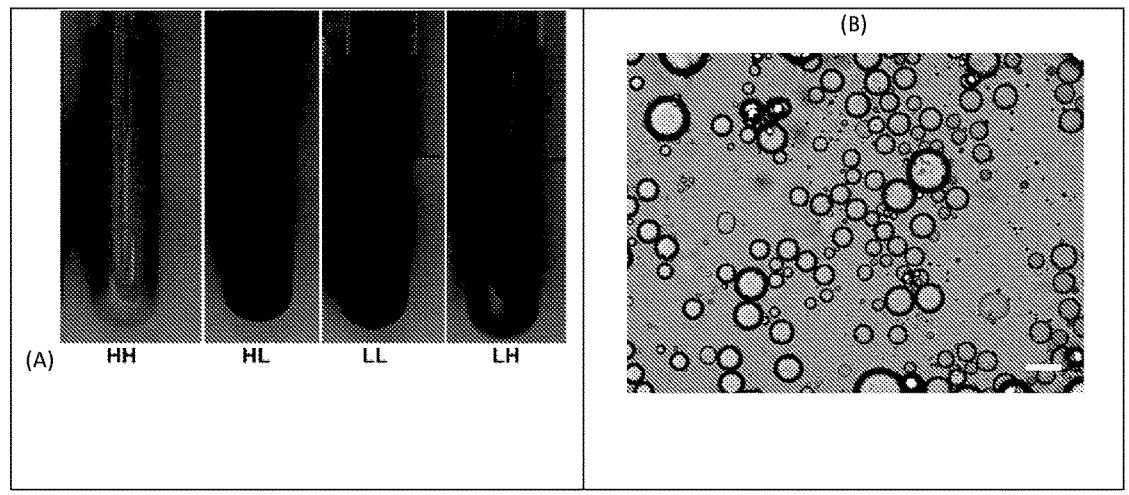
FIG. 44a shows digital images of an emulsion after homogenization.

Polymer-grafted nanoparticles were synthesized via the "grafting through" method and used in 0/W emulsions. Characterization of the four IO-POEOMA nanoparticle materials, by thermogravimetric analysis and dynamic light scattering, revealed 75-89% organic material with 25-11% iron oxide and ~1 µm diameter. Gel permeation chromatography (data not shown) revealed the molecular weights of the polymer at ~800 kDa and ~1000 kDa, labeled low and high in the nomenclature of the IO-POEOMA system. All emulsions made with IO-POEOMA were oil-in-water emulsions as confirmed by conductivity measurements and the drop test. As shown in FIG. 44a, the emulsions were opaque and light brown in color, a result of the presence of iron oxide clusters, with a clear aqueous layer below and a clear dodecane layer above. Referring to FIG. 44b, visual observation of the emulsions with an optical microscope show round discrete oil drops with minimal flocculation of drops. In order to obtain an image of discrete droplets, the emulsion sample was diluted with SSW which was previously determined to not affect the emulsion drops as observed through the microscope and Malvern drop size data. FIG. 44a is an image of the emulsion after homogenization. FIG. 44b is an image of an optical microscope photo of LH IO-POEOMA emulsion sample diluted with SSW at 10× zoom.

TABLE 24

| Sample | Aqueous phase | [IO-POEOMA] % wt. | t = 0 D[4,3] U | t = 1 hour D[4,3] U | t = 24 hours D[4,3] U | Time to 20% Aqueous resolved | IFT (mN/m) |
|---|---|---|---|---|---|---|---|
| LH | SSW | 0.1 | 48 0.477 | 46 0.510 | 47 0.460 | 63 min | 18 |
|  | DIW | 0.1 | 50 0.464 | 50 0.453 | 52 0.460 | 79 min | 17 |
| LL | SSW | 3.6 | 114 0.470 | 119 0.480 | 121 0.707 | 60 min | 16 |
|  | DIW | 3.6 | 114 0.388 | 122 0.479 | 137 0.539 | 85 min | 16 |
| HL | SSW | 0.4 | 44 0.552 | 45 0.555 | 52 0.520 | No creaming | 18 |
|  | DIW | 0.4 | 42 0.534 | 45 0.545 | 54 0.525 | No creaming | 20 |
| HH | SSW | 0.03 | 62 0.420 | 63 0.421 | 68 0.449 | 5.33 min | 17 |
|  | DIW | 0.03 | 56 0.381 | 61 0.379 | 58 0.360 | 7.75 min | 20 |
|  | DIW | 0.08 | 48 0.263 | 47 0.269 | 44 0.310 | 25 min | 20 |

Figure 45:
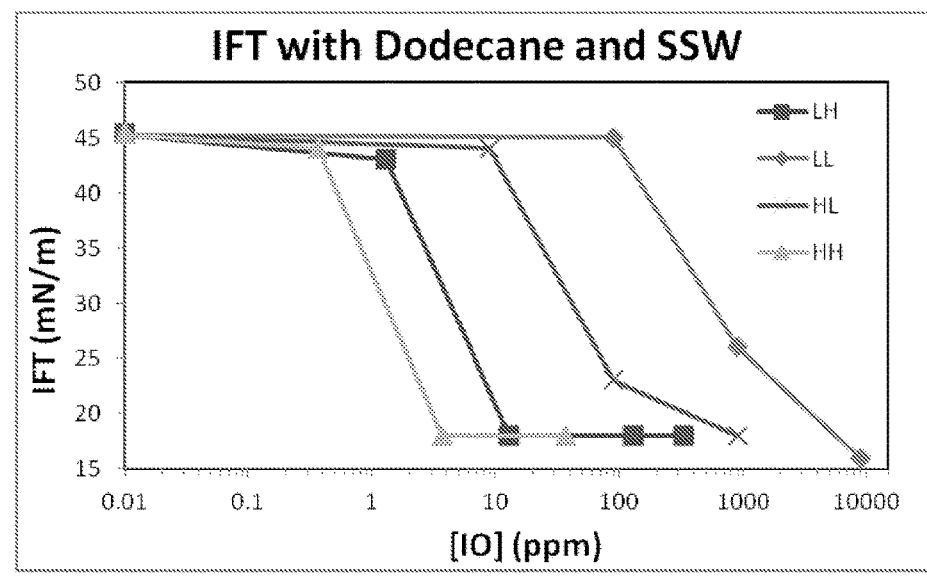
FIG. 45 is a plot of dodecane-SSW interfacial tension data of pre-equilibrated phases for various IO-POEOMA materials at varying concentrations. Pure dodecane-SSW IFT is reported as 45.3 mN/m in accordance with literature values.

The dodecane-SSW interfacial tensions of pre-equilibrated phases are shown in FIG. 45. FIG. 45 is a plot of the dodecane-SSW interfacial tension data of pre-equilibrated phases for various IO-POEOMA materials at varying concentrations. Pure dodecane-SSW IFT is reported as 45.3 mN/m in accordance with literature values. The different IO-POEOMA materials reduce the IFT to ~17 mN/m at different concentrations based on the efficiency of the grafted polymer chains to reach the oil-water interface. The HH (high grafting density and high molecular weight polymer) material reduces IFT from 45 mN/m to 17 mN/m with as little as 0.003% wt. IO-POEOMA. The LH IO-POEOMA material completely reduces the IFT at 0.01% wt. IO-POEOMA, while the HL and LL IO-POEOMA reduce IFT to 17 mN/m at 0.4% wt. IO-POEOMA. Previously published works with polymer-grafted nanoparticles have reported 28 mN/m IFT reduction with as little as 0.08% wt. material. However, our new material significantly reduces IFT, by 28 mN/m, at 100 times lower concentration.

Emulsion morphology can be explored through drop sizes and creaming rates of those droplets. All emulsions were oil-in-water as observed via conductivity measurements (not shown) and the "drop" test observations. Iron oxide nanoparticle clusters without the polymer grafted to it do not stabilize emulsions nor lower IFT at 1% wt. thus they are not good emulsifiers. The low and high molecular weight polymers alone do lower IFT and stabilize emulsions but only at high concentrations, 1% wt. The oil drop sizes of the different emulsions can be seen in Table 22. The HH, LH, and HL IO-POEOMA materials have relatively small drop diameters, ~50 µm, with little to no drop coalescence over 24 hours. The LL IO-POEOMA material created drops with a diameter ~120 µm with little to no drop coalescence over 24 hours. All IO-POEOMA materials create viscous emulsions stable to drop coalescence and coarsening.

The emulsion stability to creaming can also be seen in Table 24. The stability of the emulsions in DI water ("DIW") and SSW are similar indicating the polymer's ability to tolerate salts. At the specified concentrations, IO-POEOMA materials create emulsions that are relatively stable to drop creaming on the short time scale, 5 minutes to an hour. However, it is possible to create emulsions with higher IO-POEOMA concentrations that do not have any drop creaming, as seen for the emulsion made with HL IO-POEOMA at 0.4% wt. Typically published polymer grafted nanoparticle systems require 1% wt. or more material to form emulsions stable to creaming; embodiments of the present invention require a factor less material at 0.4% wt. For all emulsions, after the initial creaming, the emulsion heights stabilized. It is worth noting that all of the IO-POEOMA material was involved in the emulsion, and the lower aqueous phase was always clear and void of IO-POEOMA. No upper oil layer was seen in the emulsions till the emulsion completely phase separated.

Based on emulsion stability and ability to reduce IFT, the four different IO-POEOMA materials performance followed the trend of HH>LH>HL>LL, where HH performed the best. Similar trends were seen with efficiency in IFT reduction and emulsion stability in that the molecular weight of the polymer chains was more beneficial to performance than the grafting density of those chains. This definite trend has never been stated before for POEOMA grafted particles.

Utilizing the "grafting through" method of covalent attachment of POEOMA to the iron oxide clusters, dodecane-in-synthetic seawater emulsions were stabilized with as little as 0.003% wt. poly(oligo(ethyleneoxide)monomethyl ether methacrylate) ("POEOMA") grafted iron oxide nanoparticle clusters. Characterization of the NP+polymer emulsifier revealed ~85% organic material to ~15% iron oxide cluster core with polymer chain lengths of ~800 kDa. In 1:1 dodecane: SSW emulsions, the polymer grafted NPs are surface active, prevent coalescence of the oil drops, and stay in the emulsion phase, with a clear aqueous phase below. IFT reduction between SSW and dodecane was reduced to 17 mN/m from 52 mN/m with as little as 0.003% wt. (IO-POEOMA). For both emulsion stability to creaming and coalescence, and IFT reduction, the molecular weight of the salt-tolerant POEOMA polymer was more influential than grafting density resulting in the use of less material for equivalent effectiveness. The longer polymer chains were able to lower IFT, stabilize the oil-water interface, and increase viscosity of the continuous phase of emulsions.

Figure 47:
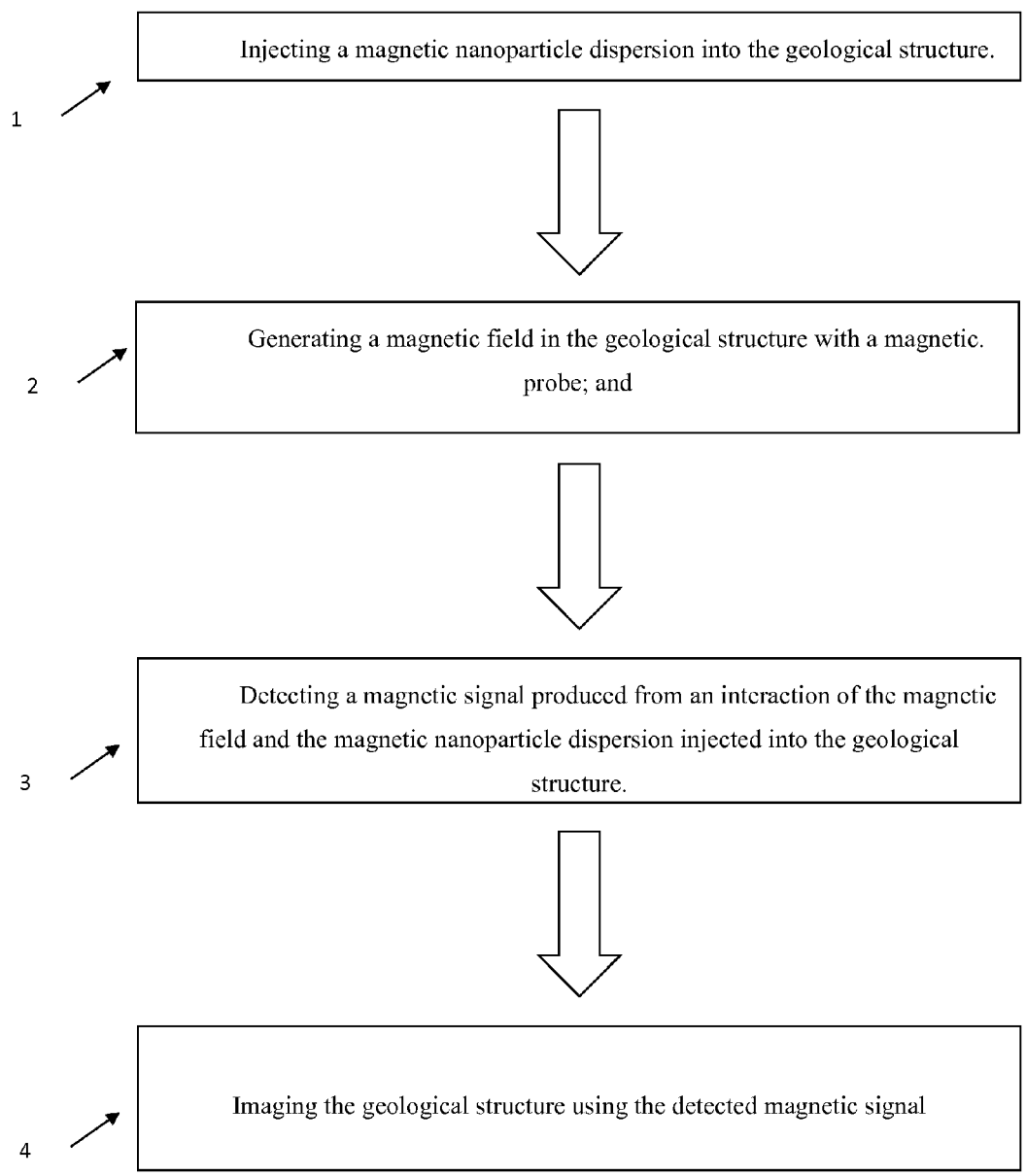
FIG. 47 illustrates a flow diagram of a process in accordance with embodiments of the present invention.
Figure 48:
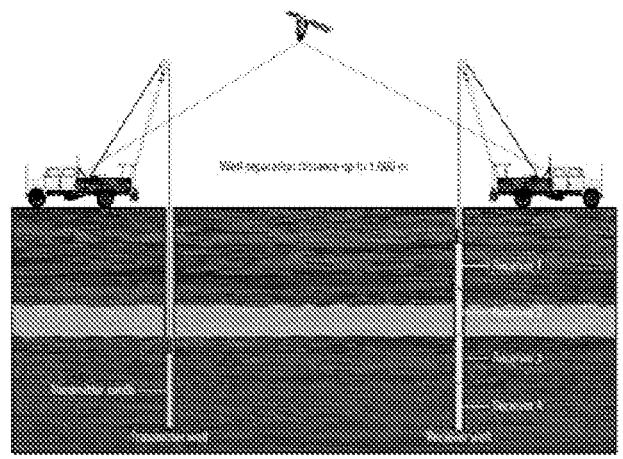
FIG. 48 illustrates a schematic of system for assaying a geological structure in accordance with embodiments of the present invention.

FIG. 47 illustrates a flow diagram of a process in accordance with embodiments of the present invention. Block 1 discloses injecting a magnetic nanoparticle dispersion into the geological structure (e.g., a hydrocarbon bearing reservoir or formation). The magnetic nanoparticle dispersion may include any one of the magnetic particles disclosed herein, which may be made using any of the processes disclosed. Block 2 discloses generating a magnetic field in the geological structure with a magnetic probe. Block 3 discloses detecting a magnetic signal produced from an interaction of the magnetic field and the magnetic nanoparticle dispersion injected into the geological structure. The procedure may be further summarized as follows: first, the magnetic nanoparticle dispersion is injected into the reservoir to deliver the magnetic nanoparticles to the formation. Next, the reservoir may be illuminated through an electromagnetic ("EM") system; the EM source may be deployed at the transmitting well and the receivers at the sensing well (setting up a crosswell system). The resulting EM signal may be subsequently measured at the receivers, with particular attention to the perturbations caused by the presence of the nanoparticles to the EM measurements. Block 2 discloses imaging the geological structure using the detected magnetic signal FIG. 48 illustrates a schematic of an exemplary crosswell EM data acquisition configuration. The transmitter traverses the logging interval while continuously propagating the primary electromagnetic field. The receiver collects the primary and secondary (formation) fields.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

What is claimed is:

1. A method for assaying a geological structure comprising:
   injecting a magnetic nanoparticle dispersion into the geological structure, wherein the magnetic nanoparticle dispersion comprises one or more polymers grafted to at least a surface of one or more magnetic nanoparticles, wherein the magnetic nanoparticle dispersion is suitable for maintaining a colloidal stability in an environment comprising standard API brine at 90° C., wherein the one or more polymers comprise a poly (acrylamido methyl propane sulfonate-co-acrylic acid) polymer;
   generating a magnetic field in the geological structure with a magnetic probe; and
   detecting a magnetic signal produced from an interaction of the magnetic field and the magnetic nanoparticle dispersion injected into the geological structure.

2. The method of claim 1, wherein the one or more magnetic nanoparticles comprise a magnetic metal oxide nanoparticle, a magnetic metal nanoparticle, or both.

3. The method of claim 2, wherein the magnetic metal oxide nanoparticle comprises a metal oxide comprising Zn, Cr, Co, Dy, Er, Eu, Gd, N, Pr, Nd, In, Pr, Sm, Tb, or Tm.

4. The method of claim 2, wherein the magnetic metal oxide nanoparticle comprises iron oxide, nickel oxide, cobalt oxide, magnetite, or ferrites.

5. The method of claim 1, wherein the geological structure comprises a hydrocarbon deposit.

6. The method of claim 1, wherein the colloidal stability is for about 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 4 months, 5 months, 6 months, 7 months, 8 months, 9 months, 10 months, 11 months, 1 year, 2 years, 3 years, or 4 years.

7. The method of claim 1, wherein the one or more magnetic nanoparticles comprise iron oxide, iron, cobalt, magnetite, hematite, ferrites selected from nickel ferrite, aluminum ferrite, manganese ferrite, zinc ferrite, and cobalt ferrite, or combinations thereof.

8. The method of claim 1, wherein the one or more magnetic nanoparticles comprise one or more amine-functional groups.

9. The method of claim 1, wherein the one or more polymers comprise a random copolymer, wherein one member of the random copolymer is an acrylic acid monomer.

10. The method of claim 1, wherein the one or more polymers comprise a first monomer comprising an anchoring group and a second monomer comprising a stabilizing group.

11. The method of claim 10, wherein the anchoring group is selected from the group consisting of acrylic acid, methacrylic acid, 4-vinylbenzoic acid, 3-acrylamido-3-methylbutanoate and N-acryloylalanine, and a combination thereof.

12. The method of claim 10, wherein the stabilizing group is selected from the group consisting of 2-acrylamido-2-methyl propane sulfonate, vinylsulfonate, 3-sulfopropylmethacrylate, 3-[2-(N-methylacrylamido)-ethyldimethylammonio]propanesulfonate, 3-[N-(2-methacroyloyethyl)-N,N-dimethylammonio]propanesulfonate, and 3-(N,N-dimethylvinylbenzylammonio) propanesulfonate, sulfonate polymers, zwitterionic polymers, sulfobetaine zwitterionic polymers, and carboxybetaine zwitterionic polymers.

13. The method of claim 1, wherein the one or more polymers comprise a first monomer comprising a sulfonate group and a second monomer comprising an acrylate group.

14. The method of claim 1, wherein the poly(acrylamido methyl propane sulfonate-co-acrylic acid) polymer has a ratio of about 3:1 of 2-acrylanmido-2-methylpropanesulfonic acid to acrylic acid groups.

15. The method of claim 10, wherein a ratio of the stabilizing group to the anchoring group comprises between about 14% and 95%.

16. A method for assaying a geological structure comprising:
- injecting a magnetic nanoparticle dispersion into the geological structure, wherein the magnetic nanoparticle dispersion comprises one or more polymers grafted to at least a surface of one or more magnetic nanoparticles, wherein the magnetic nanoparticle dispersion is suitable for maintaining a colloidal stability in the geological structure for a period of at least 8 days, wherein the one or more polymers comprise a poly (acrylamido methyl propane sulfonate-co-acrylic acid) polymer;
- generating a magnetic field in the geological structure with a magnetic probe; and
- detecting a magnetic signal produced from an interaction of the magnetic field and the magnetic nanoparticle dispersion injected into the geological structure, wherein the one or more polymers comprise a first monomer comprising an anchoring group and a second monomer comprising a stabilizing group, wherein a ratio of the stabilizing group to the anchoring group comprises between about 14% and 95%.

* * * * *